United States Patent
Hernández Altamirano et al.

(10) Patent No.: US 10,597,578 B2
(45) Date of Patent: Mar. 24, 2020

(54) MULTIFUNCTIONAL FOAMING COMPOSITION WITH WETTABILITY MODIFYING, CORROSION INHIBITORY AND MINERAL SCALE INHIBITORY/DISPERSANTS PROPERTIES FOR HIGH TEMPERATURE AND ULTRA HIGH SALINITY

(71) Applicant: INSTITUTO MEXICANO DEL PETRÓLEO, Mexico City (MX)

(72) Inventors: Raúl Hernández Altamirano, México (MX); Luis Silvestre Zamudio Rivera, México (MX); Violeta Yázmin Mena Cervantes, México (MX); Erick Emanuel Luna Rojero, México (MX); David Aarón Nieto Álvarez, México (MX); Rodolfo Cisneros Devora, México (MX); Mirna Pons Jiménez, México (MX); Alejandro Ramírez Estrada, México (MX); América Elizabeth Mendoza Aguilar, México (MX); Sung Jae Ko Kim, México (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 0 days.

(21) Appl. No.: 15/926,605

(22) Filed: Mar. 20, 2018

(65) Prior Publication Data
US 2018/0273830 A1    Sep. 27, 2018

Related U.S. Application Data

(63) Continuation of application No. 14/943,763, filed on Nov. 17, 2015, now Pat. No. 10,190,036.

(30) Foreign Application Priority Data

Nov. 18, 2014    (MX) .................... MX/a/2014/013981

(51) Int. Cl.
*C09K 8/584*    (2006.01)
*C23F 11/173*    (2006.01)
(Continued)

(52) U.S. Cl.
CPC .......... *C09K 8/584* (2013.01); *B01F 17/0085* (2013.01); *C09K 8/38* (2013.01);
(Continued)

(58) Field of Classification Search
None
See application file for complete search history.

(56) References Cited

U.S. PATENT DOCUMENTS 3,939,911 A    2/1976    Maddox, Jr. et al.
4,607,695 A    8/1986    Weber
(Continued)

FOREIGN PATENT DOCUMENTS

| EP | 2644685 | 10/2013 |
|---|---|---|
| MX | 2008015989 A | 6/2010 |
| MX | 2012014187 A | 6/2014 |

OTHER PUBLICATIONS

Skoreyko, Fraser et al, "Development of a new foam EOR model from laboratory and field data of the naturally fractured Cantarell Field", SPE International, SPE 145718, 2011, Society of Petroleum Engineers, Abu Dhabi, UAE.
(Continued)

*Primary Examiner* — Jeffrey D Washville
(74) *Attorney, Agent, or Firm* — Casimir Jones, S.C.; Anne M. Reynolds

(57) ABSTRACT

The present invention is related to the obtaining and using of multifunctional foaming compositions with wettability
(Continued)

modifying, corrosion inhibitory and inhibitory/dispersants mineral scale properties with high stability in environments of high temperature, high pressure and tolerance to high concentrations of divalent ions such as calcium, magnesium, strontium and barium. The multifunctional foaming compositions are obtained from the combination of supramolecular complexes resulting from interactions of alkyl amido propyl hydroxysultaines and/or alkyl amido propyl betaines and/or alkyl hydroxysultaines and/or alkyl betaines and anionic surfactant of type alkyl hydroxyl sodium sulfonate and alkenyl sulphonates of sodium, with cationic surfactants as tetra-alkyl ammonium halides and copolymers derivatives of itaconic acid/sodium vinyl sulfonate and/or terpolymers derived from itaconic acid/sodium vinyl sulphonate/aconitic acid. These multinational foaming compositions control the gas channeling and favorably change the wettability and increase the recovery factor of crude oil in naturally fractured reservoirs of carbonate type and heterogeneous lithology. In addition to this, the multifunctional foaming compositions of this invention exhibit anti-corrosive properties in typical environments of production tubing of crude oil and antifouling/dispersants of mineral salts as calcium carbonate, calcium sulfate, barium and strontium in the reservoir and in the production and injection pipelines.

20 Claims, 42 Drawing Sheets

(51) Int. Cl.
| | |
|---|---|
| C09K 8/594 | (2006.01) |
| C09K 8/54 | (2006.01) |
| C09K 8/52 | (2006.01) |
| C23F 11/16 | (2006.01) |
| C09K 8/38 | (2006.01) |
| C09K 8/528 | (2006.01) |
| C09K 8/70 | (2006.01) |
| E21B 37/06 | (2006.01) |
| E21B 43/16 | (2006.01) |
| C09K 8/518 | (2006.01) |
| C09K 8/536 | (2006.01) |
| B01F 17/00 | (2006.01) |
| C09K 8/94 | (2006.01) |
| C23F 11/10 | (2006.01) |

(52) U.S. Cl.
CPC ............... *C09K 8/518* (2013.01); *C09K 8/52* (2013.01); *C09K 8/528* (2013.01); *C09K 8/536* (2013.01); *C09K 8/54* (2013.01); *C09K 8/594* (2013.01); *C09K 8/703* (2013.01); *C09K 8/94* (2013.01); *C23F 11/10* (2013.01); *C23F 11/163* (2013.01); *C23F 11/173* (2013.01); *E21B 37/06* (2013.01); *E21B 43/168* (2013.01); *C09K 2208/32* (2013.01)

(56) References Cited

U.S. PATENT DOCUMENTS

| | | |
|---|---|---|
| 4,703,797 A | 11/1987 | Djabbarah |
| 5,049,311 A | 9/1991 | Rasheed et al. |
| 5,273,682 A | 12/1993 | Danzik |
| 5,295,540 A | 3/1994 | Djabbarah et al. |
| 5,542,474 A | 8/1996 | Djabbarah et al. |
| 7,104,327 B2 | 9/2006 | Harris et al. |
| 7,407,916 B2 | 8/2008 | Chatterji et al. |
| 8,722,588 B2 | 5/2014 | Zamudio Rivera et al. |
| 9,469,804 B2 | 10/2016 | Hernandez et al. |
| 2004/0121917 A1 | 6/2004 | Pakulski |
| 2007/0142235 A1 | 6/2007 | Berger et al. |
| 2012/0285694 A1 | 11/2012 | Morvan et al. |
| 2015/0126417 A1* | 5/2015 | Hatchman ............... C09K 8/58 507/219 |

OTHER PUBLICATIONS

Ramirez, G. et al., "High-temperature conformance field application through coiled tubing a successful case history", SPE International, SPE 130655, 2010, Society of Petroleum Engineers, The Woodlands, Texas, USA.

Srivastava, Mayank et al., "Application of gas for mobility control in chemical EOR in problematic carbonate reservoirs and the performance thereof", SPE International, SPE 129840, 2010, Society of Petroleum Engineers, Tulsa, Oklahoma, USA.

Antonio Villacicencio Pin et al, "Control of gas mobility in the cap in Akal field wells Belonging to the Cantarell Complex", pp. 13-33, (2012).

Report DE-FC26-03NT15406 of the United States Department of Energy in America, "Surfactant-Based Enhanced Oil Recovery Processes and Foam Mobility Control", SCNGO Oil Technology Program Detailed Project Summaries—Oct. 2006.

European Search Report for Application No. 15194729.8 dated Jan. 28, 2016, 3 pages.

* cited by examiner

| Concentration (ppm) | Time (h:min:s) | Contact Angle | Image |
|---|---|---|---|
| Reference | 1:00:00 | 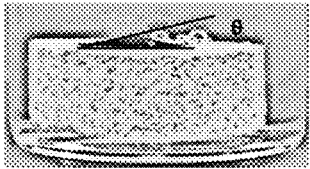 Θ = 21° |  |
| 1000 | 00:02:30 | 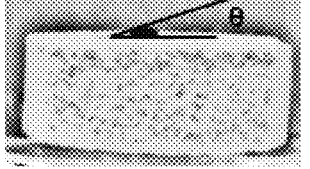 Θ = 32° |  |
| 2000 | 00:01:24 | 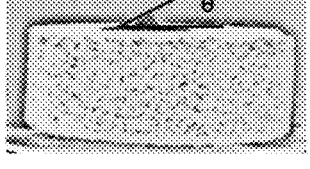 Θ = 40° |  |
Figure 21

| Concentration (ppm) | Time (h:min:s) | Contact Angle | Image |
|---|---|---|---|
| Reference | 24:00:00 | 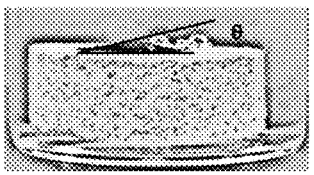<br>Θ = 21° | 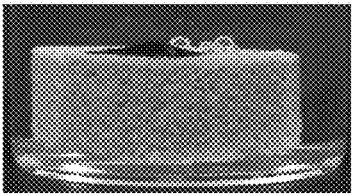 |
| 1000 | 00:09:21 | 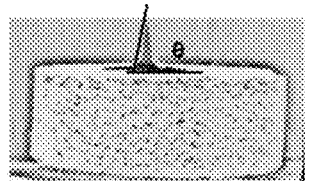<br>Θ = 73° | 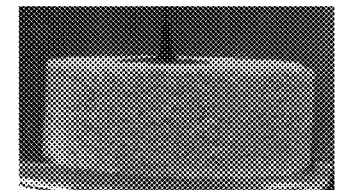 |
| 2000 | 00:05:06 | 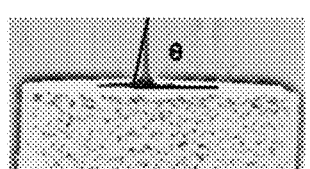<br>Θ = 75° |  |
Figure 22

Figura 28

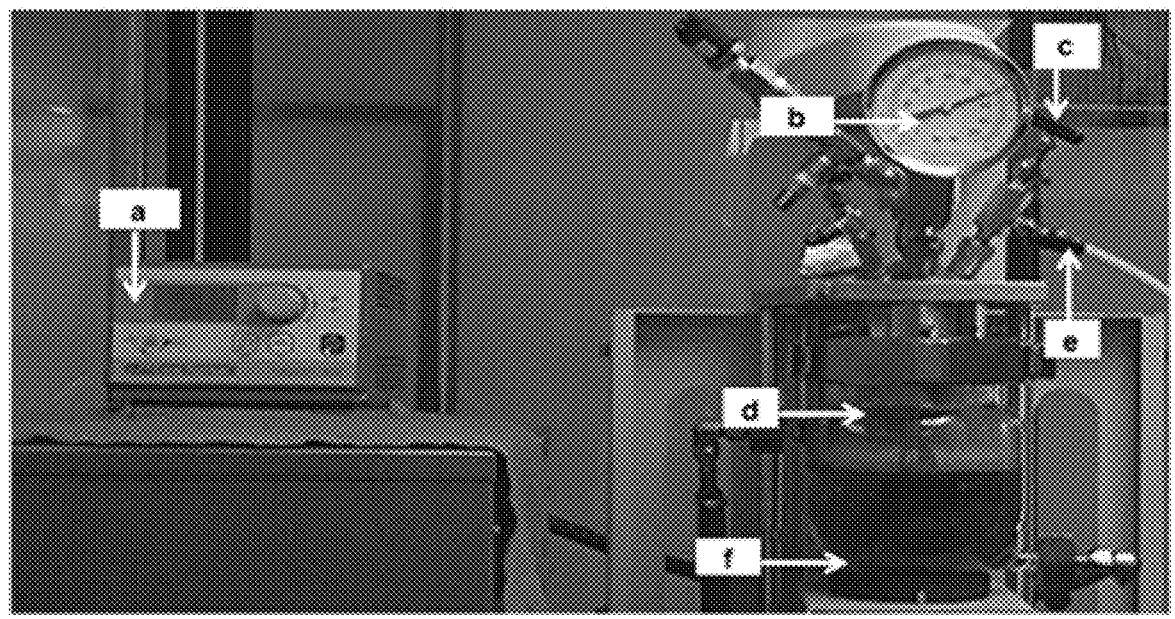
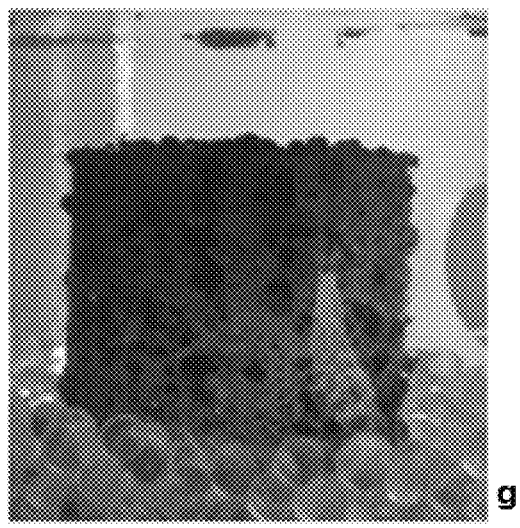
Figure 32

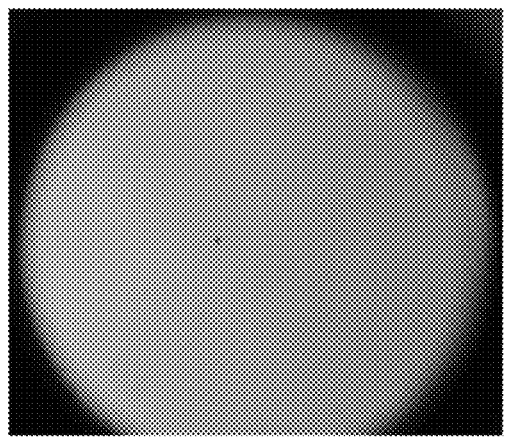
a)
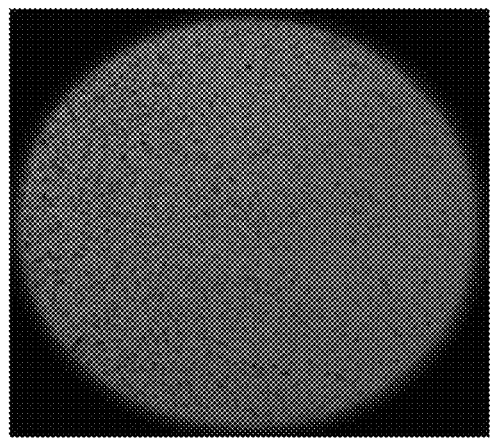
b)
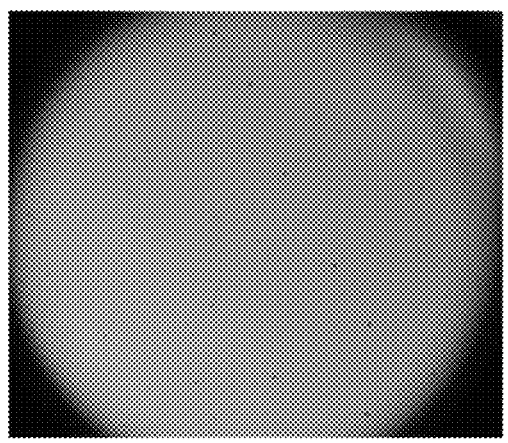
c)
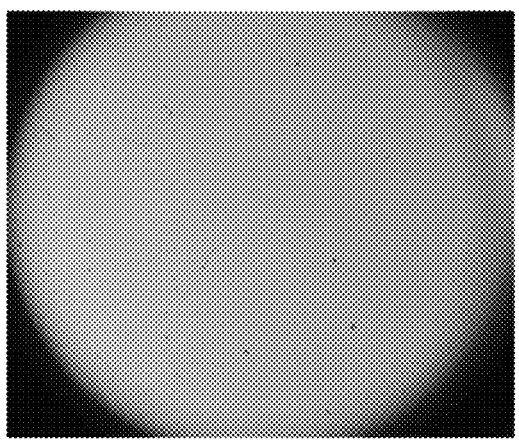
d)
Figure 40

MULTIFUNCTIONAL FOAMING COMPOSITION WITH WETTABILITY MODIFYING, CORROSION INHIBITORY AND MINERAL SCALE INHIBITORY/DISPERSANTS PROPERTIES FOR HIGH TEMPERATURE AND ULTRA HIGH SALINITY

CROSS-REFERENCE TO RELATED APPLICATIONS

This application is a continuation of U.S. patent application Ser. No. 14/943,763, filed Nov. 17, 2015, now U.S. Pat. No. 10,190,036, issued on Jan. 29, 2019, which claims priority to Mexican Patent Application No. MX/a/2014/013981, filed on Nov. 18, 2014, each of which are fully incorporated herein by reference.

TECHNICAL FIELD OF THE INVENTION

The present invention relates to the obtaining and use of multifunctional foaming compositions having wettability modifying, corrosion inhibitory and mineral scale inhibitory/dispersant properties, that exhibit high stability and high performance under conditions that involving ultra-high salinity brines, high temperature and high pressure, and have application in the control of the canalization of fluids in naturally fractured reservoirs of heterogeneous lithology, increase the production of crude oil due to changing the rock wettability favorably in enhanced recovery processes under conditions of high temperature and ultra-high salinity, as well as control uniform and localized corrosion problems that occur in production rigs of crude oil under conditions of high temperature and ultra-high salinity, inhibit and dispersed mineral scale as calcium carbonate, sulfates of calcium, barium and strontium, formed upon contact the injection water with the formation water present in the oil field and for their application can be used seawater and/or connate water feature of the reservoir to dissolve the multifunctional foaming composition.

The multifunctional foaming compositions of the present invention are obtained from the combination of supramolecular complexes resulting from interactions of alkyl amido propyl hydroxysultaines and/or alkyl amido propyl betaines and/or alkyl hydroxysultaines and/or alkyl betaines and anionic surfactants as alkyl hydroxy sodium sulphonates and alkenyl sodium sulphonates, with cationic surfactants as tetra-alkyl ammonium halides and copolymers derived of itaconic acid/sodium vinyl sulfonate and/or terpolymers derived from itaconic acid/sodium vinyl sulphonate/aconitic acid.

BACKGROUND OF THE INVENTION

One of the major technological challenges that currently exist worldwide in naturally fractured carbonate reservoirs (NFCR) than they present high temperature and high salinity conditions; it is to increase the oil recovery factor through the use of chemicals. The NFCR are characterized by possessing low porosities, present areas of preferential flow, this due to the existence of fractures and dissolution cavities and exhibit wettability to the oil or intermediate; therefore, chemicals that are used in the same, in order to increase the recovery factor, must be possess the ability to control the channeling of fluid and alter the rock wettability of oil-wet to water-wet. Added to this, if in the NFCR conditions of high temperature and salinity, and problems of incompatibility between the injection water and formation water, it is necessary that the chemicals that are used in enhanced oil recovery processes, be tolerant to high salinity and concentrations of divalent ions, control problems of formation damage caused by mineral salt scale and problems of uniform corrosion as well as scales in the production rigs.

Traditionally, the way to control channeling of fluids in NFCR has been through the use of foaming agents and/or gels [SPE 145718, 2011, Development of a new foam EOR model from laboratory and field data of the naturally fractured Cantarell Field; SPE 130655, 2010, High-temperature conformance field application through coiled tubing a successful case history; SPE 129840, 2010, Application of gas for mobility control in chemical EOR in problematic carbonate reservoirs and the performance thereof, is a function of reservoir temperature, salinity and concentration of divalent ions that are present in water injection and/or in the formation water and the type of crude oil which are present in the reservoir. Also, the benefits of use foaming agents with wettability modifying properties that control gas channeling problems and increase the recovery factor in NFCR that not present incompatibility of waters problems has been recently demonstrated in Mexico [AIPM, 13-33, 2012, Control de movilidad del gas en el casquete en pozos del campo Akal perteneciente al Complejo Cantarell; SPE 145718, 2011, Development of a new foam EOR model from laboratory and field data of the naturally fractured Cantarell Field]. Additionally, the foaming agents are commonly used in various stages of the exploitation of oil fields as: drilling and fracturing; as well as in gas reservoirs and condensates with water supply. In this type of gas and condensate reservoirs, the function of the foam is to maximize the gas production through the weight reduction of the hydrostatic column generated by fluids (water, gas and condensate). Within the main chemical families of surfactants that have been used to generate foams and which have application in enhanced oil recovery processes are: 1) Alkyl aryl sulfonates (U.S. Pat. No. 5,273,682 "Viscosity control additives for foaming mixture"); 2) Alkoxy alkyl benzenesulfonates (U.S. Pat. No. 5,049,311 "Alkoxylated alkyl substituted phenol sulfonates compounds and compositions, the preparation thereof and their use in various applications"); 3) Alpha olefin sulfonate (U.S. Pat. No. 4,607,695 "High sweep efficiency steam drive oil recovery method"); 4) Alkyl amido betaines (U.S. Pat. No. 7,104,327 "Methods of fracturing high temperature subterranean zones and foamed fracturing fluids therefor"); 5) Alkyl amido hydroxysultaines (U.S. Pat. No. 7,407,916 "Foamed treatment fluids and associated methods"); and 6) Alkyl ether sulfates (Report DE-FC26-03NT15406 of the United States Department of Energy in America Surfactant-Based Enhanced Oil Recovery Processes and Foam Mobility Control). However, when in the reservoirs, the temperature conditions are high (higher than 70° C.), the salinity is greater than 30,000 ppm of total solids and the concentration of divalent ions, such as, calcium and magnesium, it is more than 2,000 ppm, so that, the stability of the foam that are generated for this kind of chemicals families of surfactants decreases drastically. In order to increase the stability of the foam and thus its tolerance to high concentrations of divalent ions and/or temperature, they have been developed formulations of foaming agents with improved properties as those listed below: The U.S. Pat. No. 3,939,911 (Surfactant oil recovery process usable in high temperature formations containing water having high concentrations of polyvalent ions) describes a system of three surfactants applied to processes of enhanced recovery in reservoirs of high temperature and whose water formation contains of 200 to 14,000 ppm of polyvalent ions dissolved, such as calcium or magnesium. The system of three surfactants is made up of: 1) a water-soluble salt of an alkyl or alkylaryl sulfonate, wherein the alkyl chain can be have from 5 to 25 carbon atoms, 2) a surfactant of phosphate ester with an average molecular weight which does not exceed 1000 UMA and 3) a sulfobetaine surfactant of the structural formula (1) wherein R is an alkyl group of 12 to 24 carbon atoms. The combination is stable until at least a temperature of 107° C. and resistant to attack by bacteria and inhibits scale formation.

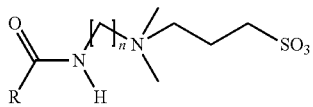
(1)

The U.S. Pat. No. 4,703,797 (Sweep improvement in enhanced oil recovery) mentions a method of improved swept during processes of enhanced oil recovery. The method consists of generate a foam by the dispersion of the fluid displaced in an aqueous solution containing a surfactant formulation. The surfactant formulation consists of a foaming based lignosulfonates and a foaming surfactant. Within the foaming surfactants mention is made to the group consisting of anionic, nonionic and amphoteric surfactants. The U.S. Pat. No. 5,295,540 (Foam mixture for steam and carbon dioxide drive oil recovery method) mentions a method based foams for the enhance the hydrocarbons production in subterranean formations and consisting of: 1) inject vapor and fluids produced into the formation and 2) injecting a vapor mixture, a non-condensable gas and an aqueous mixture of surfactant and polysaccharide. Within the surfactants mentioned which can be used, they are find linear toluene sulfonates, alkylaryl sulfonates, dialkylaryl sulfonates, alpha olefin sulfonates and dimerized alpha olefin sulfonates. The U.S. Pat. No. 5,542,474 (Foam mixture for carbon dioxide drive oil recovery method) mentions a method based foam to enhance the performance during the steam supply or carbon dioxide into underground formations that containing crude oil and which are formed by at least one producer well and one injector well. The sweep efficiency in the oil recovery process through steam supply is enhanced by: 1) inject steam until it starts to appear in the producer well and 2) then add to the forming a mixture of steam, not condensable gas and an aqueous solution of a polypeptide surfactant. The aqueous solution of surfactant-polypeptide forms a stable foam with the oil of the formation at reservoir conditions. Within the surfactants used as base of foaming agent are sodium salts and ammonium of sulfated ethoxylated alcohols, ethoxylated linear alcohols, linear toluene sulfonates. The U.S. Pat. No. 7,104,327 (Methods of fracturing high temperature subterranean zones and foamed fracturing fluids therefor) provides methods for fracturing subterranean zones of high temperature and aqueous fracturing fluids foamed and viscous for this purpose. The fracturing fluid of the invention take in water, a terpolymer of 2-acrylamido-2-methylpropane sulfonic acid, acrylamide and acrylic acid or salts thereof, a gas, a foaming agent and a breaker of viscosity for controlling and reduce the viscosity of the fracturing fluid. The foaming agent in this invention is selected from the group consisting of $C_8$-$C_{22}$ alkylamido-betaine, alpha olefin sulfonate, chloride of trimethyl-taloil-ammonium $C_8$-$C_{22}$ alquiletoxilado sulfate and chloride of trimethyl-coco-ammonium; especially mention is made as foaming agent of the cocoamidopropyl betaine. The Mexican patent MX 297,297 (Composición espumante para alta temperatura y salinidad) is related to a foaming composition with enhanced that control the gas channeling in carbonate naturally-fractured reservoirs with high-salinity and temperature conditions through the synergistic effect resulting from the supramolecular interaction of alpha olefin sulfonates of sodium with alkyl amido propyl betaines [structure (2)],

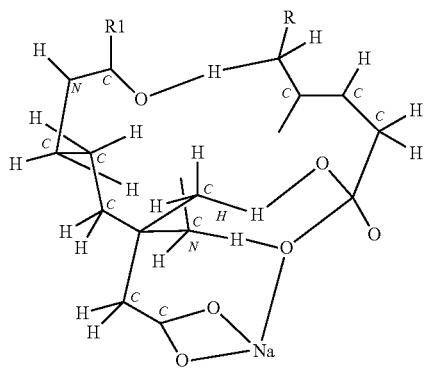
(2)

wherein R and R1 are independent alkyl chains linear or branched and whose length varies from 1 to 30 carbon atoms.

The Mexican MX 297,297 and U.S. Pat. No. 8,722,588 Patents, makes mention of supramolecular complexes resulting from alpha olefin sulfonates of sodium with alkyl amido propyl betaines interactions, can be combined with anionic surfactants, preferably of the type 3-hydroxy-alkyl sulfonate of sodium, with cationic surfactants of the type quaternary salts of alkyl ammonium, preferably of the type chloride or bromide of alkyl trimethyl ammonium, with sequestering of divalent ions, preferably oligomers or copolymers derived from itaconic acid and whose average molecular weight are in the range of 200 to 20,000 Daltons, with gels derived from polymers or copolymers selected from of the polyacrylamides group, partially hydrolyzed polyacrylamide, xanthan gum, poly (itaconic acid), poly (acrylic acid), poly (itaconic-co-acrylic-acid acid), poly (itaconates) and poly (acrylates). Also, in said patent it is indicated that the foaming compositions with enhanced stability possess applications in enhanced recovery process and/or production assurance. The patent makes no mention that the compositions have application as wettability modifiers, corrosion inhibitors or antiscale; or that are present in the same copolymers derived from itaconic acid/vinyl sodium sulfonate and/or terpolymers derived from itaconic acid/sodium vinyl sulfonate/ aconitic acid.

The Mexican patent application MX/a/2012/014187 (Composición espumante con propiedades modificadoras de la mojabilidad e inhibitorias de la corrosion para alta temperatura y ultra alta salinidad) is related to the collection and use of foaming compositions with modifying-wettability and corrosion-inhibitory properties that controlling the channeling of fluids in naturally fractured carbonate reservoirs, alter the rock wettability favorably in processes for enhanced crude oil recovery and control uniform corrosion problems that occur in production rigs under high temperature and ultra-high salinity conditions; by the synergistic effect resulting from the supramolecular interaction of alkyl amido propyl hydroxysultaines or alkyl hydroxysultaines with alkyl hydroxysulfonates of sodium and alkenyl sulphonates of sodium [structure (3)]. The foaming compositions with wettability modifying and corrosion inhibitory properties are characterized for being tolerant to high concentrations of divalent ions such as calcium, magnesium, strontium and barium and that for his application to the reservoir can be used as transport media sea water and/or congenital water characteristic of the reservoir. The patent application does not mention that the compositions have antiscale properties; or that, in the same are present cationic surfactants of the quaternary salts type of alkyl ammonium and/or copolymers derived from itaconic acid/sodium vinyl sulfonate and/or terpolymers derivatives of itaconic acid/sodium vinyl sulfonate/aconitic acid.

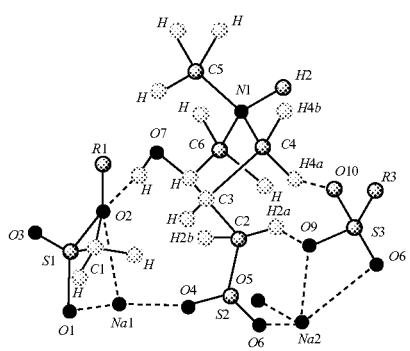

(3)

In the US Patent Application US 2007/0142235 A1 (Process for oil recovery using surfactant gels) a composition and process for recovering hydrocarbons are protected, this consist in inject an aqueous solution into a formation that containing hydrocarbon through one or more injection wells, displacing the solution into the formation and recovering the hydrocarbon through one or more producer wells. The aqueous solution contains one or more amphoteric surfactants of alkyl amido betaines type [structure (4)] to form a viscoelastic surfactant gel that can be reduce the interfacial tension and increase the viscosity of the injection fluid simultaneously in some oils and brine. The viscoelastic gels are tolerant to electrolytes and multivalent cations and are particularly useful into reservoirs that have of medium to high temperature, high salinity, high concentrations of divalent ions and low porosity. Inside of the application are mentioned that the composition for recovering hydrocarbons containing one or more amphoteric surfactants selected for their ability to low the interfacial tension and increase the viscosity simultaneously, in an aqueous medium, a secondary surfactant and optionally one or more polymers to provide viscosity residual. This patent application indicates that the secondary surfactant can be selected from the anionic, cationic or nonionic group and that the polymer that provides the residual viscosity is selected from the group polyacrylamide, partially hydrolyzed polyacrylamide, xanthan gum, hydroxyethyl cellulose or guar gum. Also, the patent application mentions that the combination of alkyl amido betaines with secondary surfactants of the linear type dodecyl benzene sodium sulfonatesulfonate and arylalkyl xylene sodium sulfonate reduces the interfacial tension and increases the viscosity of the system. The patent application does not mention that amphoteric surfactants are used based alkyl amido betaines and their mixtures for the foams generation, also it does not indicate that use mixtures of alkyl amido betaines and cationic surfactants of type quaternary salts of alkyl ammonium and/or copolymers derived from the itaconic acid/vinyl sodium sulfonate and/or terpolymers derived from itaconic acid/sodium vinyl sulphonate/aconitic acid.

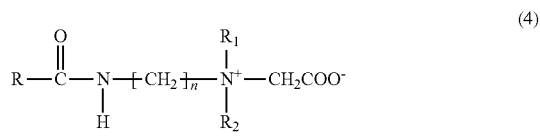

(4)

None of the aforementioned references it claims the development and use of multifunctional foaming compositions obtained from the combination of supramolecular complexes resulting from the interactions of alkyl amido propyl hydroxysultaines and/or alkyl amido propyl betaines and/or alkyl hydroxysultaines and/or alkyl betaines and anionic surfactants of type alkyl hydroxy sulphonates of sodium and/or alkenyl sulphonates of sodium, with cationic surfactants of the type halide of tetra-alkyl ammonium and copolymers derived from itaconic acid/vinyl sodium sulfonate and/or terpolymers derivatives of itaconic acid/sodium vinyl sulfonate/aconitic acid. Such multifunctional compositions are characterized by having high stability in environments of high temperature, high pressure and tolerance to high concentrations of divalent ions like calcium, magnesium, strontium and barium. It is therefore the object of the present invention to provide multifunctional foaming compositions with modifying wettability, uniform and localized corrosion inhibitory and inhibition/dispersion of mineral scales such as calcium carbonate and sulfates of calcium, barium and strontium; composed of supramolecular complexes resulting from interactions of alkyl amido propyl hydroxysultaines and/or alkyl amido propyl betaines and/or alkyl hydroxysultaines and/or alkyl betaines and anionic surfactants of type alkyl hydroxy sulphonates of sodium and alkenyl sulphonates of sodium, with cationic surfactants as tetra-alkyl ammonium halides and copolymers derived from itaconic acid/sodium vinyl sulfonate and/or terpolymers derived from itaconic acid/sodium vinyl sulphonate/aconitic acid. The present invention has the advantage that the generated compositions are multifunctional, control gas channeling in naturally fractured carbonate reservoirs under ultra-high salinity environments, high temperature and a high concentration of divalent ions; control scales problems of mineral salt that occur when the injection and formation water are combined that are incompatible; changing the rock wettability favorably in enhanced crude-oil recovery processes and control uniform corrosion problems in the production rig.

BRIEF DESCRIPTION OF THE DRAWINGS OF THE INVENTION

In order to have a better understanding about the multifunctional foaming composition with wettability modifying properties, corrosion inhibitory and inhibitory/dispersants of mineral scale for high temperature and ultra-high salinity of the present invention, then described briefly the contained on the accompanying drawings:

FIG. 1 shows a test system used in foam generation which consists of the following parts: gas cylinder (TG-1), foam generator tube (EPM-1), lance coupled to diffuser of 0.5μ (DF-1), flowmeter with a capacity of 0 to 150 cm³/min (R-1), thermal bath with recirculation (BTR-1), arrangement of valves for controlling the gas flow (VR-1, VP-1, VP-2, VR-2, VP-3, VP-4), temperature and pressure indicators (T-1, P-1 and P2).

FIG. 2 illustrates the behavior of the foam stability at 1 kg/cm$^2$ and 70° C. versus time, prepared with brine 1 described in Example 12 to 0.2 Wt % of: a) cocoamido propyl hydroxysultaine, b) Mixture of the 3-hidroxidodecan-1-sodium sulfonate and dodec-2-en-1-sulfonate of sodium, c) chloride of dodecyl trimethyl ammonium, d) cocoamido propyl betaine, e) dodecyl hidroxisutaine, f) dodecyl betaine, g) Chloride of hexadecyl trimethyl ammonium and f) foaming Composition 1.

FIG. 3 shows the behavior of the stabilities of the foams to 1 kg/cm$^2$ and 70° C. versus time, prepared with brine 1 described in Example 12 at the 0.2 Wt % of: a) cocoamido propyl hydroxysultaine, b) mixture of 3-hidroxidodecan-1-sodium sulfonate and dodec-2-en-1-sulfonate of sodium, c) chloride of dodecyl trimethyl ammonium, d) foaming composition described in the Mexican patent MX 297297, e) foaming composition described in patent Application Mx/a/2012/014187, f) foaming composition 1, g) foaming composition 2 and h) foaming composition 3.

FIG. 4 indicates the behavior of the foam stability at 1 kg/cm$^2$ and 70° C. versus time, prepared with brine 1 described in Example 12 at the 0.2 Wt %, with the foaming compositions 1 to 6 of the present invention.

FIG. 5 shows the behavior of the foam stability at 1 kg/cm$^2$ and 70° C. versus time, prepared with brine 1 described in Example 12 at the 0.2 Wt %, with the foaming compositions 7 to 10 of the present invention.

FIG. 6 exhibits the behavior of the stabilities of the foams to 1 kg/cm$^2$ and 70° C. versus time, prepared with the briens 2, 3 and 4 described in the example 14 and the foaming composition 1.

FIG. 7 shows the behavior of the stabilities of the foams to 1 Kg/cm$^2$ and 70° C. versus time, prepared with the briens 2, 3 and 4 described in example 14 and the foaming composition 2.

FIG. 8 shows the behavior of the stabilities of the foams to 1 kg/cm$^2$ and 70° C. versus time, prepared with the foaming composition 1 and brine 4 that as described in Example 14 and using nitrogen as gas, carbon dioxide and methane and the foaming composition 1.

FIG. 9 illustrates the behavior of the stabilities of the foams to 1 kg/cm$^2$ and 70° C. versus time, prepared with the foaming composition 2 and the brine 4 as is described in Example 14 and using nitrogen as gas, carbon dioxide and methane.

FIG. 10 shows the evaluation equipment of the foam stability under high pressure and high temperature conditions, where: 1) temperature controller, 2) BPR (back pressure regulator), 3) peephole, 4) filter. 5) cylinders of transfer 6) injection pumps, and 7) valves.

FIG. 11 shows the image sequence of the foam stability for the foaming composition 2, using the brine 3 whose composition are described in Example 14 at high pressure conditions and high temperature, where: 1) At the beginning of the test, 2) 1 h., 3) 18 hrs., 4) 24 hrs., 5) 36 hrs., 6) 72 hrs., 7) 77 hrs., 8) 98 hrs., 9) 120 hrs., 10) 125 hrs., 11) 135 hrs., 12) 142 hrs., 13) 148 hrs., 14) 167 hrs., 15) 181 hrs., 16) 185 hrs., 17) 190 hrs., 18) 192 hrs., 19) 195 hrs. and 20) 240 hrs.

FIG. 12 exhibits the behavior graph of the stability of the foam from the foaming composition of 2 to 3500 psi (246 Kg/cm$^2$) and 150° C. versus time, prepared with brine 3 described in Example 14.

FIG. 13 shows the graph of shear rate versus the shear stress for the foaming composition of 2 to 3500 psi (246 Kg/cm$^2$) and 150° C.

FIG. 14 displays the images of rock core with longitudinal court (fracture), where: a) top view, b) side view, c) longitudinal view.

Figure 18:
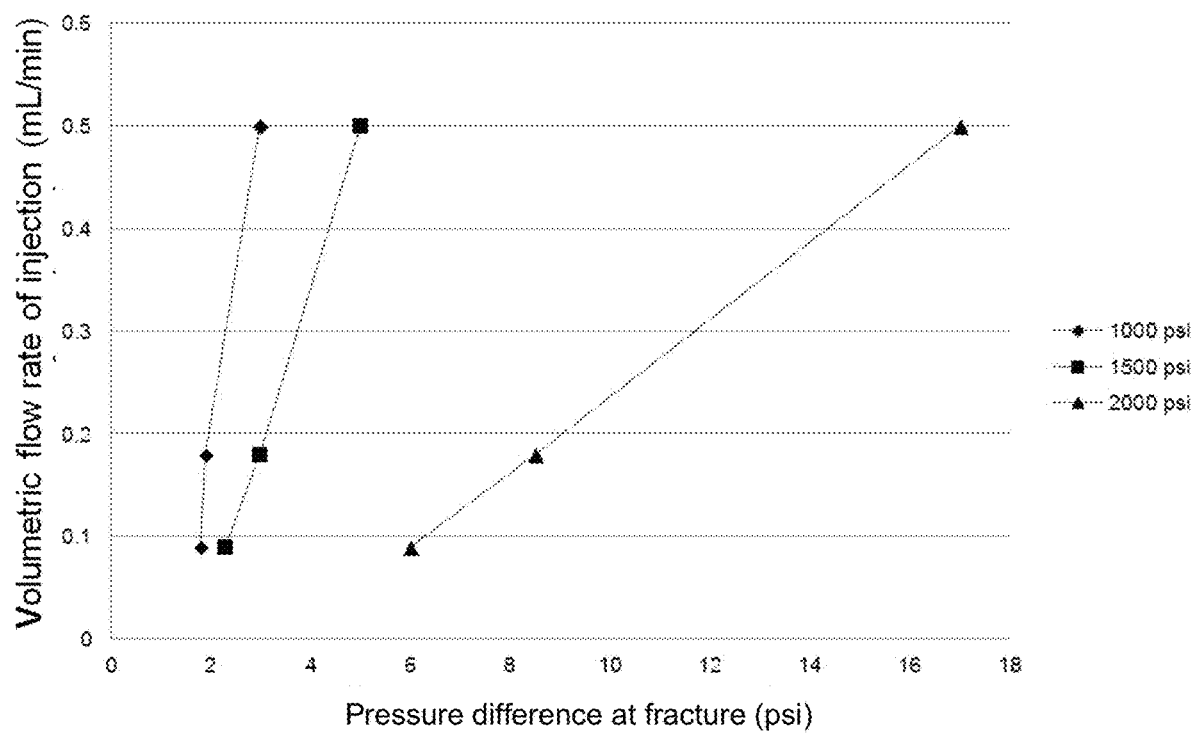

FIG. 18 exhibits the behavior of the pressure drop in the fracture to different flows of the foam produced from the foaming composition 2 and the confining pressures of 1000, 1500 and 2500 psi (70, 105 and 176 Kg/cm$^2$).

Figure 19:
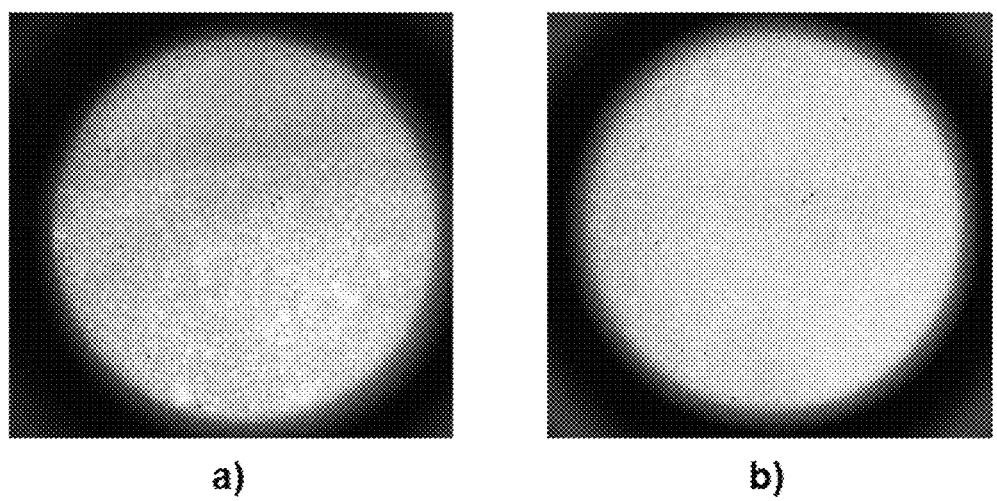

FIG. 19 shows images of the foams to different flows, a) 5 mL/min b) 10 mL/min.

Figure 20:
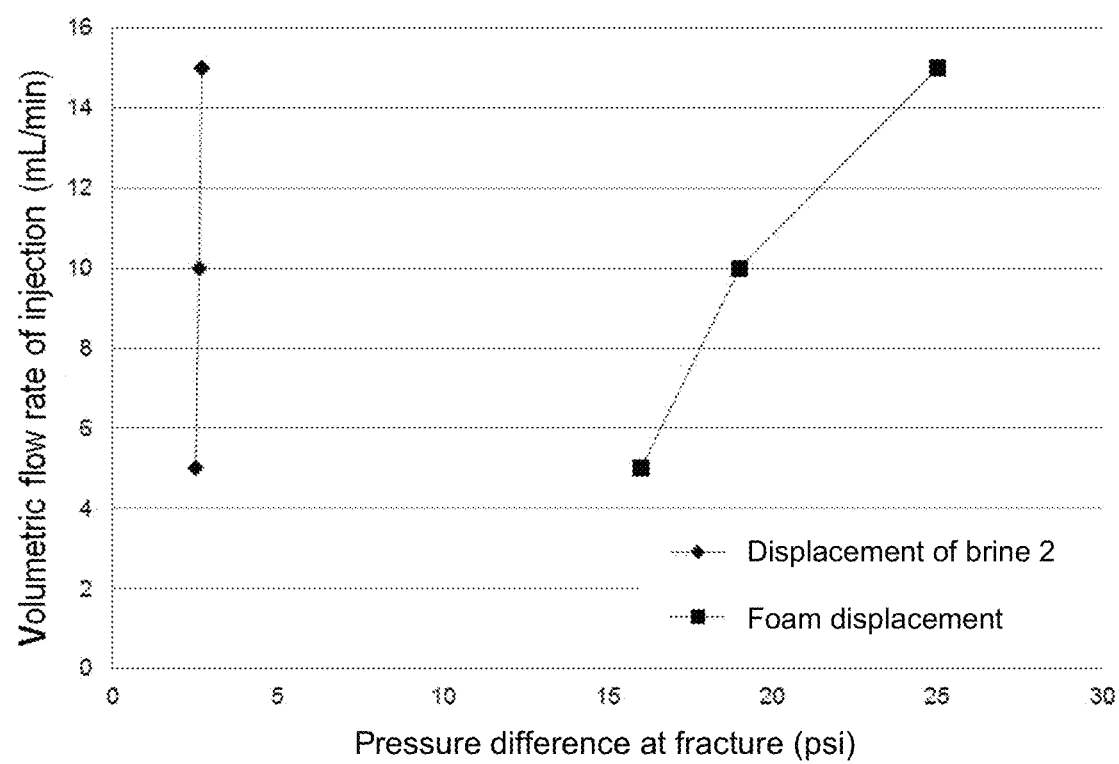

FIG. 20 refers to the behavior of the pressure drop to different nitrogen gas flow displacing formation water (brine 2) and foam formed with the foaming composition 2 to a confining pressure of 2500 psi (176 Kg/cm$^2$).

Figure 23:
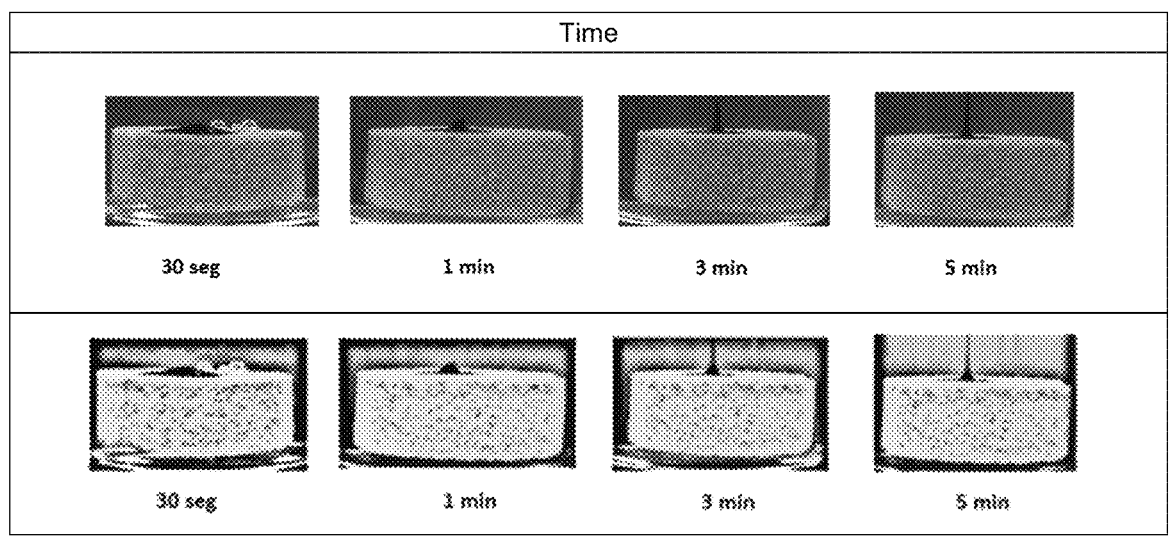

FIGS. 21, 22 and 23 show the results of the displacing of oil using the multifunctional foaming Composition 2 at different concentrations. Start of the first drop displacement to different concentrations of the multifunctional foaming composition 2.

FIG. 21 illustrates the start of the first drop displacement to different concentrations of the multifunctional foaming composition.

FIG. 22 are refers to the just moment before of the displacement of the oil drop at different concentrations of the multifunctional foaming composition 2.

FIG. 23 shows the sequence of pictures of the drops displacement of oil at different concentrations of the multifunctional foaming composition 2.

Figure 24:
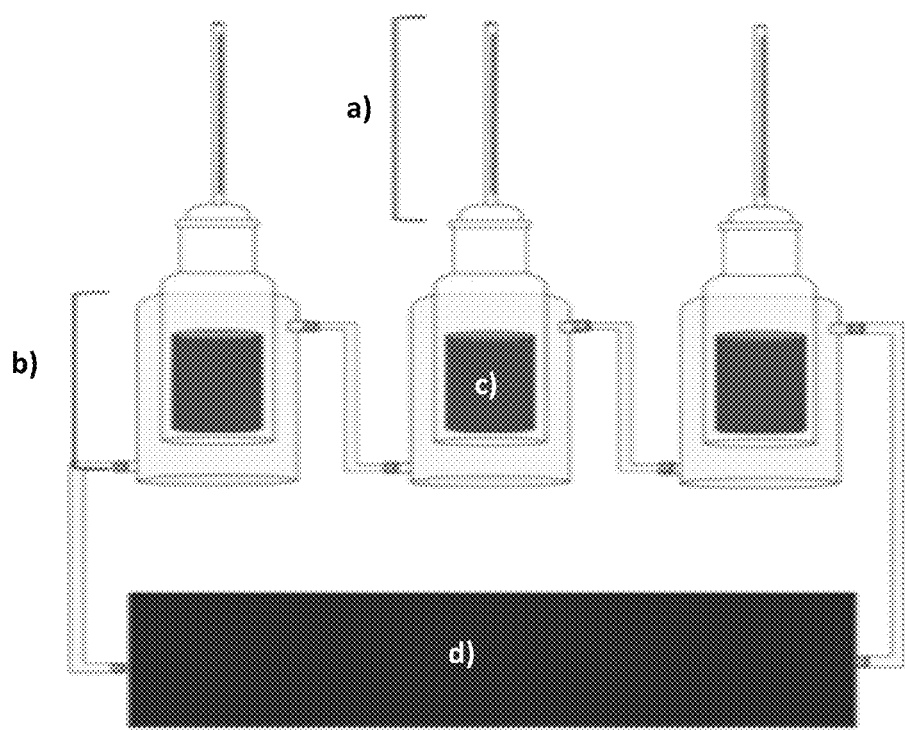

FIG. 24 shows the Amott cell system wherein: a) capillar where the oil production are observed, b) the glass body of the cell, c) rock core, and d) recirculating to maintain the temperature.

Figure 25:
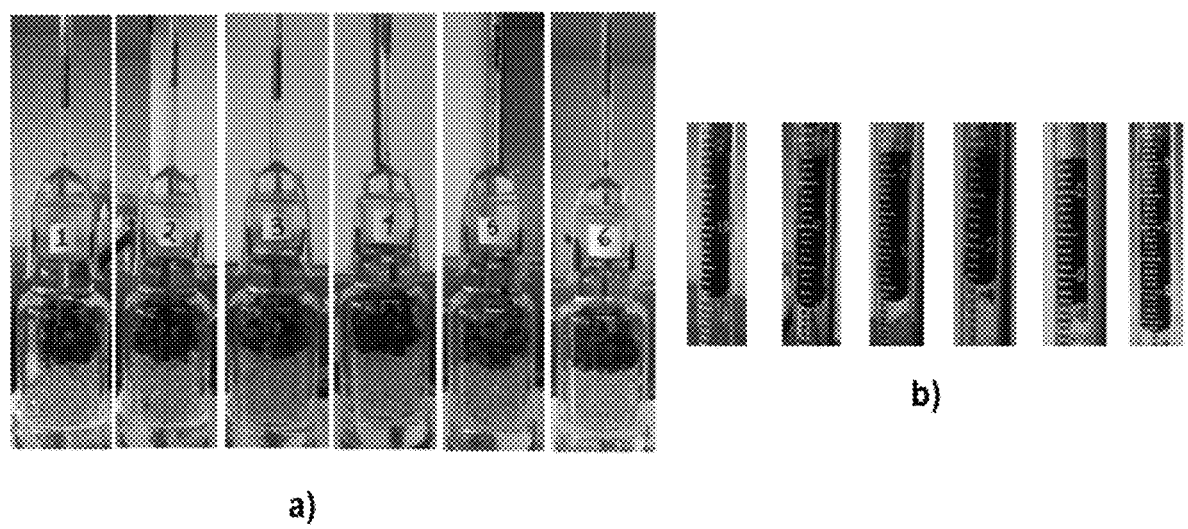

FIG. 25 displays: a) the system of Amott cells, and b) the recovering oil in Amott cells at 90° C., using foaming compositions.

Figure 26:
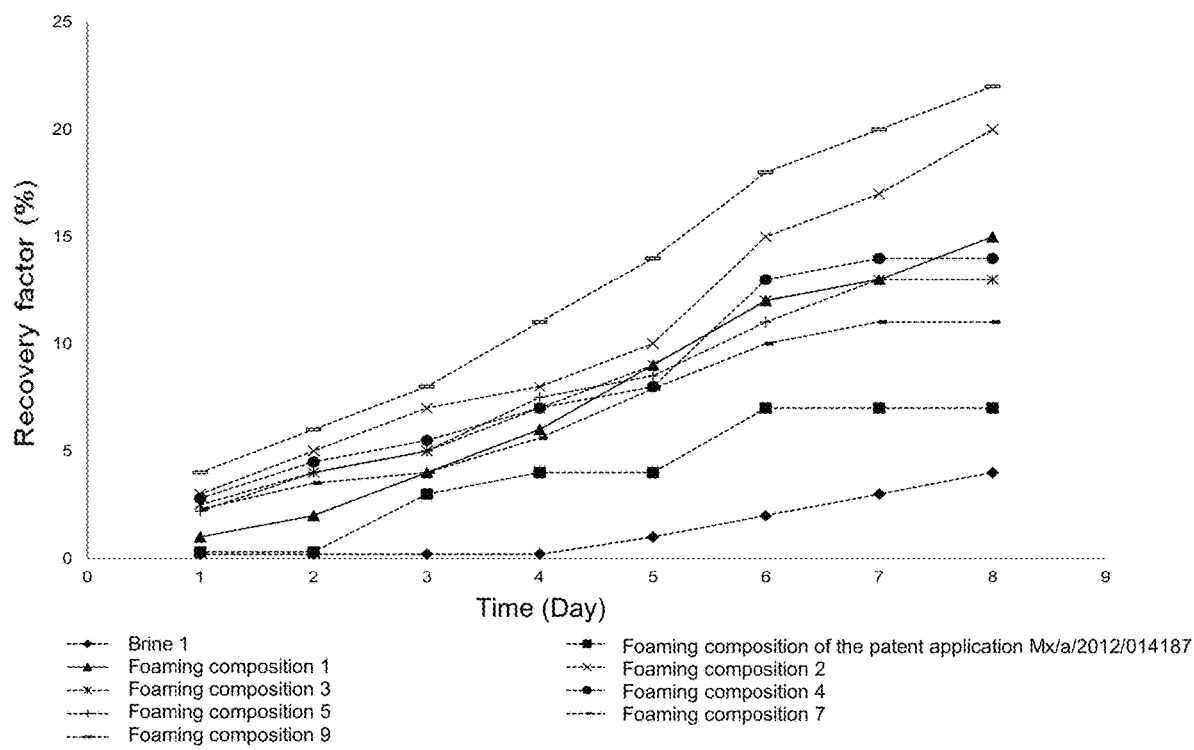

FIG. 26 shows the graph of the behavior of the recovery factor for the brine, the foaming composition of the Mexican patent application MX/a/2012/014187, foaming compositions 1 to 5, 7 and 9 of the present invention.

Figure 27:
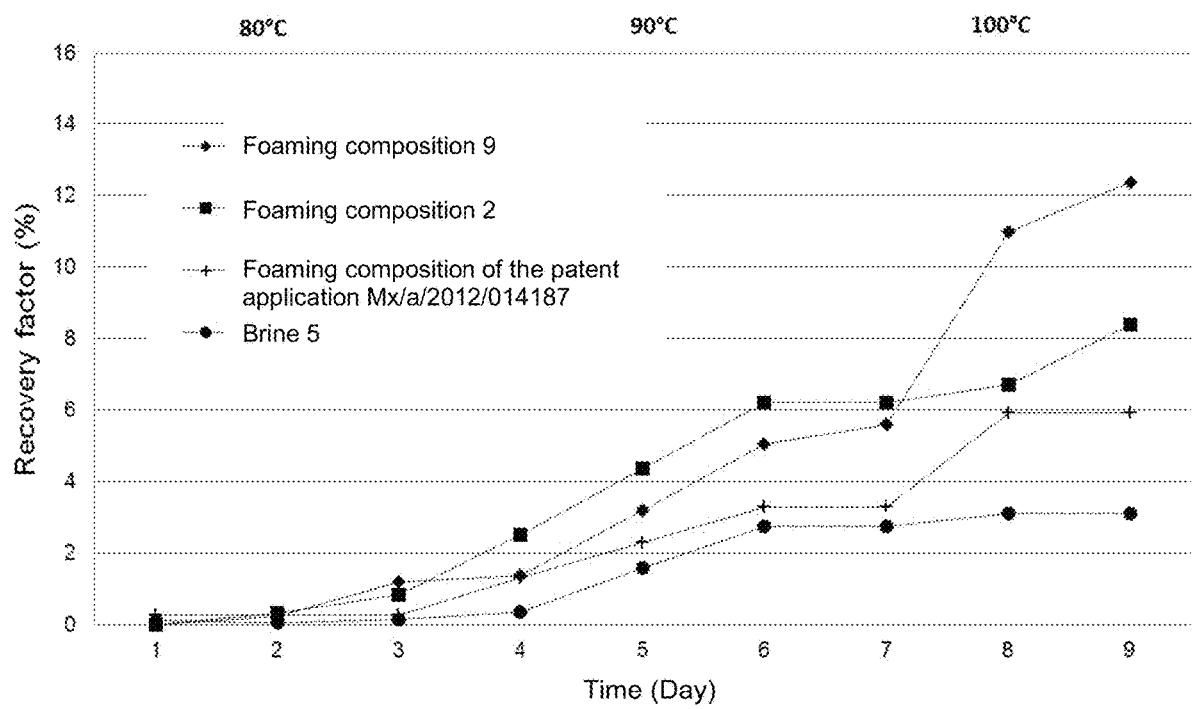

FIG. 27 illustrates the graph of the behavior of the recovery factor for the brine 5, the foaming composition of the patent application MX/a/2012/014187, and the foaming compositions 2 and 9 of the present invention.

Figure 28:
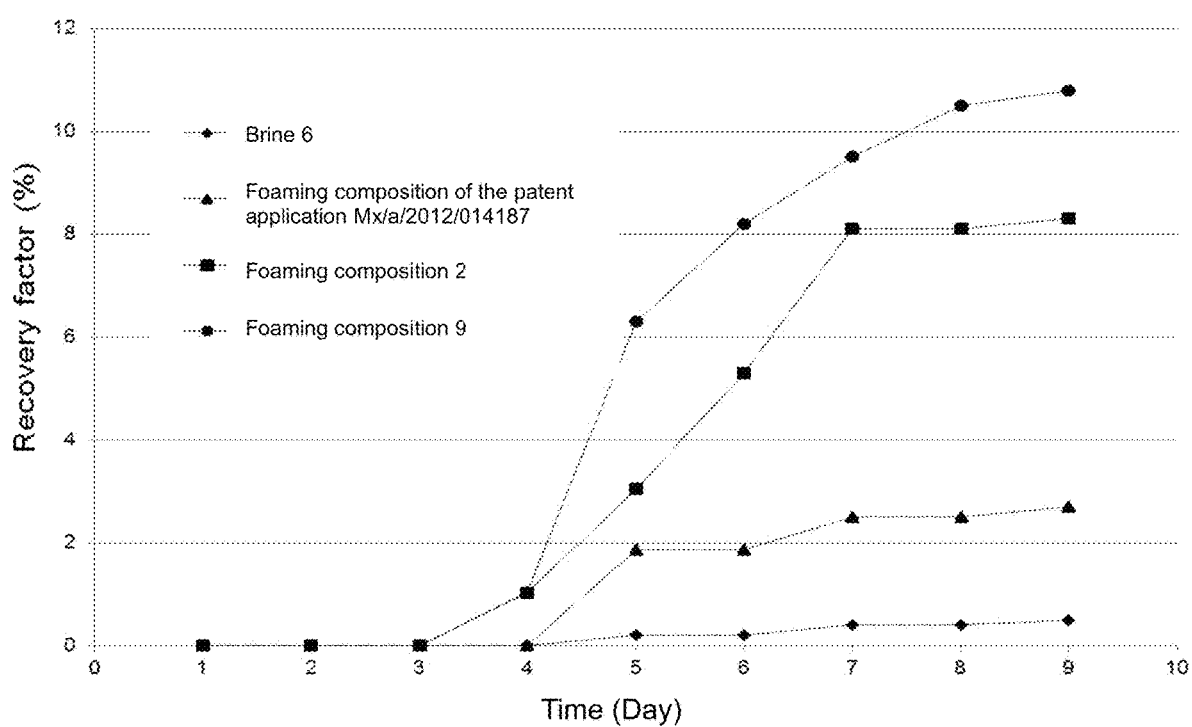

FIG. 28 shows the graph of the behavior of the recovery factor for the brine 6, the foaming composition of the patent application MX/a/2012/014187, and the foaming compositions 2 and 9 of the present invention.

Figure 29:
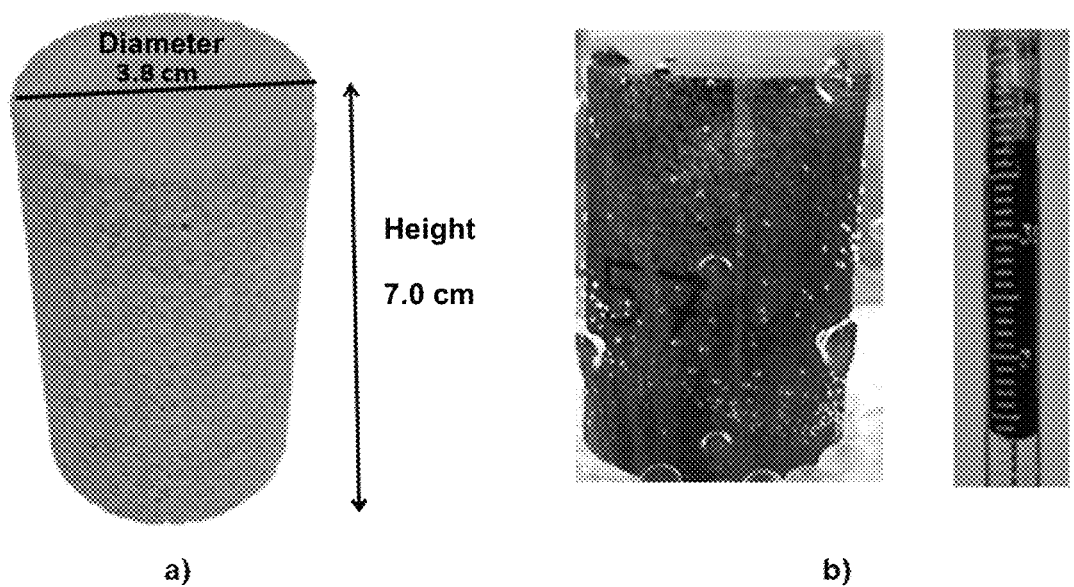

FIG. 29 shows: a) the clean limestone core, b) the limestone core after the test and the recovered oil.

Figure 30:
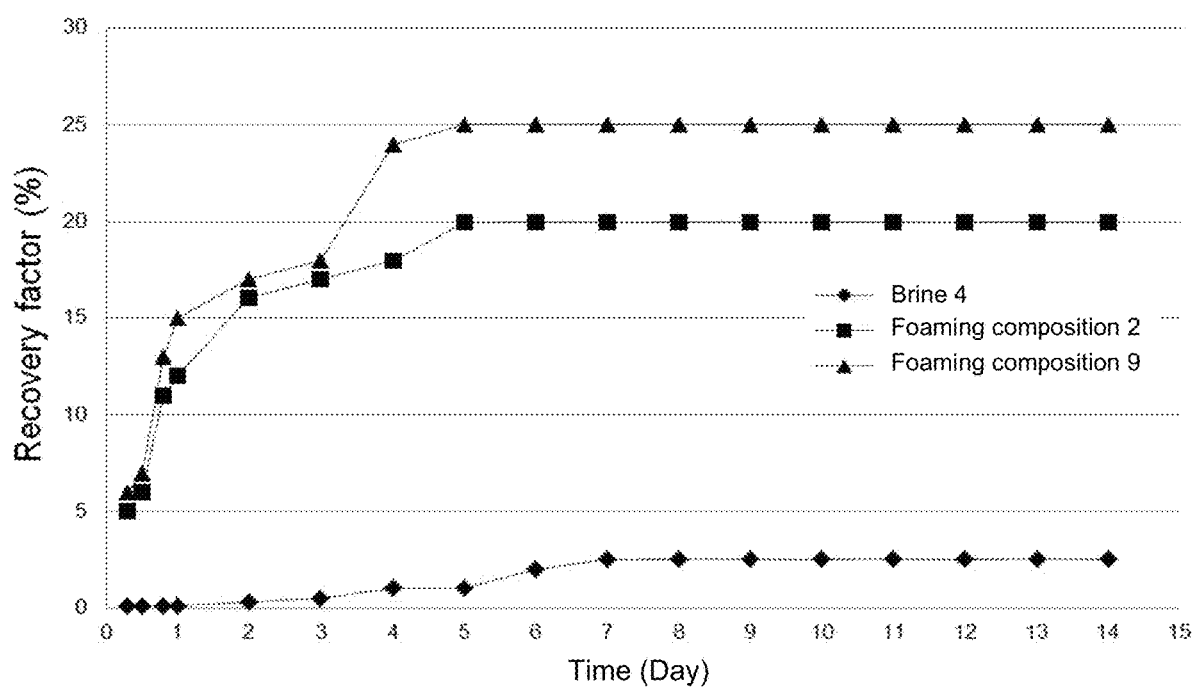

FIG. 30 shows the graph of the behavior of the recovery factor for the brine 4, the foaming composition of the patent application MX/a/2012/014187, and the foaming compositions 2 and 9 of the present invention.

Figure 31:
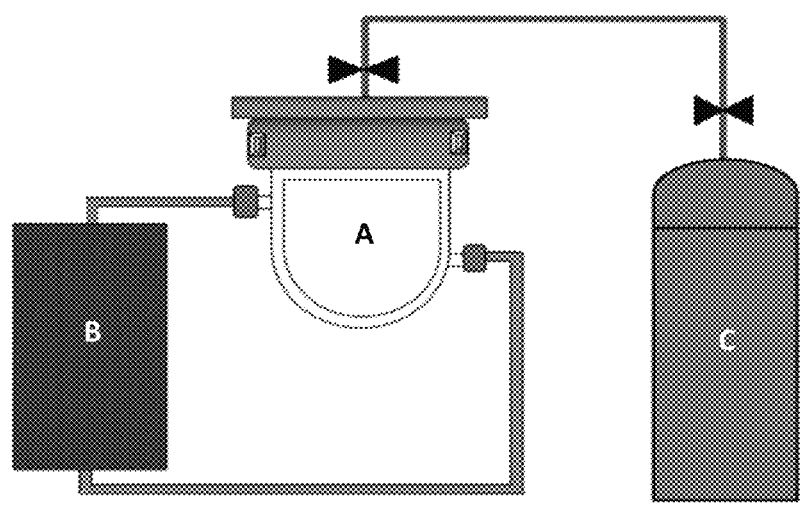

FIG. 31 shows the glass reactor used for imbibition process at high temperatures, where: a) glass reactor, b) recirculating for heating, c) gas cylinder for generates the system pressure.

FIG. 32 illustrates: a) recirculator for heating, b) manometer c) safety valve, d) gas inlet, e) glass container, f) reactor support, g) limestone core in the imbibition test to high temperature and displacement of oil at 150° C.

Figure 33:
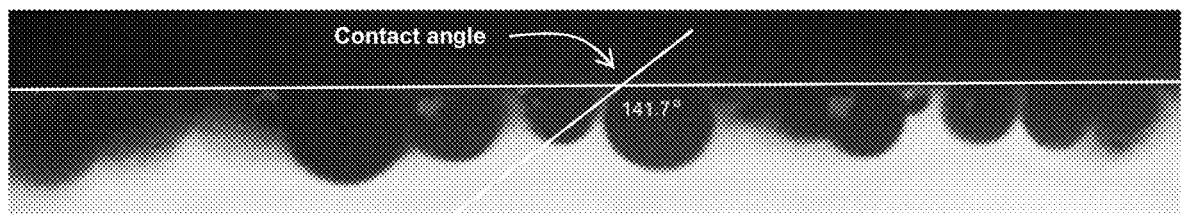

FIG. 33 displays the image of the contact angle change of high temperature and high pressure.

Figure 34:
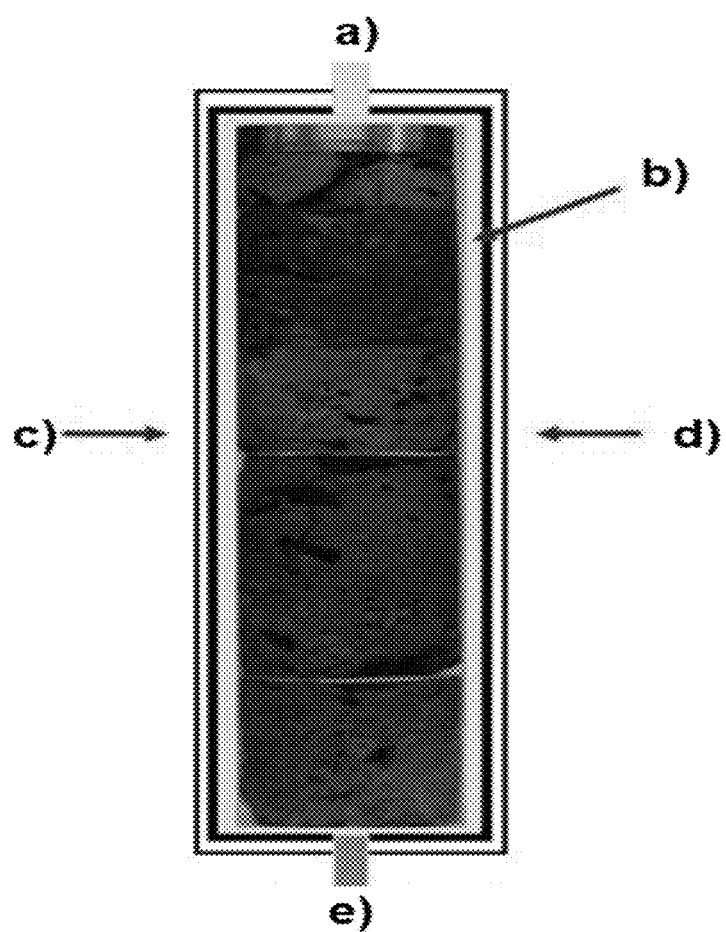

FIG. 34 shows the stacking of cores used in displacement test.

Figure 35:
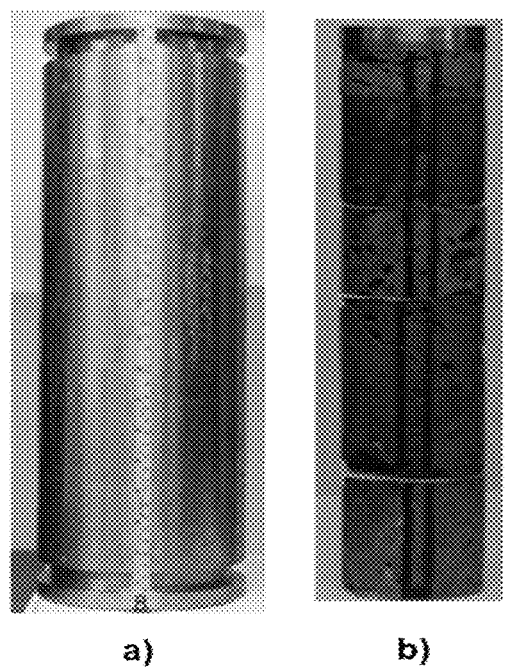

FIG. 35 presents the picture, where: a) high pressure cell and temperature and b) stacking of cores.

Figure 36:
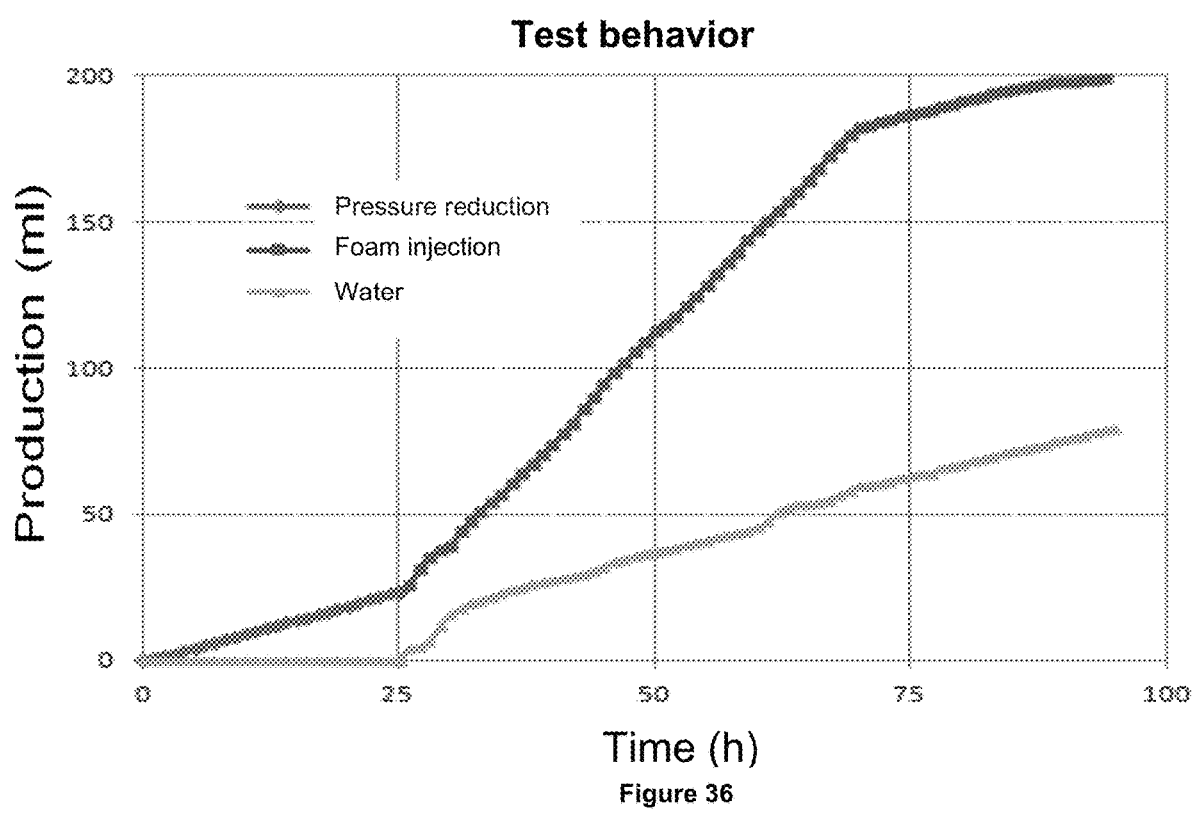

FIG. 36 shows a graph which showing the oil productions by pressure decrease.

Figure 37:
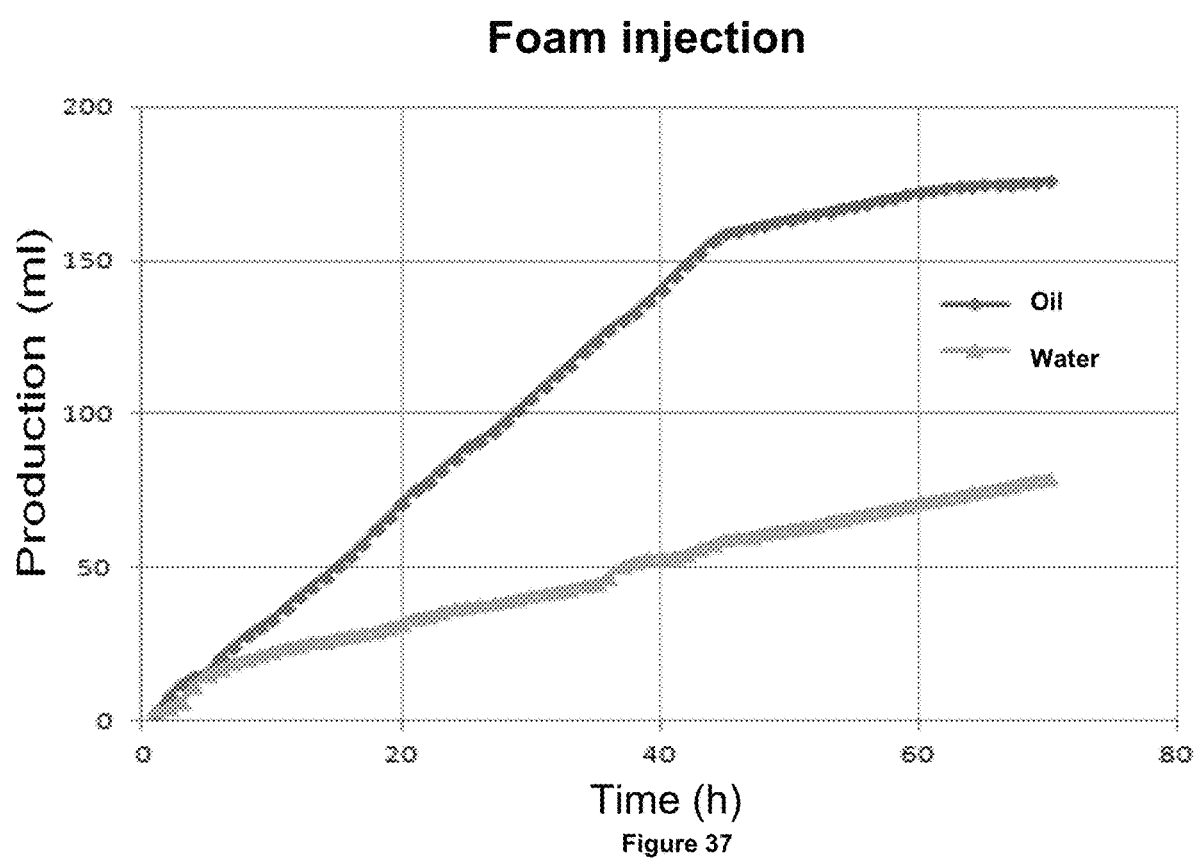

FIG. 37 shows a graph that showing the production of oil by the foam formed injection with the foaming composition 2.

Figure 38:
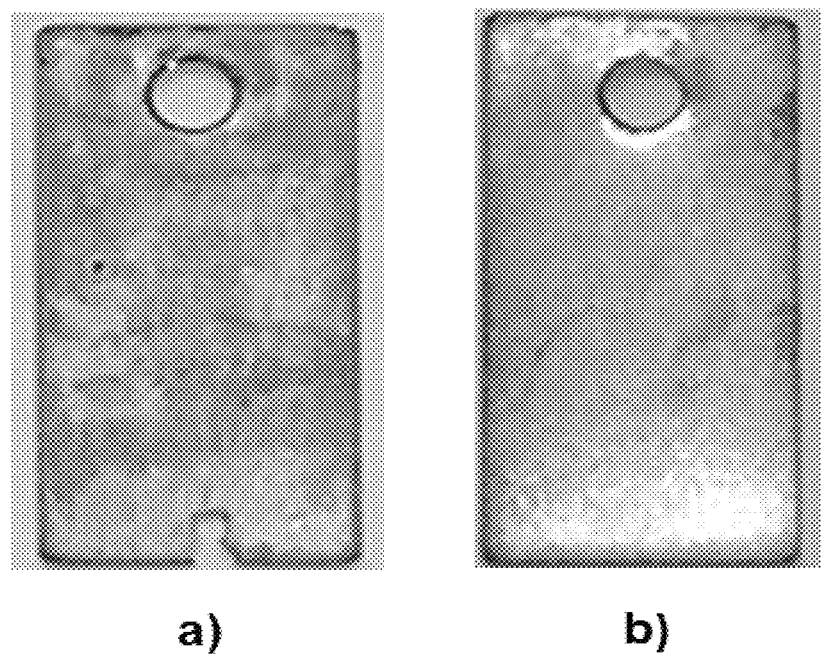

FIG. 38 shows the appearance of the metal coupons used in the dynamic wheel test, wherein: a) coupon exposed to the mixture of brine and b) coupon exposed to the foaming Composition 2.

Figure 39:
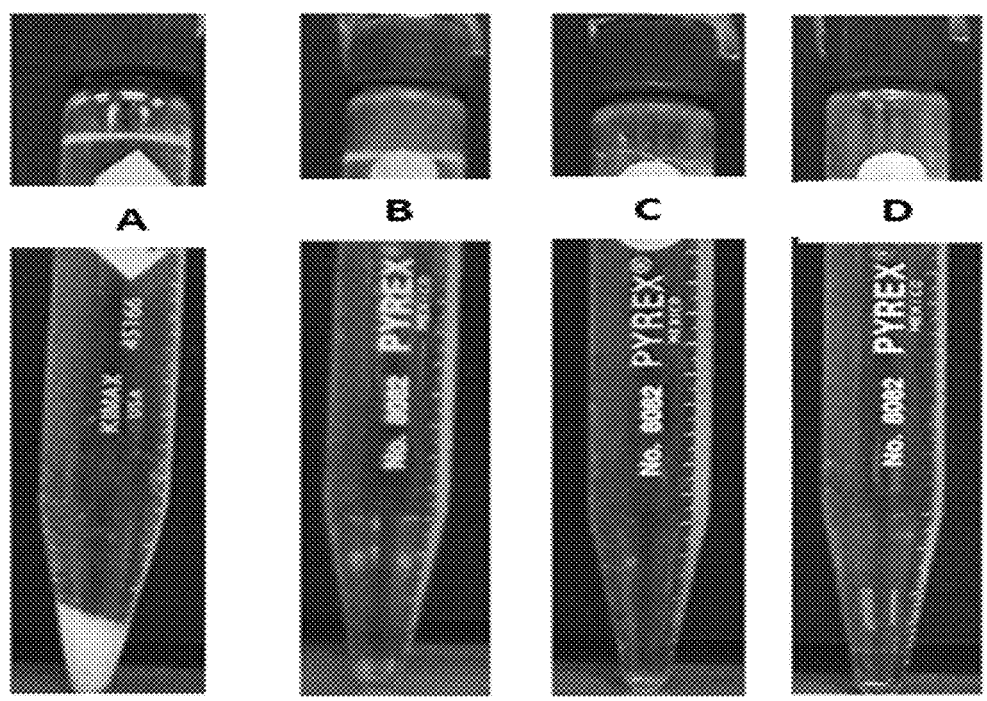

FIG. 39 shows the appearance of the vials with brine mixture that induce the crystals formation of calcium sulfate and that containing: a) crystals formed by mixing of brines, b) mixture of brine without crystal formation with the composition of foaming 1 c) brine mixture without crystals formation with the foaming composition 2 and d) brine mixture without crystals formation with the foaming composition 3.

FIG. 40 illustrates the high pressure and high temperature peepholes showing: a) Mixture of brine without chemical and at the start of the test, b) Crystals in the brine mixture without chemical at 3 hours after the test started, c) mixture of brines without chemical and at the start of the test, and d) brines mixture without crystals formation with the foaming composition 2 at 72 hours after the test started.

Figure 41:
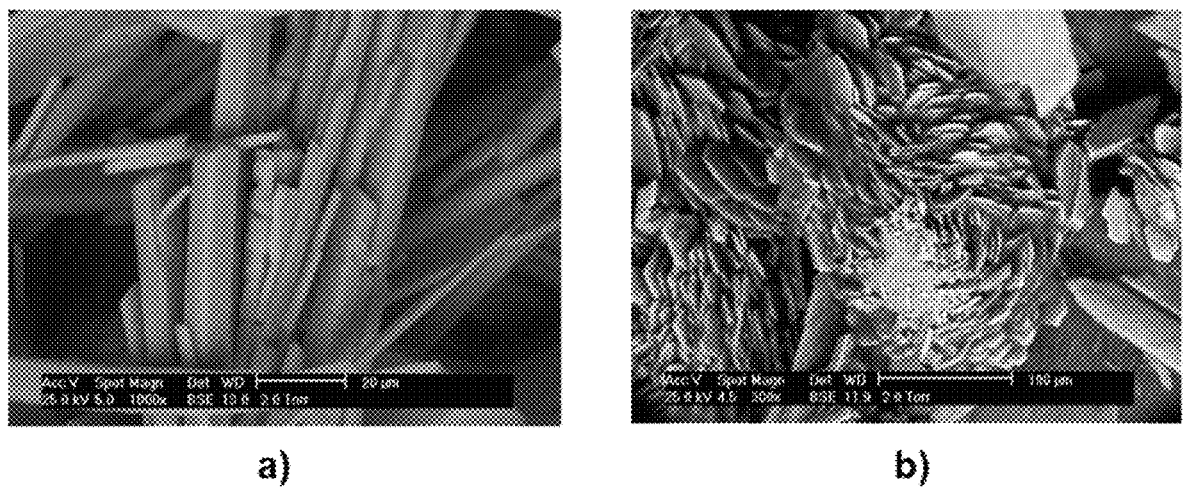

FIG. 41 displays the scanning electron microscopy images that showing: a) calcium sulfate crystals, b) distorted and fragmented crystals of calcium sulfate due to the foaming composition 2.

Figure 42:
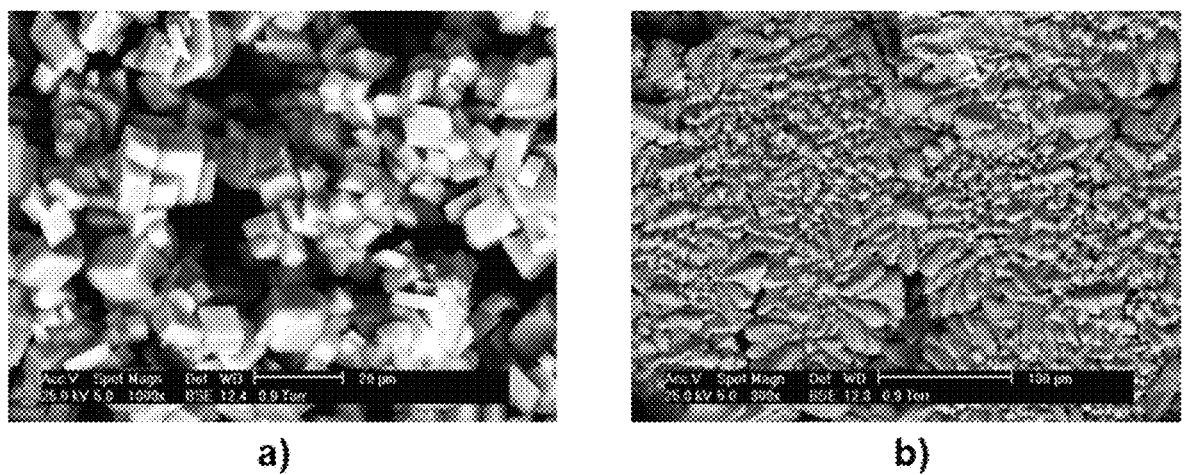

FIG. 42 shows the scanning electron microscopy images that showing: a) calcium carbonate crystals, and b) distorted and fragmented crystals of calcium carbonate due to the foaming composition 2.

DETAILED DESCRIPTION OF THE INVENTION

The present invention are relates to the obtaining and use of multifunctional foaming compositions that control gas channeling in naturally fractured carbonate reservoirs under high temperature and ultra-high salinity conditions, changing the rock wettability favorably in enhanced recovery processes, inhibit the uniform and localized corrosion of ferrous metals and inhibit and disperse scale of calcium carbonate and calcium sulfate, barium and strontium, these last the main causes of formation damage.

The multifunctional properties are generated by compositions that contains supramolecular complexes resulting from the interactions of alkyl amido propyl hydroxysultaines and/or alkyl amido propyl betaines and/or alkyl hydroxysultaines and anionic surfactants of the type alkyl hydroxy sulfonates of sodium and alkenyl sulfonates sodium, with cationic surfactants tetra-alkyl ammonium halydes and copolymers derivatives of itaconic acid/ sodium vinyl sulfonate and/or terpolymers derived from itaconic acid/sodium vinyl sulphonate/aconitic acid.

The multifunctional compositions of the present invention are characterized by having high stability in high-temperature, high pressure and possess tolerance to high concentrations of divalent ions like calcium, magnesium, strontium and barium.

For the development of the present invention, a process which consists of the following steps: 1) obtaining of multifunctional compositions, and 2) experimental evaluation of foam properties, wettability modifying, uniform and localized corrosion inhibitory and inhibition and dispersion of mineral scale as calcium carbonate, calcium sulfate, barium and strontium.

1) Obtaining multifunctional foaming compositions. The multifunctional foaming compositions of this invention are obtained by combining supramolecular complexes resulting from interactions of alkyl amido propyl hydroxysultaines and/or alkyl amido propyl betaines and/or alkyl hydroxysultaines and/or alkyl betaines and anionic surfactants of the type alkyl hydroxy sulphonates os sodium and alkenyl sulphonates of sodium, with cationic surfactants as tetraalkyl ammonium halides and copolymers derived from itaconic acid/vinyl sodium os sodium and/or terpolymers derived from itaconic acid/sodium vinyl sulphonate/aconitic acid, in different proportions. The following examples will be served to illustrate the preparation of the multifunctional foaming compositions, object of the present invention.

EXAMPLE 1

Obtaining of the multifunctional foaming composition 1 from the combination of supramolecular complexes derived from the interactions of coco-amido-propyl hydroxysultaine with 3-hidroxidodecan-1-sulfonate and dodec-2-en-1-sodium sulfonate with chloride of dodecyl trimethyl ammonium: Composition A, following the procedure described in Mexican patent application MX/a/2012/014187 (Composición espumante con propiedades modificadoras de la mojabilidad e inhibitorias de la corrosion para alta temperatura y ultra alta salinidad), are mixed at a temperature of 50° C. and atmospheric pressure in a two-necked round flask of 1000 ml, equipped with a magnetic stirrer and a thermometer, 160.6 g of distilled water with 250.0 g of an aqueous solution that contain 43.5 Wt % (0.278 mol) of coco-amido-propyl hydroxysultaine and 81.0 g of an aqueous solution containing 47.8 Wt % of a mixture of 3-hidroxidodecan-1-sodium sulfonate and dodec-2-en-1-sulfonate of sodium, and which is characterized by possess 47.4 Wt % (0.0636 mol) of 3-hidroxidodecan-1-sodium sulfonate and 52.6 Wt % (0.0753 mol) of dodec-2-en-1-sulfonate of sodium. The mixture is stirred for 3 hours to give rise to 490.7 g of the composition A, as a viscous amber-yellow liquid.

Composition B: Are mixed at room temperature and atmospheric pressure in a two-necked round flask of 250 ml, equipped with a magnetic stirrer and a thermometer, 39.86 g of an aqueous solution containing 37 Wt % (0.056 mol) of dodecyl trimethyl ammonium chloride with 50.39 g of an aqueous solution containing 43.5 Wt % (0.056 mol) of coco-amido-propyl hydroxysultaine and 32.01 g of distilled water.

The reaction mixtures are stirred for 30 minutes to give rise to 122.26 g of the B composition, as a slightly-viscous amber-yellow liquid. Finally, in a two-necked round flask of 1000 ml, equipped with a magnetic stirrer and a thermometer, are mixed 490.7 g of the composition A with 122.26 g of the composition B, at a temperature of 50° C. and atmospheric pressure with stirring for 3 hours to give rise to 614 g of the multifunctional foaming composition 1 as a viscous amber-yellow liquid containing 30 Wt % of active compound.

EXAMPLE 2

Obtaining the multifunctional foaming composition 2, from the combination of supramolecular complexes derived from the interactions of coco-amido-propyl hydroxysultaine with 3-hidroxidodecan-1-sodium sulfonate and dodec-2-en-1-sodium sulfonate with dodecyl trimethyl ammonium chloride and a copolymer derived from itaconic acid and vinyl sulfonate of sodium: In a two-necked round flask of 1000 ml, equipped with a magnetic stirrer and a thermometer, are mixed at a temperature of 50° C. and atmospheric pressure with continuous stirring of 614 g of the multifunctional foaming composition described in Example 1 with 34.2 g of an aqueous solution containing 50 Wt % of a copolymer derived from itaconic acid and vinyl sodium sulfonate and 22.8 g of distilled water. At the end of 1 hour of stirring, it was obtained 671 g of the multifunctional foaming composition 2 as a viscous amber-yellow liquid containing 30 Wt % of active product.

EXAMPLE 3

Obtaining the multifunctional foaming composition 3 from the combination of supramolecular complexes resulting from interactions of lauryl and myristyl amido-propyl betaines with 3-hidroxidodecan-1-sulfonate and dodec-2-en-1-sulfonate with hexadecyl trimethyl ammonium chloride and a copolymer derived from itaconic acid and sodium vinyl sulfonate:

Composition C: In a two-necked round flask of 1000 ml, equipped with a magnetic stirrer and a thermometer, were mixed at a temperature of 50° C. and atmospheric pressure with constant agitation, 146.6 g of distilled water, 361.2 g of an aqueous solution containing 32.70 Wt % of a mixture of lauryl and myristyl amido-propyl betaines and 192.2 g of an aqueous solution containing 47.8 Wt % of a mixture of 3-hidroxidodecan-1-sodium sulfonate and dodec-2-en-1-sulfonate of sodium, and which are characterized by possess 47.4 Wt % (0.0636 mol) of 3-hidroxidodecan-1-sodium sulfonate and 52.6 Wt % (0.0753 mol) of dodec-2-en-1-sulfonate sodium. The mixture is vigorously stirred for 3 hours to give rise to 700 g of C composition as a viscous amber-yellow liquid.

Composition D: Are mixed at room temperature and atmospheric pressure in a two-necked round flask of 250 ml, equipped with a magnetic stirrer and a thermometer, 81.5 g of an aqueous solution containing 30.4 Wt % (0.056 mol) of chloride of hexadecyl trimethyl ammonium with 84.8 g of an aqueous solution containing 32.7 Wt % of a mixture of lauryl and myristyl amido-propyl betaines and 8.64 g of distilled water. The reaction mixture is stirred for 30 minutes to give rise to 175 g of the D composition as a slightly-viscous amber-yellow liquid.

Finally, in a two-necked round flask of 1000 ml, equipped with a magnetic stirrer and a thermometer, are mixed at a temperature of 50° C. and an atmospheric pressure, 15.8 g of distilled water, 700 g of C composition, 175 g of D composition and 23.9 g of an aqueous solution containing 50 Wt % of a copolymer derived from sodium vinyl sulfonate and itaconic acid, with continuous stirring for 4 hours to give rise to 914.7 g of the multifunctional foaming composition 3 as a viscous amber-yellow liquid containing 30 Wt % of active product.

EXAMPLE 4

Obtaining of the multifunctional foaming composition 4, from the combination of supramolecular complexes resulting from the interactions of lauryl betaine, 3-hidroxidodecan-1-sodium sulfonate and dodec-2-en-1-sodium sulfonate with chloride of dodecyl trimethyl ammonia at a: two-necked round flask of 1000 ml, equipped with a magnetic stirrer and a thermometer, are mixed at a temperature of 48° C. and atmospheric pressure with continuous stirring, 67 g of distilled water, 350 g of an aqueous solution containing 30 Wt % of lauryl betaine and 112.9 g of an aqueous solution containing 47.8 Wt % of a mixture of 3-hidroxidodecan-1-sodium sulfonate and dodec-2-en-1-sulfonate of sodium, and which is characterized by possess 47.4 Wt % (0.0636 mol) of 3-hidroxidodecan-1-sodium sulfonate and 52.6 Wt % (0.0753 mol) of dodec-2-en-1-sulfonate of sodium.

The mixture is vigorously stirred for 3 hours to give rise to 529.9 g of a viscous amber-yellow liquid containing 30 Wt % of the E composition. On the other hand, gets ready a composition F, consisting of 53.3 g of an aqueous solution containing 37 Wt % of dodecyl trimethyl ammonium chloride with 67.6 g of an aqueous solution containing 30 Wt % of lauryl betaine and 12.4 g is of distilled water. The F composition was continuously stirred for 30 minutes to give rise to 133.4 g of a slightly-viscous amber-yellow liquid. Finally, in a two-necked round flask of 1000 ml, equipped with a magnetic stirrer and a thermometer, they are mixed at a temperature of 48° C., atmospheric pressure and continuous stirring, 529.9 g of E composition and 133.4 g of the F composition for 3 hours, to give rise to 663.3 g of the multifunctional foaming composition 4 as a viscous amber-yellow liquid containing 30 Wt % of active product.

EXAMPLE 5

Obtaining of the multifunctional foaming composition 5, from the combination of supramolecular complexes resulting from interactions of lauryl betaine with 3-hidroxidodecan-1-sodium sulfonate and dodec-2-en-1-sodium sulfonate with dodecyl trimethyl ammonium chloride and a copolymer derived from itaconic acid and sodium vinyl sulfonate: in a two-necked round flask of 1000 mL, equipped with a magnetic stirrer and a thermometer, are mixed at a temperature of 50° C. and an atmospheric pressure with constant agitation, 663.3 g of the product 4 described in Example 4, 36.9 g of an aqueous solution containing 50 Wt % of a copolymer derived from itaconic acid and sodium vinyl sulfonate and 24.6 g of distilled water to give rise to 724.9 g of the foaming composition multifunctional 5 as a viscous amber-yellow liquid containing 30 Wt % of active product.

EXAMPLE 5

Obtaining of the multifunctional foaming composition 6, from the combination of supramolecular complexes resulting from interactions of dodecyl hydroxy sultaine with 3-hidroxidodecan-1-sodium sulfonate and dodec-2-en-1-sodium sulfonate with dodecyl trimethyl ammonium chloride: In a two-necked round flask of 1000 ml, equipped with a magnetic stirrer and a thermometer, were mixed at a temperature of 48° C., atmospheric pressure and continuous stirring, 224.1 g of distilled water, 250 g of an aqueous solution containing 49 Wt % (0.380 mol) of dodecyl-hydroxysultaine with 110.9 g of an aqueous solution containing 47.8 Wt % of a mixture of 3-hidroxidodecan-1-sodium sulfonate and dodec-2-en-1-sulfonate of sodium, and which is characterized by possess 47.4 Wt % (0.087 mol) of 3-hidroxidodecan-1-sodium sulfonate and 52.6 Wt % (0.100 mol) of dodec-2-en-1-sulfonate of sodium. The mixture is vigorously stirred for 3 hours to give rise to 584.8 g of a viscous amber-yellow liquid containing 30 Wt % of the G composition. On the other hand, gets ready an H composition composed of 53.4 g of an aqueous solution containing 37 Wt % (0.075 mol) of dodecyl trimethyl ammonium chloride with 49.3 g of an aqueous solution containing 49 Wt % (0.075 mol) of dodecyl hydroxysultaine and 43.6 g of distilled water. The H composition is stirred for 30 minutes to give rise to 146.2 g of a slightly viscous liquid of amber color. Finally, in a two-necked round flask of 1000 ml, equipped with a magnetic stirrer and a thermometer, 584.8 g of the G composition are mixed with 146.2 g of the H composition, at a temperature of 50° C. and atmospheric pressure with stirring for 3 hours to give rise to 731 g of the foaming composition multifunctional 6 as a viscous amber-yellow liquid containing 30 Wt % of active product.

EXAMPLE 7

Obtaining of the multifunctional foaming composition 7, from the combination of supramolecular complexes resulting from the interactions of lauryl-hydroxy sultaine with 3-hidroxidodecan-1-sodium sulfonate and dodec-2-en-1-sodium sulfonate with dodecyl trimethyl ammonium chloride and a copolymer derived from itaconic acid and sodium vinyl sulfonate: In a two-necked round flask of 1000 ml, equipped with a magnetic stirrer and a thermometer, are mixed at a temperature of 50° C. and atmospheric pressure with continuous stirring, 731 g of product 6 described in Example 6, 40.7 g of an aqueous solution containing 50 Wt % of a copolymer derived from itaconic acid and sodium vinyl sulfonate and 27.3 g of distilled water to give rise to 799 g of the foaming composition multifunctional 7 as a viscous amber-yellow liquid containing 30 Wt % of active product.

EXAMPLE 8

Obtaining the multifunctional foaming composition 8, from the combination of supramolecular complexes derivatives from the interactions of coco-amido-propyl hydroxy-sultaine with 3-hidroxidodecan-1-sulfonate and dodec-2-en-1-sodium sulfonate with dodecyl trimethyl ammonium chloride and a zwitterionic germinal liquid linear type bis beta-N-alkenyl-N-polyether beta amino acid derived of the oleyl amine: In a two-necked round flask of 1000 ml, equipped with a magnetic stirrer and a thermometer, are mixed at a temperature of 50° C. and atmospheric pressure with continuous stirring, 614 g of the product 1 described in Example 1, 27.3 g of an aqueous solution containing 30 Wt % of a zwitterionic germinal liquid linear type bis-N-alkenyl-N-polyether beta amino acid derived of the oleylamine to give rise to 641.3 g of the foaming composition multifunctional 8 as a viscous amber-yellow liquid containing 30 Wt % of active product.

EXAMPLE 9

Obtaining of the multifunctional foaming composition 9, from the combination of supramolecular complexes derivatives from the interactions of coco-amido-propyl hydroxy-sultaine with 3-hidroxidodecan-1-sodium sulfonate and dodec-2-en-1-sodium sulfonate with dodecyl trimethyl ammonium chloride, a copolymer derived from the itaconic acid and vinyl sodium sulfonate and a zwitterionic geminal liquid linear type bis-N-alkenyl-N-polyether beta amino acid derivative of the oleylamine: in a two-necked round flask of 1000 ml, equipped with a magnetic stirrer and a thermometer, are mixed at a temperature of 50° C. and atmospheric pressure with continuous stirring, 671 g of the composition described in Example 2, 29.4 g of an aqueous solution containing 30 Wt % of a zwitterionic geminal liquid linear type bis-N-alkenyl-N-polyether beta amino acid derivative of oleylamine to give rise to 770.4 g of the foaming composition multifunctional 9 as a viscous amber-yellow liquid containing 30 Wt % of active product.

EXAMPLE 10

Obtaining of the multifunctional foaming composition 10, from the combination of supramolecular complexes derivatives from the interactions of coco-amido-propyl hydroxy-sultaine with 3-hidroxidodecan-1-sodium sulfonate and dodec-2-en-1-sodium sulfonate with dodecyl trimethyl ammonium chloride and a terpolymer derived from itaconic acid/sodium vinyl sulfonate/aconitic acid: In a two-necked round flask of 1000 ml, equipped with a magnetic stirrer and a thermometer, are mixed at a temperature of 50° C. and atmospheric pressure with continuous stirring, 614 g of the composition described in Example 1, 57 g of an aqueous solution containing 30 Wt % of a terpolymer derivative of itaconic acid/sodium vinyl sulfonate/aconitic acid to give rise to 671 g of the multifunctional foaming composition 10 as a viscous amber-yellow liquid containing 30 Wt % of active product.

Figure 1:
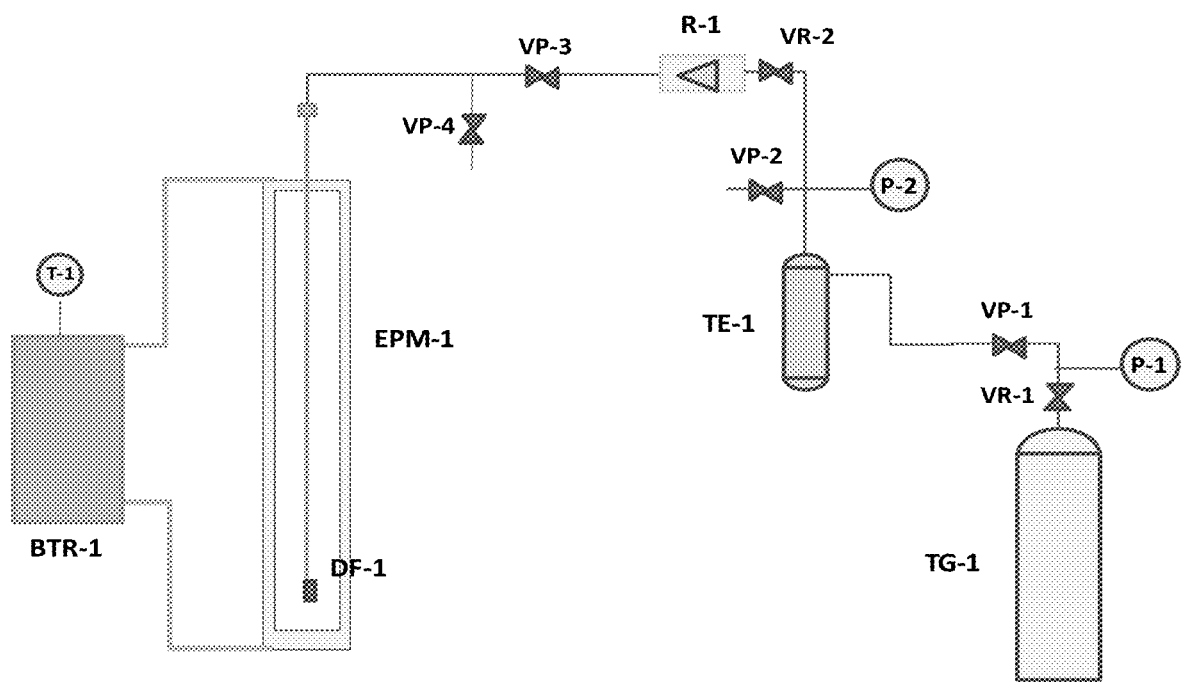

2) Experimental evaluation of foam, wettability modifying, adsorption, inhibitory uniform and localized corrosion properties and inhibition/dispersion of mineral scale of calcium carbonate, calcium sulfate, barium and strontium:

I) Evaluation of the foaming properties: The evaluation of the foam ability of the foaming compositions multifunctional generated from the combination of supramolecular complexes derivatives from the interactions of alkyl amido propyl hydroxysultaines and/or alkyl amido propyl betaines and/or alkyl hydroxysultaines and/or alkyl betaines with anionic surfactants of the type alkyl hydroxy sulphonates of sodium and alkenyl sulphonates of sodium, with cationic surfactants as tetra-alkyl ammonium halides and copolymers derived from itaconic acid/vinyl sulfonate sodium and/or terpolymers derived from itaconic acid/vinyl sulfonate sodium/aconitic acid, object of the present invention was performed through three different tests: a) Measurement of the foam stability to atmospheric pressure conditions, b) Measurement of the foam stability in conditions of high pressure and high temperature, c) Determination of rheological behavior in a capillary rheometer at reservoir conditions, and d) Determination blocking factor.

a) Measurement of the foam stability at atmospheric pressure conditions. The foam generation system at atmospheric pressure, which was used, is a modification of the system described in the Mexican patent MX 297297 and is designed to evaluate the stability of foams generated by surfactants at temperatures of up to 70° C. and it is shown in FIG. 1. The foaming system consists of three subsystems, the first are composed by the foam generator body formed by two concentric glass tubes. The outer tube is 1.35 m of high with a diameter of 0.0762 m and the inner tube has a height of 1.15 m, with a diameter of 0.0508 m. In the inner tube is loaded the solution to evaluate (brine plus chemical) and is carried out the generation and confinement of the foam. Whereas the outer tube has the function of contain the heating liquid, whereby the test temperature is controlled. The second subsystem is the one that controls the gas flow and consists of a storage tank, whereby, are regulate the discharge pressure of the gas and a second tank of stabilization of smaller dimensions whose function is precisely to contribute to the regulation of gas flow and prevent the condensate skidding. In the gas line it is has an array of three valves to control the direction and magnitude of the gas flow, the first is a venting valve connected to the stabilizing tank, then is counted has a bypass valve, that allows the gas supply into a calibrated flowmeter (maximum flow of 3 SFC/h) and finally a three-way valve used to control the flow of gas into the body of foam generator as well as opening system to the atmosphere. At the end of this subsystem, It has a stretch of stainless steel tubing or lance in which lower end it is attached a disperser- or diffuser-sintered (which may be of glass or steel), through which the gas is injected the liquid phase in order to evenly distribute the gas flow and achieve a monodisperse foam texture. Finally the third subsystem is the temperature control which is made in the annular space through an oil-heating flow, controlled by a heat bath of digital recirculation. To carry out the measurement of foam stability and foaming capability, a process consisting of 18 stages was developed and are described below: 1) Prepare the study solution to the required concentration for the analysis; 2) Check the cleanliness of the inner glass tube; 3) Turn on the thermal bath and fix a temperature of 70° C. (the process takes about 1 hour); 4) Open the gas valve of the tank; 5) vent valves both from the gas tank as well as the foam generator; 6) Ensure that the pressure is at 50 psi (3.5 Kg/cm$^2$); 7) Inject 60 ml of the solution to be tested via syringe and a hose; 8) Introduce and center the steel spear and leave for 10 minutes to homogenize the temperature in the spear; 9) Connect the gas line to the spears; 10) Place a heating band at the top of foam generator in to the order of avoid the vapors condensation; 11) Record the initial height of the liquid; 12) Open the gas shutoff valve; 13) Open the rotameter and control the flow to reaching 50 psi and keep it; 14) Start the timer as soon as the first gas bubble appears in the fluid; 15) After 45 seconds to shut off the gas valve, open the gas venting valve and measuring the foam- and liquid-height (maximum height) and as well as reset the timer; 16) take measurements of the heights of the foam and the liquid every minute for 10 minutes to determine the speed of drain and foam quality; 17) Record the heights of the foam and liquid every 10 minutes until the foam height reaches 30% of the maximum height and 18) Determine the percentage of the foam stability each time and on this basis build a diagram foam stability over time. The foam stability is defined as the change in initial foam height versus time and is determined according to Equations 1 and 2.

$$H_t - H_L = H_e \quad \text{Equation 1}$$

where:

$H_e$=Foam height.

$H_L$=solution height.

$H_t$=total height of experiment

The experiment was terminated when 30% of the foam stability is reached.

The calculation for the foam stability is as follows:

$$\frac{H_e}{H_{eMAX}} \times 100 = E \quad \text{Equation 2}$$

were:

$H_e$=Foam height.

$H_{eMAX}$=maximum height of the foam.

E=foam stability.

where $H_{eMAX}$ is the $H_e$ calculated at 45 seconds of the experiment.

In order to demonstrate that the foaming compositions of the present invention possess great advantages over components used as raw materials for formation, it was determined the foam stability generated by: coco amido propyl hydroxysultaine, mixture of 3-hidroxidodecan-1 sodium sulfonate and dodec-2-en-1-sodium sulfonate, dodecyl trimethyl ammonium chloride, cocoamido propyl betaine, dodecyl hidroxisultaine, dodecyl betaine and hexadecyl trimethyl ammonium chloride and the results were compared with the multifunctional foaming composition 1 of the present invention.

EXAMPLE 11

Figure 2:
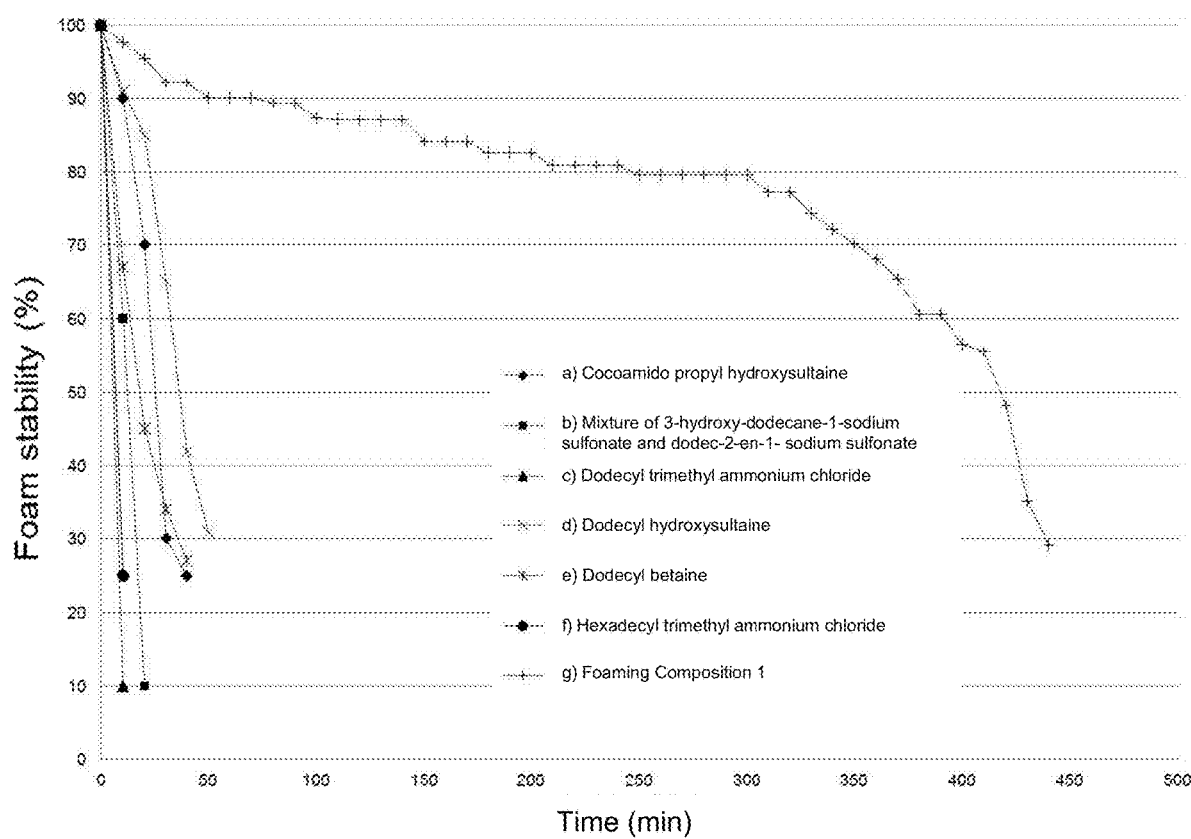

Determination the foam stability generated by: a) cocoamido propyl hydroxysultaine, b) mixture of 3-hidroxidodecan-1-sodium sulfonate and dodec-2-en-1-sodium sulfonate, c) dodecyl trimethyl ammonium chloride, d) cocoamido propyl betaine, e) dodecyl hidroxisultaine, f) dodecyl betaine, g) hexadecyl trimethyl ammonium chloride, h) multifunctional foaming composition 1. The stability of the generated foam by the commercial surfactant and the foaming composition 1 was evaluated through the foaming test at atmospheric pressure, at a temperature of 70° C. using brine 1 containing 32804 ppm of total dissolved solids, of the which they corresponded to 1736 ppm corresponding to divalent ions (calcium and magnesium), 6420 ppm as a total hardness of $CaCO_3$ and a concentration of the commercials surfactants and the foaming composition 1 in 0.2 Wt %. To Form all the foams nitrogen gas ($N_2$) was used. In Table 1 are show the composition of the brine 1, used to dilute the commercial surfactants and the multifunctional foaming composition 1. The time set for obtain each parameter (foam- and liquid-height) was 45 s and the minimum percentage of foam stability recorded was 30%. In the FIG. 2 are observed the behavior of the foams stability to 1 kg/cm$^2$ and 70° C. versus time, prepared with brine 1 to 0.2 Wt % of the commercial surfactant and the multifunctional foaming composition 1. In this graph are shows that the minimum stability at 30% is achieved for commercial surfactant in the range of 10 to 50 min, while for the foaming composition 1 are reached to about 440 min. The above evidence the technical advantage of the multifunctional foaming composition 1 with respect to commercial surfactants.

TABLE 1

| Compositions of Brine 1. | |
|---|---|
| | Brine 1 mg/L |
| Cations | |
| Sodium | 11742.1 |
| Calcium | 448 |
| Magnesium | 1288.4 |

TABLE 1-continued

Compositions of Brine 1.

|  | Brine 1 mg/L |
|---|---|
| Anions | |
| Chlorides | 19900 |
| Sulfates | 3650 |
| Carbonates | 13.2 |
| Bicarbonates | 84.2 |
| Total hardness as $CaCO_3$ | 6420 |
| Salinity as NaCl | 32803.9 |

In order to demonstrate that the foaming compositions of the present invention, possess considerable advantages on the components used as raw materials for its formation as well as of agents reported in other patents, it carried out his evaluation and it was compared the results with the multifunctional foaming compositions of the present invention.

EXAMPLE 12

Figure 3:
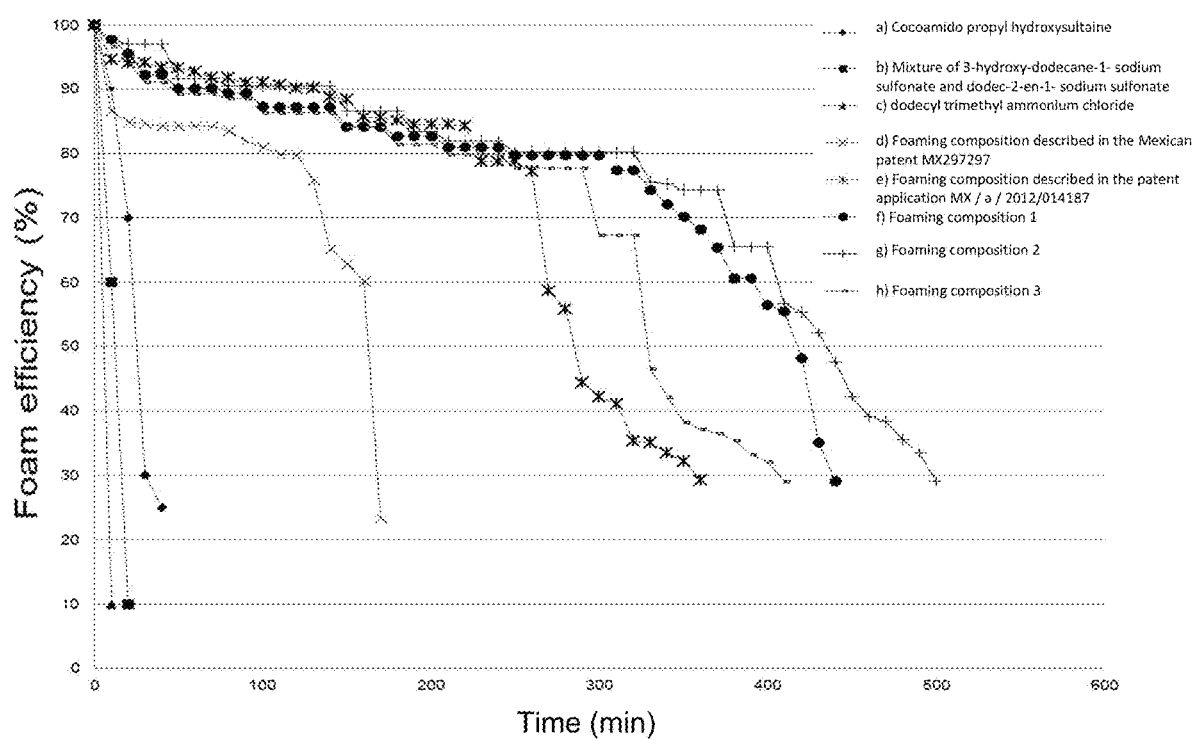

Determination of the stability of foams generated with brine 1 and nitrogen for: a) cocoamido propyl hydroxysultaine, b) mixture of 3-hidroxidodecan-1-sodium sulfonate and dodec-2-en-1-sodium sulfonate, c) dodecyl trimethyl ammonium chloride, d) foaming composition described in Mexican patent MX 297297, e) foaming composition described in the patent application MX/a/2012/014187, f) multifunctional foaming composition 1, g) multifunctional foaming composition 2 and h) multifunctional foaming composition 3. The obtained results of foams stability in the foaming test at atmospheric pressure and a concentration of 0.2 Wt % showing in FIG. 3. The analysis of results shows that the minimum stability of 30% for the multifunctional foaming composition 1, 2 and 3 is achieved in times of 440, 500 and 400 minutes respectively. The above, indicates that the stability of the foams generated by the compositions of the present invention exceed by more than 10 times to those generated from commercial surfactants, in more than 2 times to the foaming composition of the MX Patent 297297 and in more than 80 minutes to the foaming composition of the foaming application MX/a/2012/014187.

EXAMPLE 13

Figure 4:
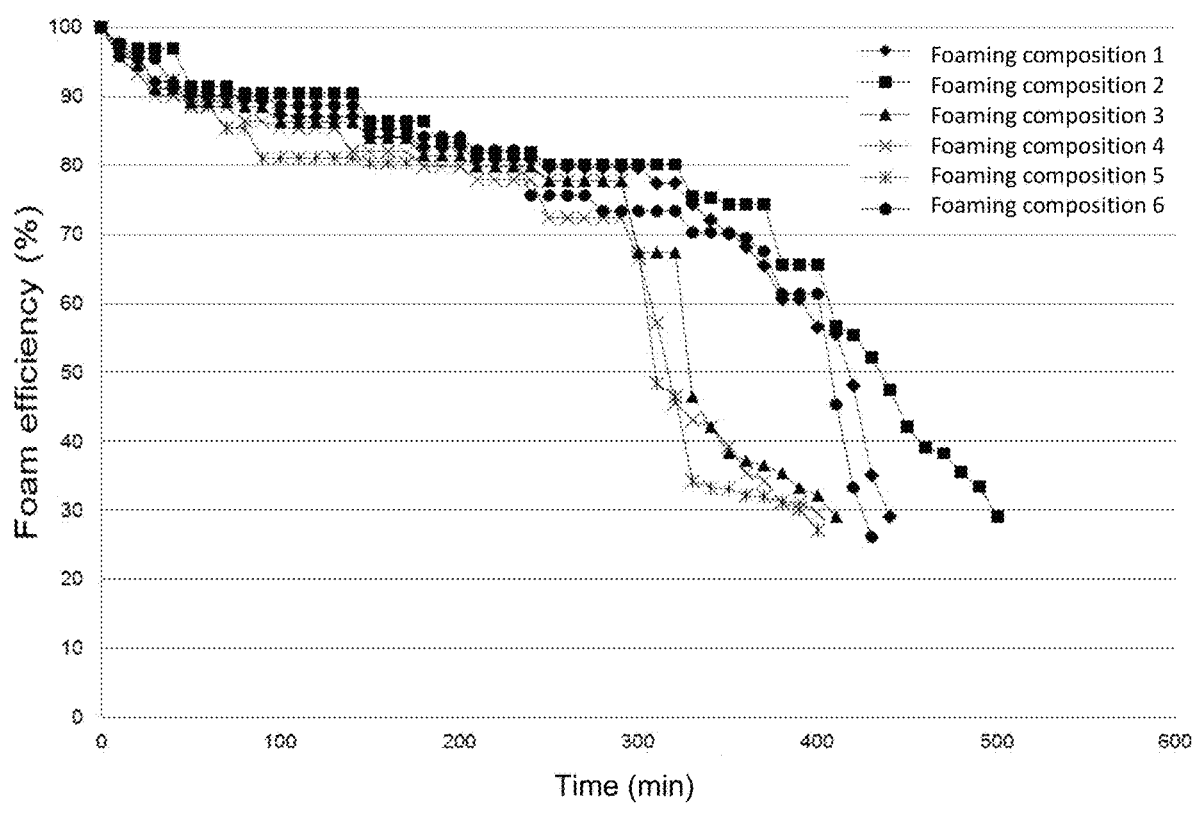
Figure 5:
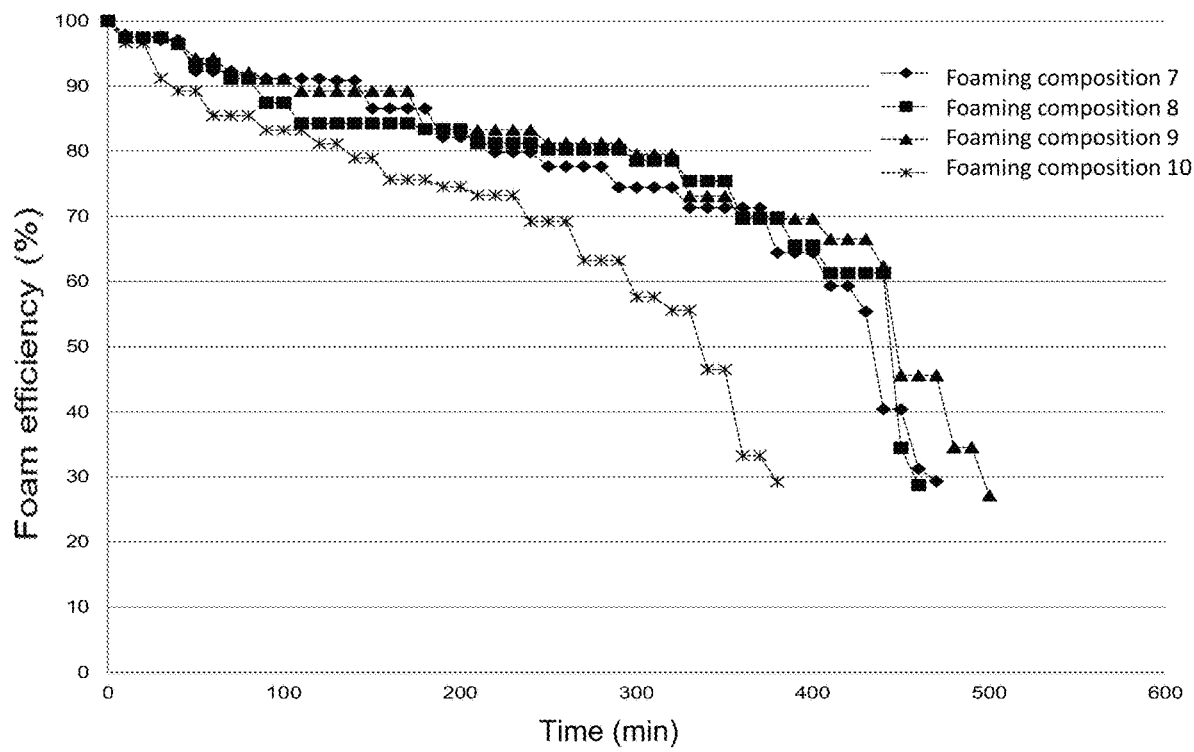

Determination of the foam stability generated with the brine 1 and the multifunctional foaming compositions 1 to 10: The obtained results about of foam stability of the foaming test at atmospheric pressure and a concentration of 0.2 Wt % of the foaming compositions 1 to 6 showing in FIGS. 4 and 5, showing the results for the compositions 7 to 10.

The analysis of the results indicates that the minimum stability of 30% for the multifunctional foaming compositions 1 to 10 is achieved at times ranging from 390 to 510 minutes.

EXAMPLE 14

It was carried out the evaluation of the foamability of multifunctional foaming compositions 1 and 2 of the present invention in three brine (formation water) of different composition of high salinity with a high content of divalent ions (calcium, magnesium, barium and strontium) and salinity as NaCl.

The characteristics of the formation water used to generate the foam showing in Table 2.

TABLE 2

Compositions of the brine 2, 3 and 4.

|  | Brine 2 | Brine 3 | Brine 4 |
|---|---|---|---|
| pH | 7.33 | 6.38 | 4.96 |
| Cations | mg/L | mg/L | mg/L |
| Sodium | 44223.39 | 59809.46 | 52559 |
| Calcium | 12720 | 31880 | 56800 |
| Magnesium | 826.54 | 1944.8 | 2917 |
| Estroncium | 710 | 1450 | ND |
| Barium | 1.84 | 25.33 | ND |
| Anions | mg/L | mg/L | mg/L |
| Chlorides | 92800 | 154000 | 190000 |
| Sulfates | 225 | 300 | 5 |
| Bicarbonates | 256.2 | 148.84 | 82.96 |
| Total hardness as $CaCO_3$ | 35200 | 87700 | 154000 |
| Salinity as NaCl | 152974.86 | 253859.14 | 313203 |

Figure 6:
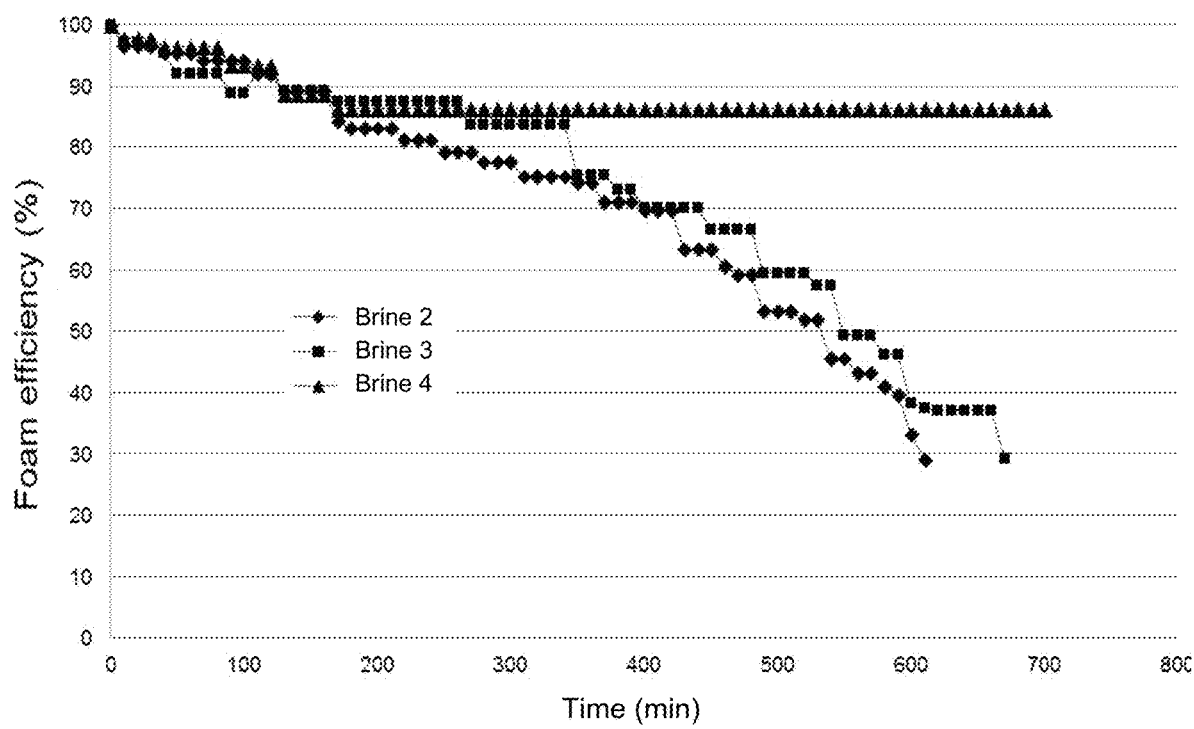
Figure 7:
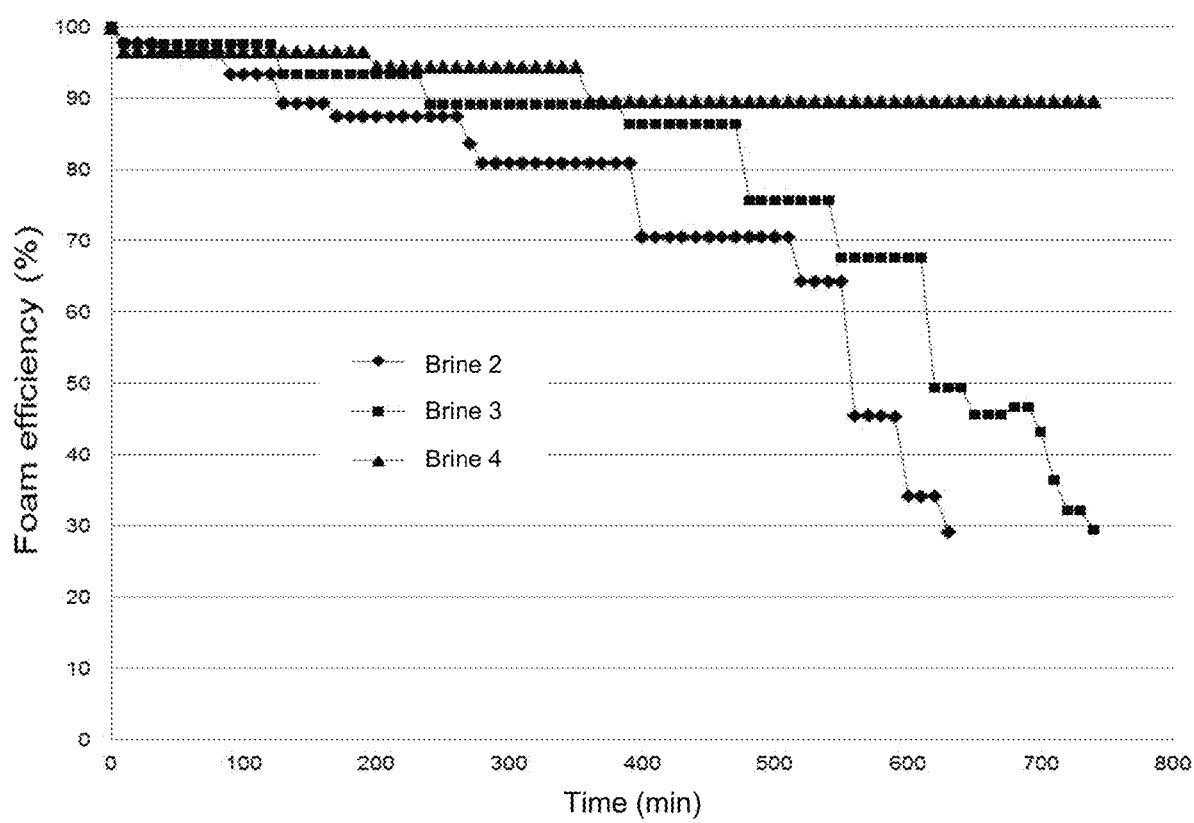

The obtained results of the foam stability in the foaming test at atmospheric pressure and a concentration of 0.2 Wt % of the multifunctional foaming compositions 1 and 2 showing in FIGS. 6 and 7, respectively.

The analysis of the results indicates that the minimum stabilities of 30% for the multifunctional foaming compositions 1 and 2 in the high salinity brines 2, 3 and 4 are achieved in longer times to 600 minutes.

EXAMPLE 15

Was carried out evaluation of the foamability for the multifunctional foaming compositions 1 and 2 of the present invention at atmospheric pressure, at a temperature of 70° C., and using the brine 4 that containing a salinity of 313,203 ppm as NaCl, from which 154,000 ppm corresponded to divalent ions (calcium and magnesium), a concentration of the foaming compositions of 0.2 Wt % as nitrogen gas ($N_2$), methane ($CH_4$) and carbon dioxide ($CO_2$).

Figure 8:
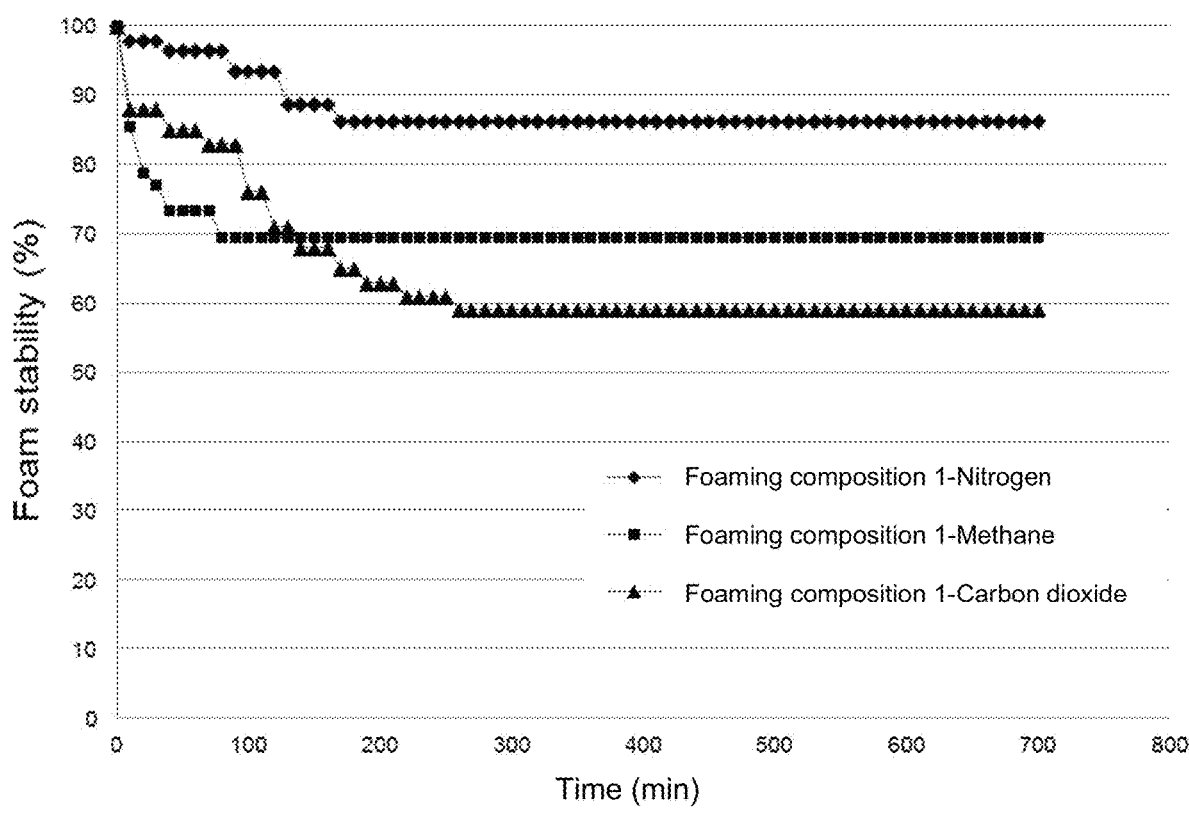
Figure 9:
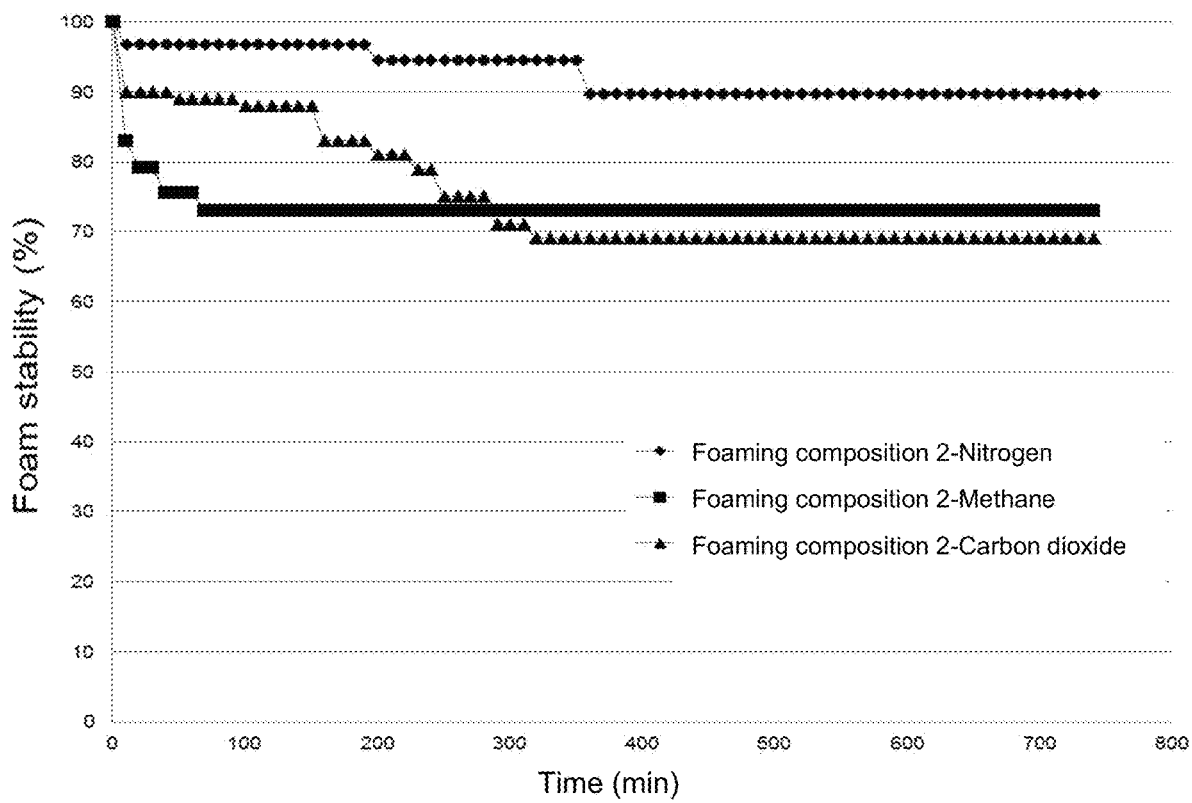

The obtained results of the foam stability in foaming test at atmospheric pressure and a concentration of 0.2 Wt % of multifunctional foaming compositions 1 and 2 with methane-, carbon dioxide- and nitrogen-gas showing in FIGS. 8 and 9, respectively at 1 kg/cm$^2$ and 70° C.

Figure 10:
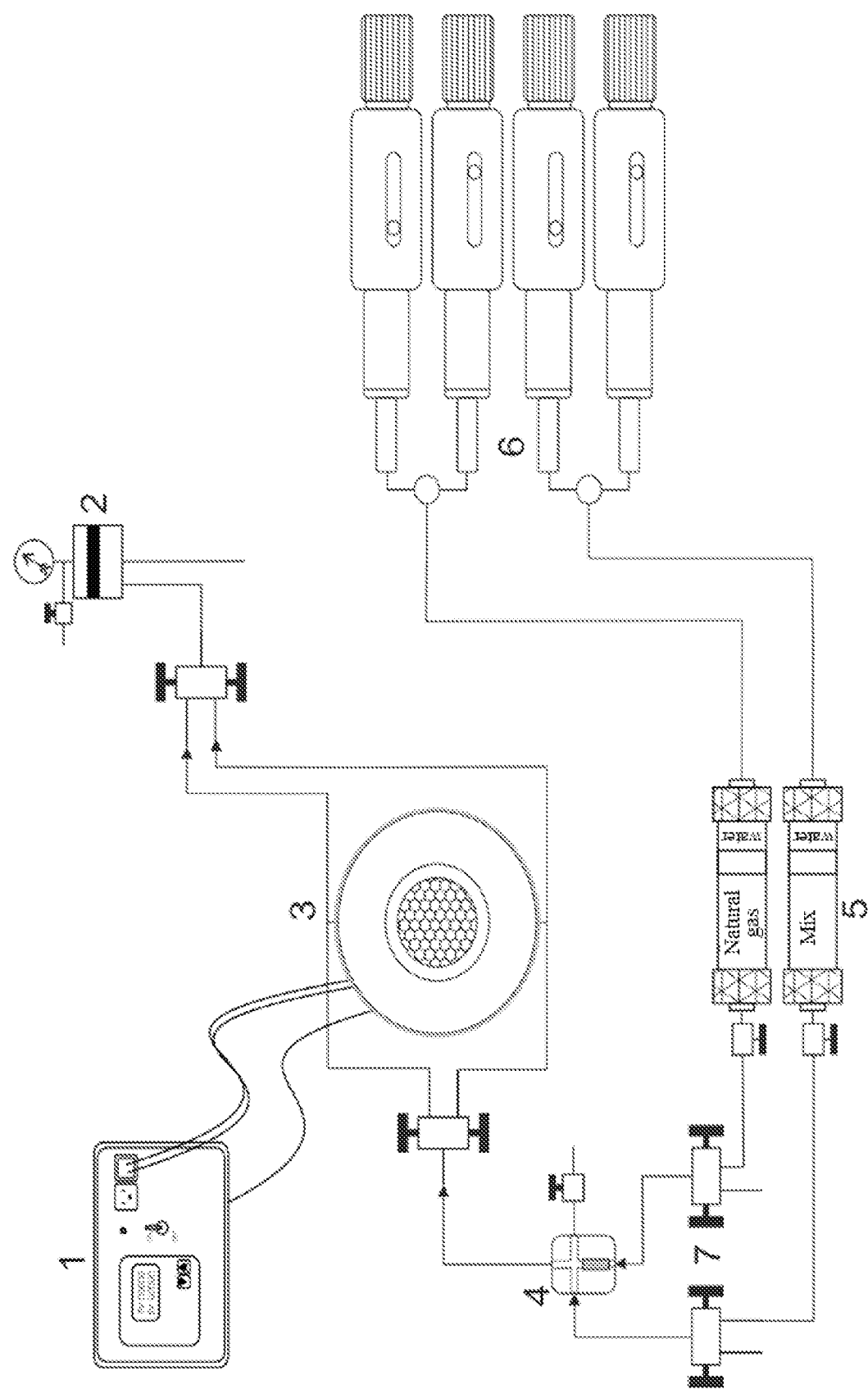

The analysis of the results indicates that the stability achieved is maintained for all the cases greater than 60% over 700 minutes.

b) Foaming test at high pressure: The system of generating foam to high pressure is made from a PVT cell (pressure, temperature, volume) adapted as shown in FIG. 10 (PVT cell adapted and used for foam stability test at high-pressure and -temperature). The PVT cell consists of a BPR valve, whose purpose is to maintain the working pressure in the system and permit injection of fluids. Inside the cell and at the bottom was adapted a disperser, through which the gas is injected, into this same part an inlet for the injection of brine with the formulated foaming was adapted. The foam is generated within a sapphire tube; into this tube exists a piston that moves to allow the fluid entry, the space between the piston and the BPR valve is filled with a mineral oil with which it is possible to control the height piston. To carry out the measurement of foam stability and ability of foaming, a process consisting of 11 stages was developed and described below: 1) Prepare the PVT cell (FIG. 10) with the corresponding adjustments to the test foams; 2) Open the valves of the cell and connect the vacuum pump for 30 minutes; 3) is injecting gas into the cell, to get inside the cell the corresponding pressure to the test pressure and the height of the piston to −0.327; 4) Inject the volume of foaming agent (50 cm$^3$); 4) Record the height of the foaming agent with respect to its reference and the height of the piston with the charged foaming; 5) Place the gas cylinder at a pressure of 150 kg/cm$^2$; 6) Note the difference in height between liquid and foam (if any); 6) Record the starting time of the test; 7) Inject the gas into the system through the disperser for 5 seconds counted by timer; 8) Suspend the gas injection and wait for the pressure of the gas cylinder scope 150 kg/cm$^2$ and record the volume of injected gas; 9) Record the initial foam height and start taking the foam- and liquid-height every ten minutes until the foam completely down and the foaming liquid scope the initial stage of the test; 10) Determine the % of the foam stability at each time.

The system of foam generation at high pressure and high temperature that was used was developed in the laboratory of hydrocarbon recovery of the Mexican Petroleum Institute (Instituto Mexicano del Petroleo) and is designed to evaluate the stability of foams generated by surfactants at temperatures of up to 170° C. and pressures up to 6000 psi (423 Kg/cm$^2$) and the same is shown in FIG. 10, which consists of injection pumps, transfer cylinders, back pressure regulator (BPR), temperature control system, pressure monitoring system, digital camera, filter (foam generator) and experimental cell.

1) Test Conditions
   Temperature: 150° C.
   Pressure: 3,500 psi (246 Kg/cm$^2$)
   Gas: Nitrogen
   Brine 4
   Test time: 11 days
   Liquid Spending: 0.6 ml/min
   Gas Spending: 2.4 ml/min
2) Methodology:
1) Conditioning of the system:
   Peephole
   BPR
   Cylinders of transfer
2) The pressure transducer and thermocouples were calibrated.
3) The temperature is raised at which it is carry out the experiment and the pressure is maintained by the BPR valve.
4) The liquid additive with chemical and the gas is injected to form the foam in a ratio of 1 to 4, respectively under reservoir conditions.
5) Once formed the foam and saturated cell the system is isolated and allowed to monitor the pressure and temperature.
6) Photographic images are taken at different times during the test to observe the stability of the foam.

Determination of the Foam Stability. The methodology for determining the stability of the foam it is as follows:
1. Is carried out a color scale to gray scale for the photographic images.
2. It is calculated the peephole area in pixels.
3. It is calculated the lamella free area.
4. It is calculated the percentage of free area of lamella.

% of free area of lamella=free area of lamella/Area of Peephole     Equation 3

5. It is calculated the percentage of area of lamella.

% of area of lamella=1−% free area of lamella     Equation 4

EXAMPLE 16

Figure 11:
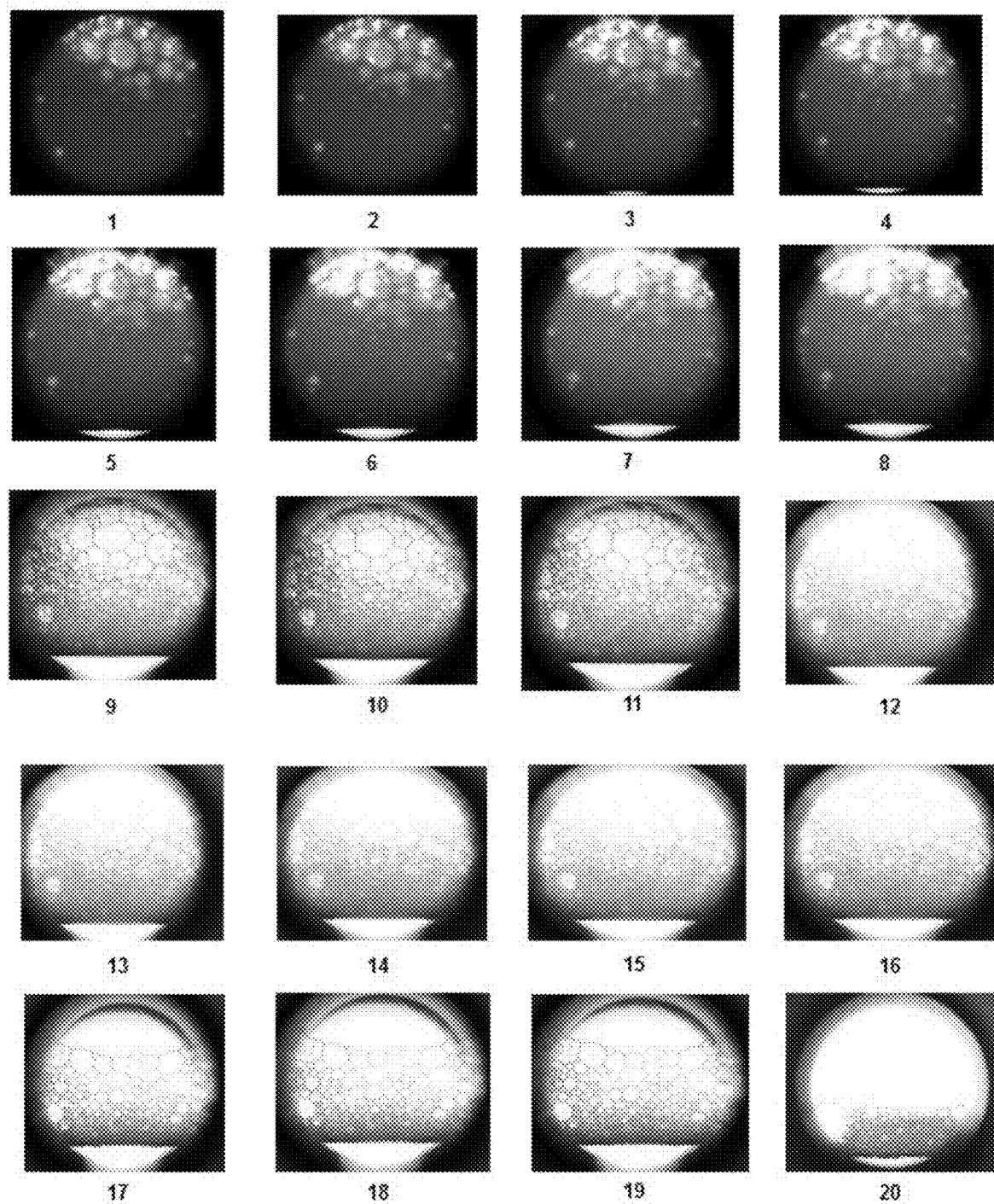
Figure 12:
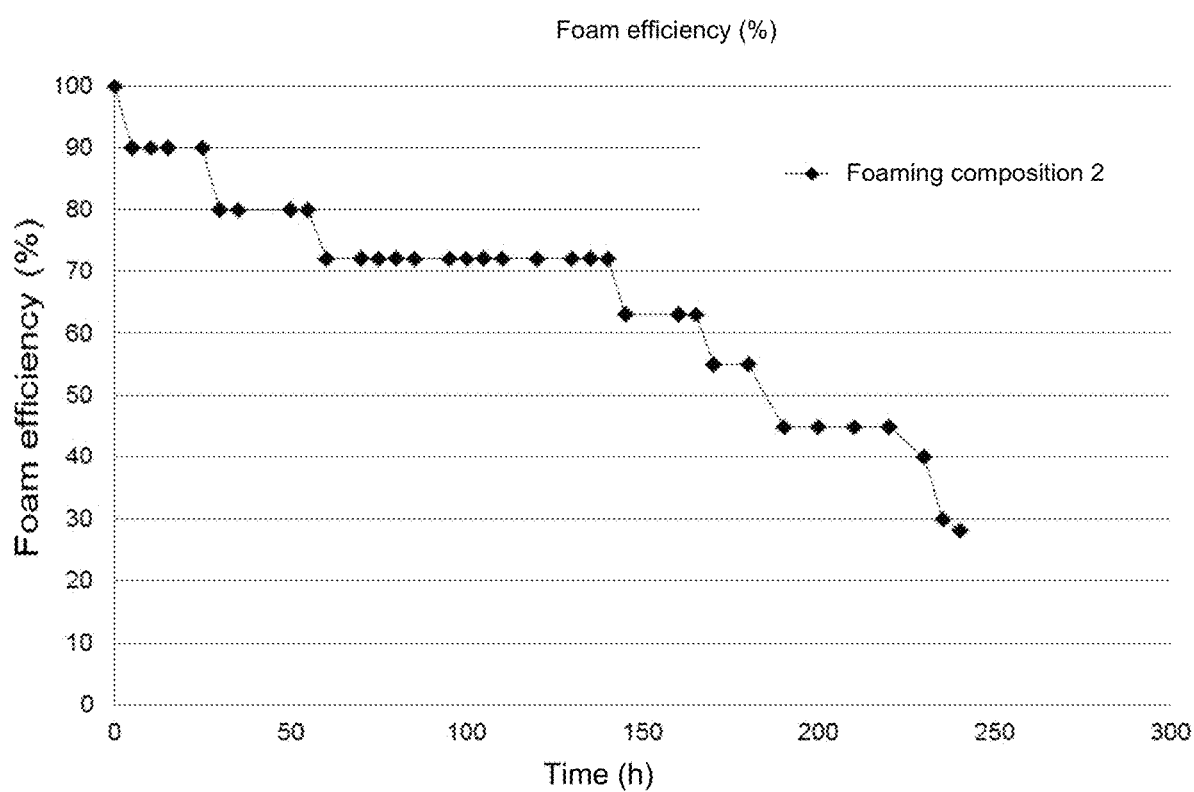

Was carried out the evaluation of the stability of the foam formed by the multifunctional foaming composition 2, through the foaming test at high pressure, which conditions are 3,500 psi (246 Kg/cm$^2$) pressure and 150° C., using the brine 4 that containing 313,203 ppm of salinity as NaCl, of which corresponded to 154,000 ppm of divalent ions (calcium and magnesium), a supramolecular complex concentration of 0.2 Wt % and as gas nitrogen (N$_2$). In FIG. 11 is shown the sequence of images of the formed foam by brine plus multifunctional foaming composition 2 at a concentration of 0.2 Wt %, whereby the foam behavior is observed during the test. The duration of the formed foam by the multifunctional foaming composition 2 was around of 240 hours whose data showing in Table 3, at which time the system conditions were kept constant at 150° C. and 3,500 psi (246 Kg/cm$^2$) of pressure. In FIG. 12 it is shown the time behavior against the foam stability at reservoir conditions for multifunctional foaming composition 2. With the above are demonstrated the technology advantage of using multifunctional foaming compositions of the present invention under high pressure 3500 psi (246 Kg/cm$^2$), high temperature (150° C.) and ultra-high salinity brines and high hardness conditions and its versatility of using different gases to produce the foam.

c) Determination of rheological behavior in capillary rheometer at reservoir conditions. The test method consists in determine the rheological behavior of foams generated from the foaming compositions object of the present invention, with ultra-high salinity water and high hardness under reservoir conditions using a capillary rheometer for high pressure and high temperature using a experimental method developed in the laboratory of well productivity of the Mexican Petroleum Institute, in which the pressure drop between two points of the capillary tube as a function of spending foam is determined.

TABLE 3

| % Area of lamella | Time (h) |
|---|---|
| 100 | 0 |
| 90 | 5 |
| 90 | 10 |
| 90 | 15 |
| 90 | 25 |
| 80 | 30 |
| 80 | 35 |
| 80 | 50 |
| 80 | 55 |
| 72 | 60 |
| 72 | 70 |
| 72 | 75 |
| 72 | 80 |
| 72 | 95 |
| 72 | 100 |
| 72 | 105 |
| 72 | 110 |
| 72 | 120 |
| 72 | 130 |
| 72 | 135 |
| 72 | 140 |
| 63 | 145 |
| 63 | 160 |
| 63 | 165 |
| 55 | 170 |
| 55 | 180 |
| 45 | 190 |
| 45 | 200 |
| 45 | 210 |

TABLE 3-continued

| % Area of lamella | Time (h) |
|---|---|
| 45 | 220 |
| 40 | 230 |
| 28 | 240 |

Required Elements for Testing:
Capillary rheometer for high pressures and temperatures.
Nitrogen tank.
1 L of solution of foaming agent in characteristic brine.

Test Procedures:
1) Carrying the system of the capillary rheometer at the temperature and pressure of the experiment.
2) Fix the total spending or the spending of foam according to the dimensions of the capillar tube to obtain the maximum shear rate desired, the Volumetric flow rate (VFR) of nitrogen gas and foam solution will be defined for obtained the required quality. This relation should conform to the following equation:

$$\text{Quality} = \frac{Qgas}{Qgas + Qliq} \quad \text{Equation 5}$$

where the total spending is given by the sum of the VFR of gas and liquid.
3) For a fixed total spending, recording the values of pressure drop corresponding in a time interval of 10 minutes.
4) Modify the total spending to a lower value and re-register the values of pressure drop for the same period of time than in previous point.
5) Repeat the procedure until obtain at least 7 points or 7 different VFR.
6) Based on the experimental data of the total volume spending and pressure drop calculate the shear stress and the shear rate corresponding, in order to obtain the graph of shear stress versus shear rate, from which can be seen and determine the rheological behavior of the foam.
7) Perform a mathematical adjustment according to the type of curve observed for obtaining the rheological model equation of the foam where the apparent viscosity can be calculated as a function of shear rate.

EXAMPLE 17

Was carried out the determination of the rheological behavior of a foam generated by the multifunctional foaming composition 2 at a temperature of 150° C. and pressure of 3500 psi (246 Kg/cm$^2$), at a concentration of 0.2 Wt % in the brine 4 described in the Example 15 and using as nitrogen gas to achieve a quality of 80% and in a range of high shear rate. In Table 4 are summarized the principal conditions of the experiment and dimensions of the capillary.

From the obtained results and to perform the mathematical adjustment of the rheological behavior for this foam with a correlation coefficient R$^2$=0.9706 was found as characteristic equation of a pseudoplastic fluid:

$$\mu = 779.4 \times \gamma^{0.3945-1} \quad \text{Equation 6}$$

where the viscosity μ calculated directly in centipoises and γ the shear rate is given in s$^{-1}$.

TABLE 4

| | |
|---|---|
| Temperature: | 150° C. |
| Pressure: | 3500 psi (246 Kg/cm$^2$) |
| shear rate interval: | 74-650 s$^{-1}$ |
| Internal diameter: | 0.119 cm |
| length: | 60 cm |
| Foam quality: | 80% |

Figure 13:
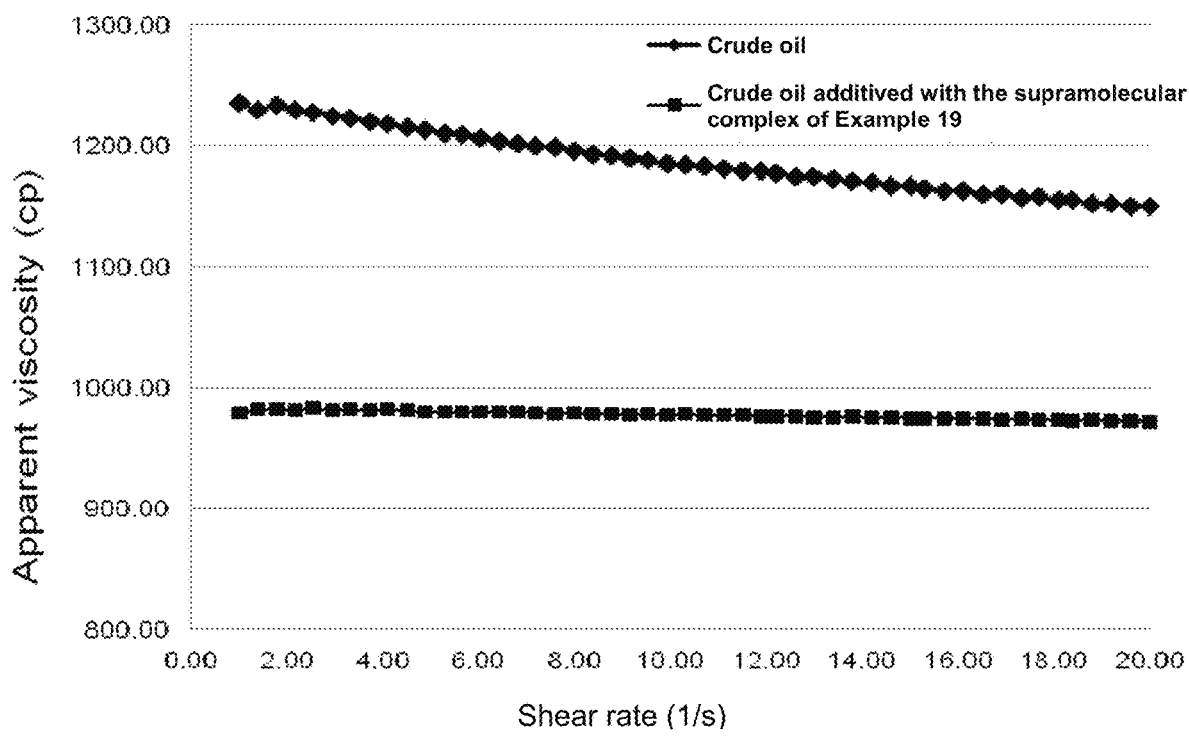

Then in Table 5 and FIG. 13 are shows the results obtained.

TABLE 5

| Q (cm$^3$/h) | ΔP (Pa) | shear rate (1/s) |
|---|---|---|
| 700.00 | 158400 | 649.67 |
| 600.00 | 151800 | 556.86 |
| 500.00 | 136800 | 464.05 |
| 400.00 | 136400 | 371.24 |
| 300.00 | 127600 | 278.43 |
| 250.00 | 127600 | 232.02 |
| 200.00 | 114400 | 185.62 |
| 150.00 | 101200 | 139.21 |
| 100 | 85800 | 92.81 |
| 80 | 55000 | 74.25 |

From the above equation it is possible to calculate the viscosity as a function of shear rate, the results shown in Table 6.

From the results obtained in this evaluation for the foam generated from the multifunctional foaming composition 2 it shows that even at high cutting speeds of 649.7 s$^{-1}$ under pressure and reservoir temperature conditions may reach values of viscosity of 14.45 cP, this is 72 times more than water and 723 times more than the viscosity of nitrogen.

TABLE 6

| shear rate (1/s) | Experimental Apparent Viscosity (cP) |
|---|---|
| 649.67 | 14.45 |
| 556.86 | 16.16 |
| 464.05 | 17.47 |
| 371.24 | 21.78 |
| 278.43 | 27.16 |
| 232.02 | 32.59 |
| 185.62 | 36.53 |
| 139.21 | 43.08 |
| 92.81 | 54.79 |
| 74.25 | 43.90 |

EXAMPLE 18

Was carried out the determination the rheological behavior of a foam generated by the multifunctional foaming composition 2 at a temperature of 150° C. and pressure of 3500 psi (246 Kg/cm$^2$) at a concentration of 0.2 Wt % in the brine 4 whose composition are described in Example 15, using as nitrogen gas to achieve a quality of 80% and in a range of low shear rate.

In Table 7 are summarized the principal conditions of the experiment and the dimensions of the capillary.

TABLE 7

| | |
|---|---|
| Temperature: | 150° C. |
| Pressure: | 3500 psi (246 Kg/cm$^2$) |
| Shear rate interval: | 9-75 s$^{-1}$ |
| Internal diameter: | 0.255 cm |

TABLE 7-continued

| | |
|---|---|
| length: | 610 cm |
| Foam quality: | 80% |

Then in Table 8 are shows the results obtained.

TABLE 8

| Q (cm³/h) | ΔP (Pa) | Shear rate (1/s) |
|---|---|---|
| 80.00 | 52000.00 | 74.25 |
| 60.00 | 46,500.00 | 55.69 |
| 40.00 | 37000.00 | 37.12 |
| 20.00 | 24,350.00 | 18.56 |
| 10.00 | 22101.00 | 9.28 |
| 5.00 | 14,678.00 | 4.64 |

From the results obtained and to perform the mathematical adjustment of the rheological behavior for this foam with a correlation coefficient $R^2$=0.9581 was found as characteristic equation of a pseudoplastic fluid:

$$\mu=441.5\times\gamma^{-0.5529}$$ Equation 7

From the above equation it is possible to calculate the viscosity as a function of Shear rate, the results shown in Table 9. From the results obtained of this evaluation for the foam generated from the foaming composition 2 it shows that at low share rate, close to those found at the reservoir about 9 $s^{-1}$ under pressure and temperature reservoirs conditions can be achieved viscosity values of 141 cP, this is 705 times more water and 7050 times more than the viscosity of nitrogen. With the above it is demonstrated the technological advantage of using the foaming compositions objects of the present invention as foaming additives under high pressure, 3500 psi (246 kg/cm²), high temperature (150° C.) and ultra-high salinity brines and high hardness.

TABLE 9

Figure 14:
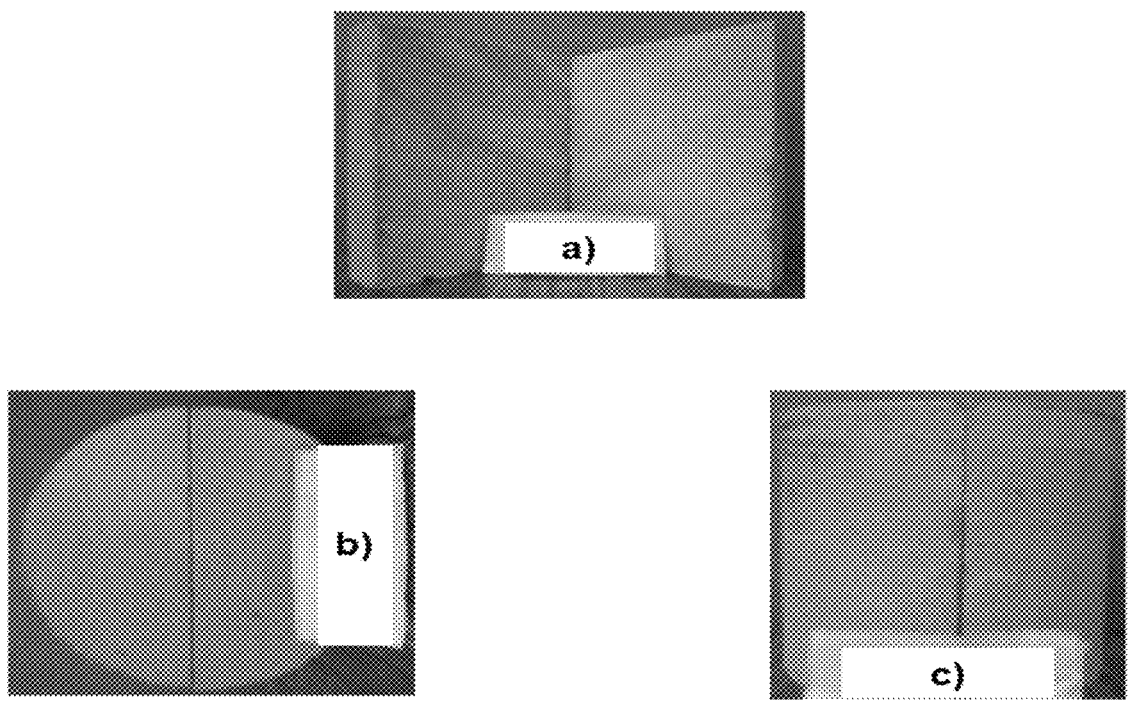

| Share rate (1/s) | Experimental Apparent Viscosity (cP) |
|---|---|
| 74.25 | 41.51 |
| 55.69 | 49.49 |
| 37.12 | 59.07 |
| 18.56 | 77.75 |
| 9.28 | 141.14 |
| 4.64 | 187.47 | d) Determination of blocking factor. The test method is to evaluate the resistance factor or blocking factor through the use of the foam. For this evaluation, a matrix-fracture system consisting of a cylindrical core of Bedford limestone (matrix) of 3.5 inch diameter, 10 cm (3.94 inch) in length and a longitudinal cut (fracture) was used, (FIG. 14). As part of a preliminary work to the evaluation of the use of foams, the flow for the matrix-fracture system it was characterized. The objective of this stage was to determine the behavior of the opening of the fracture according to the confining pressure (overload).

Figure 15:
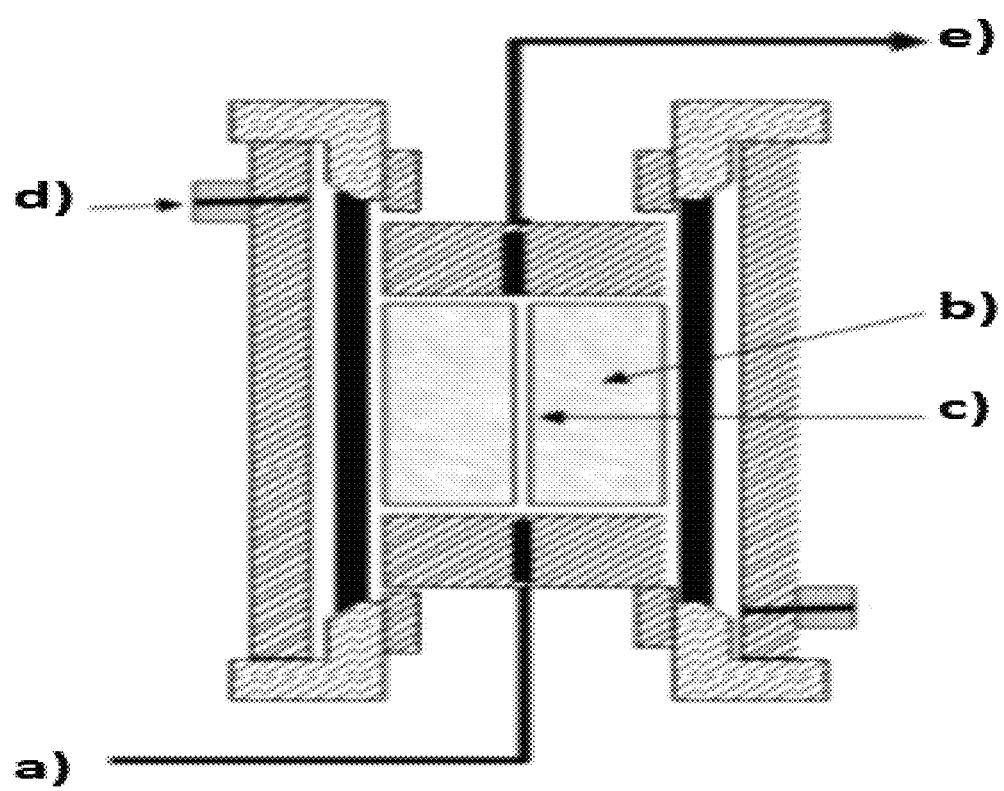
FIG. 15 illustrates the device to determine the blocking factor.

Experimental equipment: To characterize the matrix-fracture system was used an experimental equipment whose detail is shown in FIG. 15. The rock core is mounted on a sleeve system to seal by confining pressure the outer surface of the cylinder, this sample holder Hassler type can apply confining pressure or of overload to the rock sample reducing the opening of the longitudinal fracture to achieve different fracture permeabilities.

Then it described summarize the experimental methodology:
1. Determination of the weight of the rock-core sample clean and dry, corroborating dimensions, diameter and length.
2. Mounting of core with longitudinal cut in experimental cell (sample holder type Hassler) for high pressure and temperature.
3. Installation of the experimental cell in displacement system.
4. Application of the confining pressure to seal the Viton sleeve of the experimental cell against the porous media.
5. Application of vacuum to the system and the experimental cell for 30 minutes.
6. Injection of formation water to achieve 100% of saturation in the porous media. This was corroborated by several cycles of pressing in at 1000 psi (70 kg/cm²).
7 Determination of differential pressure variation for different VFR of injection and different confining pressures. Allow pressure equalization for each flow. The injected fluids respect the following order:
   a. Injection of formation water (brine 2).
   b. Displacement of formation water through the injection of nitrogen gas ($N_2$).
   c. Foam injection.
   d. Displacement of the foam through the injected of nitrogen gas ($N_2$).
8. Disassembly of the experimental cell and revision of the rock sample.
9. Determination of the weight of the rock sample to 100% of saturation conditions with water.
10. Interpretation of the experimental data to determine the blocking factor generated.

Figure 16:
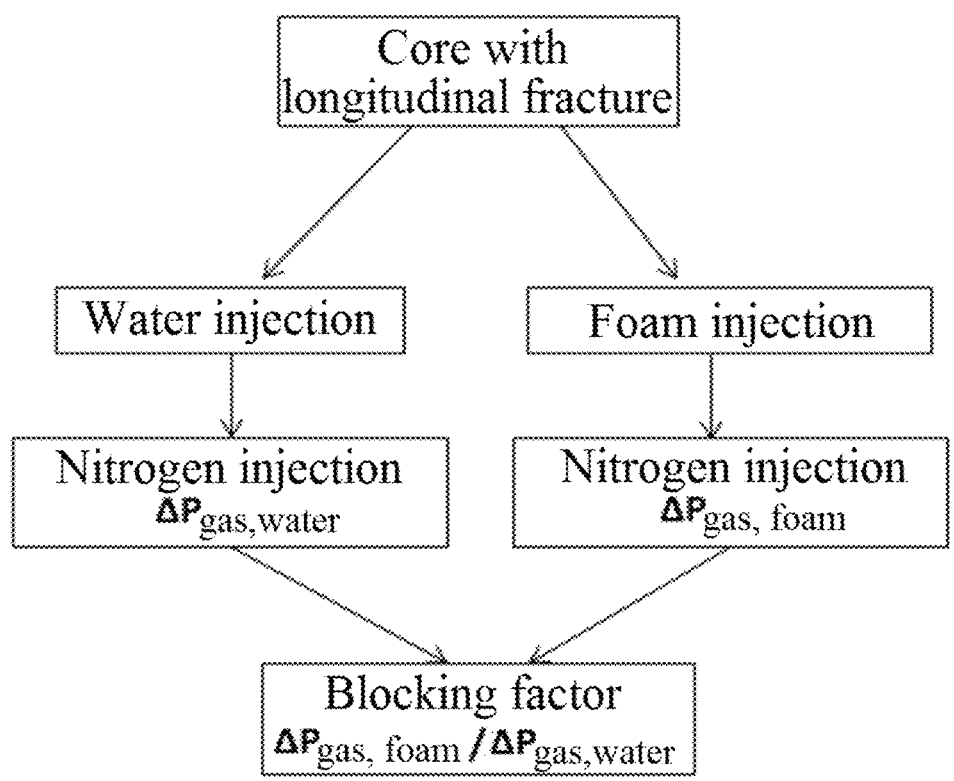
FIG. 16 shows the methodology used to characterize the matrix-fracture system where is used the experimental equipment of the FIG. 15.

FIG. 16 shows a block diagram which summarizes the methodology used.

EXAMPLE 19

Was carried out the determination of the blocking factor using the multifunctional foaming composition 2, and the brine 2 whose composition is shown in Example 14.

Figure 17:
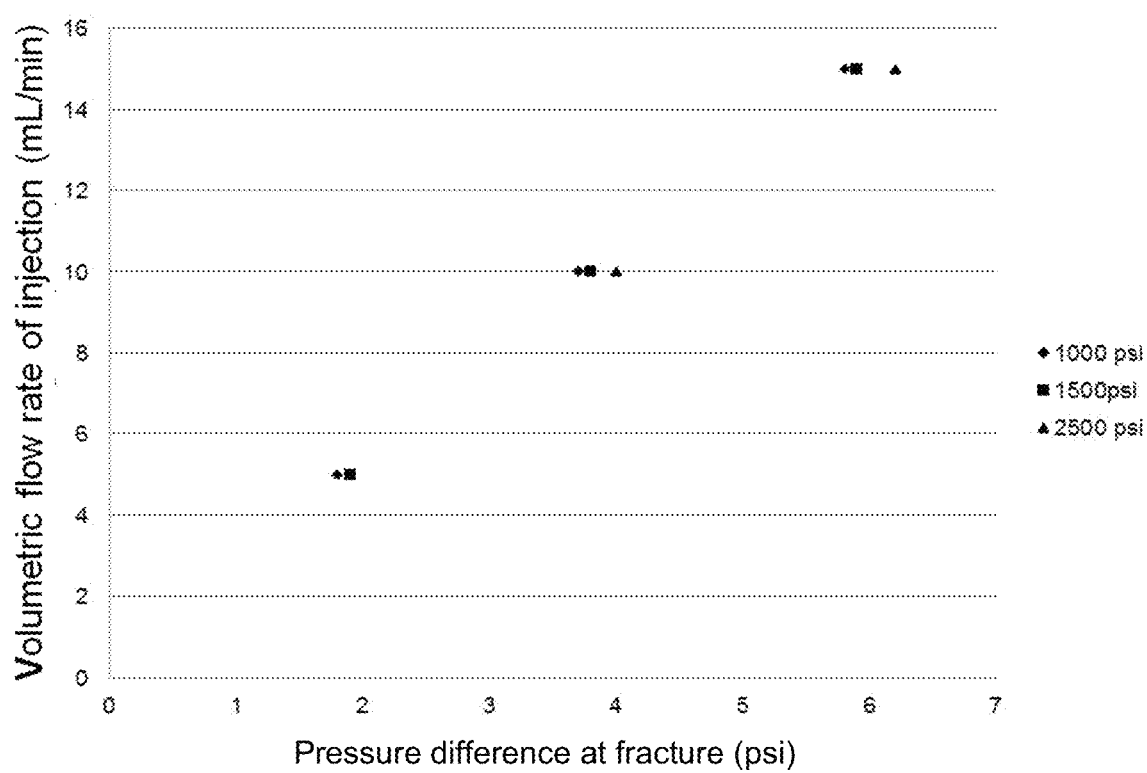
FIG. 17 shows the behavior of the pressure drop in the fracture to different flows of the formation water (brine 2) and the confining pressures 1000, 1500 and 2500 psi (70, 105 and 176 Kg/cm$^2$).

Determination of the Pressure Drop Along the Fracture.
a) With brine. Tests were made at different confining pressures; 1,000; 1,500 and 2,500 psi (70, 105 and 176 Kg/cm²) at room temperature (22° C.) and back pressure injection (BPI=500 psi (35 kg/cm²)).
   In FIG. 17 are shows the behavior of the pressure drop along the fracture when the brine 4 is injected, VFR and confining pressures.
b) With foam. The Foam generation was carried out with the multifunctional foaming composition 2 at a concentration of 0.2% in the brine 4 and to generate the foam nitrogen gas was used.
   In FIG. 18 are shows the pictures of foam generated and in the FIG. 19 are shows the behavior of the pressure drop along the fracture when the brine 4 is injected, VFR and confining pressures.
c) With nitrogen gas ($N_2$). Nitrogen gas is injected in order to displace the fluid present in the core, whether these formation water (brine 4) or the foam generated by the foaming composition 2 of the present invention.
   FIG. 20 shows the behavior of the pressure drop along to the fracture when nitrogen is injected to displace foam and brine, VFR to a confining pressure of 2500 psi (176 Kg/cm²).
   Comparing the pressure drop along the core with brine and foam can be calculate the blocking factor.

Determination of the blocking factor. After injection of a fluid, it being this formation water (brine 4) or foam, it is carried out a sweep with nitrogen gas.

The ease with which the nitrogen flows through the core depends on the fluid to move or sweep and can be estimated by measuring the pressure drop.

The $F_b$ blocking factor is calculated as follows:

$$F_b = \frac{\Delta P_{gas\ to\ displace\ the\ foam}}{\Delta P_{gas\ to\ displace\ the\ water}}$$

The results obtained for blocking factor showing in Table 10.

TABLE 10

Blockade factors to different gas injection rates.

|  | VFR (mL/min) | | |
| --- | --- | --- | --- |
|  | 5 | 10 | 15 |
| Blocking factor | 13.9 | 11.2 | 10.3 |

II) EVALUATION OF THE WETTABILITY MODIFYING PROPERTIES. The following examples will serve to demonstrate the use of the foaming compositions object of the present invention as wettability modifiers.

For this evaluation, was carried out in four ways: a) Evaluation of oil detachment adsorbed on a rock to atmospheric conditions; b) Determination of spontaneous imbibition into small fragments of dolomite in Amott cells; c) Determination of spontaneous imbibition in limestone cores into cells Amott; d) Determination of spontaneous imbibition in limestone cores in a glaze reactor of high temperature; e) Determination of the change in contact angle at reservoir conditions; and, f) Determination of crude oil recovery factor by injecting foam into a shift test at reservoir conditions.

a) Evaluation of the detachment of the absorbed oil on a rock to atmospheric conditions and static. The test method consists of a procedure to observe how the oil adsorbed on a rock immersed in brine with high content of total dissolved solids and divalent ions such as calcium and magnesium with or without presence of chemical, to determine the time in which it is achieved detach a small amount of oil in the system.

Elements Required for the Test:
Beakers of 50 milliliters.
Small fragments of dolomite, limestone or sandstone.
Camera.
Oil crude typical of carbonate reservoirs.
Brine.

Test Procedure
1. Prepare 100 ml of the aqueous solution (brine) to evaluate the concentration of chemicals required in the test.
2. Place a small piece of rock (dolomite, limestone or sandstone) of 2×2×1 cm of dimensions in a beaker of 50 milliliters.
3. Place carefully two drop of crude oil on the surface of the small piece of rock.
4.—Allow the rock-oil system is balanced, giving a standing time of 30 minutes.
5. Check if the surface of the rock is oil-wet.
6.—Add carefully 25 ml of the aqueous solution to evaluate to the concentration of chemicals required in the test.

Ensure that the rock-oil system is completely immersed in the aqueous solution to be evaluated.
7.—Observe the release of oil in the oil-rock-aqueous solution system and leaving evidence of them through photographs.
8.—Determining the time at which the release of oil in the system due to exposure to the chemicals are begins.
9.—The duration of the test is one hour.

EXAMPLE 20

Was carried out the evaluations of the release of oil in a rock/oil and brine system to atmospheric and static conditions for the multifunctional foaming composition 2 at different concentrations. It uses the brine 1 (whose composition is described in Example 11), rock plates composed of 99% of dolomite and 1% of limestone and oil whose composition is shown in Table 11.

TABLE 11

| Fraction (wt %) | |
| --- | --- |
| Saturates | 28.09 |
| Aromatics | 43.69 |
| Resins | 24.46 |
| Asphaltene | 3.72 |

In FIGS. 21, 22 and 23 showing the detachment results of the oil using the multifunctional foaming composition 2 at different concentrations. The results reported in FIGS. 21, 22 and 23 show that the multifunctional foaming composition 2 is capable of releasing the oil in less than 1 hour of have contact with the oil adsorbed on the rock under ambient conditions and high salinity brines as well as oils rich in asphaltenes.

With the above it is demonstrated the technological advantage of using the foaming compositions of the present invention as modifiers wettability under temperature conditions, atmospheric pressure and ultra-high salinity brines with high hardness.

b) Determination of recovery factor in small fragments of carbonate rock into Amott Cells. The test method consists in determine the oil recovery factor at different temperatures, due to processes of spontaneous imbibition of water in small fragments of carbonate rock and/or cores with known permeabilities and porosities.

Elements Required for the Test:
Amott cells. (FIG. 24)
Recirculating of temperature controlled.
Small fragments of dolomite, limestone or sandstone.
Camera.
Typical oil crude of carbonate reservoirs.
Typical brine of the reservoirs that possess high salinities.
Supramolecular complex or chemical to evaluate.
Analytical balance.
Glass equipment of extraction (SOXHLET).
Volumetric Glassware.
Convection stove.

Test Procedures:
1) Submit to hydrocarbon extraction processes with different organic solvents in a SOXHLET system to small fragments of rock (dolomite, limestone or sandstone) coming from the reservoir for which it is intended to conduct the study. The extraction processes are performed continuously, sequenced and in reflux; using as solvents:

a) Hexane b) Xylene c) Chloroform, d) Methanol, e) Hexane, f) Xylene g) Chloroform. The duration of each extraction stage is one day and the total process time is 7 days.
2) Dry the small rock fragments in an oven at a temperature of 100° C. and record the weight after reaching a constant weight.
3) Put in touch the small fragments of rock with dead oil from the site of interest, for 24 hours at the required temperature and a pressure of 140±5 psi (10 kg/cm²) in a maturing cell.
4) Drain at room temperature and atmospheric pressure the small fragments of impregnated rock with dead oil to note that there is no longer dripping. The process of draining it lasts about 12 h and for this use is made of a wire mesh number 200.
5) Weigh the small rock fragments impregnated with dead oil and obtain through a weight difference the amount of oil adsorbed by the porous media.
6) Prepare 400 ml of aqueous solution (brine) to evaluate the concentration of chemical required in the test.
7) Place 60 g of small fragments of rock impregnated with dead oil in the Amott cell and carefully adds 350 ml of the chemical to evaluate to the required concentration.
8) Increase the temperature of the system to which you want to make the performance evaluation of the chemical or study sample and maintain it for a period of time which is intended to determine recovery factor under the conditions of temperature and salinity.
9) Quantify the amount of oil produced due to processes of spontaneous imbibition of water under the conditions of study and determine the recovery factor according to the following equation:

$$F_r = \frac{A_r}{A_{omp}} \times 100 \qquad \text{Equation 8}$$

were:
$F_r$=Recovery factor.
$A_r$=Oil recovered.
$A_{omp}$=Original oil adsorbed in the porous medium.

EXAMPLE 21

Was carried out the evaluation of the full recovery factor at a concentration of 0.2 Wt %, using as evidence the brine 1 described in example 11, fragments of limestone and oil whose characteristics showing in Table 12, for a temperature of 90° C. and atmospheric pressure.

TABLE 12

| Fraction | |
| --- | --- |
| Saturates (wt %) | 13.4 |
| Aromatics (wt %) | 24.76 |
| Resins (wt %) | 51.01 |
| Asphaltene (wt %) | 10.44 |
| Acid number (mg KOH/g) | 1.83 |
| Basic number (mg KOH/g) | 2.12 |
| Gravity API | 18 |

In FIG. 25 showing the Amott cells and recovered oil and in FIG. 26 showing a graph with the behavior of the recovery factor versus time for the tested products. In Table 13 showing the results of the recovery factor accumulated in a time of 8 days at a temperature of 90° C.

TABLE 13

| PRODUCT | ACCUMULATED RECOVERY FACTOR (%) |
| --- | --- |
| BRINE 1 | 4 |
| Foaming composition of the patent application Mx/a/2012/014187 | 7 |
| Multifunctional foaming composition 1 | 15 |
| Multifunctional foaming composition 2 | 20 |
| Multifunctional foaming composition 3 | 13 |
| Multifunctional foaming composition 4 | 14 |
| Multifunctional foaming composition 5 | 13 |
| Multifunctional foaming composition 7 | 11 |
| Multifunctional foaming composition 9 | 22 |

The results show that the foaming compositions of the present invention recovered in more than three times the obtained by the brine 1 and more than 2 times the obtained by the foaming composition of the patent application MX/a/2012/014187.

EXAMPLE 22

Was carried out the evaluation of the recovery factor for the multifunctional foaming compositions 2 and moreover was evaluated the foaming composition 9 in order to determine the effect of a zwitterionic liquid geminal, at a concentration of 0.2 Wt %, using as evidence the brine 5 whose composition is described in Table 14, carbonate rock fragments, oil whose composition is shown in Table 15 and a temperature range of 80 to 100° C. In FIG. 27 are showing a graphic with the behavior recovery factor with respects to the time for the tested products. In Table 16 are showing the results of the accumulated recovery factor for brine 5, the foaming composition of the patent application MX/a/2012/014187 and the foaming compositions 2 and 9.

TABLE 14

| | CONCENTRATION (mg/L) |
| --- | --- |
| CATIONS | |
| $Na^+$ | 10906.47 |
| $Mg^{2+}$ | 777.51 |
| $Ca^{2+}$ | 2320.04 |
| $Fe^{2+}$ | 0.1123 |
| $Ba^{2+}$ | 29.79 |
| ANIONS | |
| $Cl^-$ | 112602.68 |
| $SO_4^{2-}$ | 75.06 |
| $HCO_3^-$ | 941.89 |

TABLE 15

| Fraction | |
| --- | --- |
| Saturates (wt %) | 13.4 |
| Aromatics (wt %) | 24.76 |
| Resins (wt %) | 51.01 |
| Asphaltene (wt %) | 10.44 |
| Acid number (mg KOH/gr) | 1.83 |
| Basic number (mg KOH/gr) | 2.12 |
| Gravity API | 18 |

TABLE 16

| PRODUC | ACCUMULATED RECOVERY FACTOR (%) |
|---|---|
| BRINE 5 | 3.1 |
| Foaming composition of the patent application Mx/a/2012/014187 | 5.9 |
| Multifunctional foaming composition 2 | 8.4 |
| Multifunctional foaming composition 9 | 12.4 |

The results show that the foaming compositions of the present invention recovered more than twice the obtained by the brine 5 and in to more than 42% the obtained by the foaming composition of the patent application MX/a/2012/014187.

EXAMPLE 23

Was carried out an evaluating of the recovery factor for the multifunctional foaming compositions 2 and 9, at a concentration of 0.2 Wt %, using as evidence the brine 6 whose composition is described in Table 17, carbonate rock fragments, oil whose composition is shown in Table 18 and in a temperature range of 80 to 100° C.

TABLE 17

| | CONCENTRTION (mg/L) |
|---|---|
| CATIONS | |
| $Na^+$ | 10906.47 |
| $Mg^{2+}$ | 777.51 |
| $Ca^{2+}$ | 2320.04 |
| $Fe^{2+}$ | 0.1123 |
| $Ba^{2+}$ | 29.79 |
| ANIONS | |
| $Cl^-$ | 112602.68 |
| $SO_4^{2-}$ | 75.06 |
| $HCO_3^-$ | 941.89 |

TABLE 18

| Fraction | Poza Rica |
|---|---|
| Saturated (wt %) | 30.68 |
| Aromatic (wt %) | 28.62 |
| Resins (wt %) | 39.35 |
| Asphaltene (wt %) | 1.32 |
| Acid number (mg KOH/gr) | 0.20 |
| Basic number (mg KOH/gr) | 1.7 |

In FIG. 28 are showing a graph with the behavior of the recovery factor with respect to time for the tested products.

In Table 19 are showing the accumulated recovery factor results for the brine 6 shown, the foaming composition of the patent application MX/a/2012/014187 and the foaming compositions 2 and 9.

TABLE 19

| PRODUCT | ACCUMULATED RECOVERY FACTOR (%) |
|---|---|
| BRINE 6 | 0.5 |
| Foaming composition of the patent application Mx/a/2012/014187 | 2.7 |
| Multifunctional foaming Composition 2 | 8.3 |
| Multifunctional foaming Composition 9 | 10.8 |

The results show that the foaming compositions of the present invention recovered more than sixteen times that the obtained by the brine 6 and more than 2.5 times that the obtained by the foaming composition of the patent application MX/a/2012/014187. With the above is demonstrated the technological advantage of using the foaming compositions of the present invention as modifiers of wettability under atmospheric pressure, temperature range of 80 to 100° C., high-salinity and high-hardness brines, oil and rock fragments of different compositions.

c) Determination of recovery factor with limestone cores into Amott cells. The test method consists in determining the oil recovery factor at different temperatures, due to processes of spontaneous imbibition of water in small carbonate rock cores with permeabilities- and porosities-known.

Elements Required for the Test:
Amott cells.
Recirculating of temperature controlled.
limestone core diameter 3.81 cm×7 cm long and its permeabilities and porosities known.
Camera.
Typical crude oil of carbonate reservoirs.
Typical brine of the reservoir that possess high salinities.
Supramolecular complex or chemical to evaluate.
Analytical balance.
Glass equipment of extraction (SOXHLET).
Volumetric Glassware.
Convection oven.

Test Procedures:
1) To submit to hydrocarbon extraction processes with different organic solvents in a SOXH LET system the carbonated cores (dolomite or limestone) or sandstone from the reservoir for which it is intended to conduct the study. The extraction processes are performed continuously, sequenced and reflux; using as solvents: a) Xylene b) Chloroform, c) Methanol, d) Xylene e) Chloroform, f) Methanol) and g) Xylene. The duration time of each extraction stage is one day and the total process time is 7 days.
2) Determining the absolute permeability to helium for the cores, and its effective porosity
3) Dry cores in an oven at 100° C. and record the weight after reaching a constant weight.
4) Contacting the cores with dead oil from the reservoir of interest, for 5 days at the temperature of interest and a pressure of 140±5 lbs in an aging cell.
5) Drain at room temperature and atmospheric pressure the impregnated cores with dead oil to note that there is no dripping. The runoff process takes about 12 h and for this are using a wire mesh of 200.
6) Weigh the cores impregnated with dead oil and obtain the weigh difference by the amount of oil adsorbed through the porous media.
7) Prepare 500 ml of aqueous solution (brine) to evaluate the concentration of chemical required in the test.
8) Placing the core impregnated with the dead oil in to the Amott cell and carefully add 350 milliliters of chemical to evaluate to the required concentration.
9) Increase the temperature of the system to the temperature to which it is intended make the evaluation of the chemical perform or sample in study and maintain it for a period of time which is intended to determine the recovery factor under the temperature and salinity conditions.
10) Quantify the amount of oil produced due to processes of spontaneous imbibition of water under the conditions of study and determine the recovery factor according to the following equation:

$$F_r = \frac{A_r}{A_{omp}} \times 100 \qquad \text{Equation 9}$$

where:
$F_r$=Recovery Factor
$A_r$=Oil recovered
$A_{omp}$=Original oil adsorbed in the porous medium.

EXAMPLE 24

Was carried out the evaluating of the recovery factor for the multifunctional foaming composition 2 as well as the multifunctional foaming composition 9 in order to evaluate the effect of the zwitterionic liquid in the composition at a concentration of 0.2 Wt %, using as evidence the brine 4 whose composition is shown in example 14, crude oil whose composition are showing in Table 20 and limestone cores at a temperature of 90° C.

In Tables 20 and 21 are showing the oil and core of limestone characteristics used.

TABLE 20

| Core Measures (cm) | Absolute permeability to helium (mD) | Core Porosity (%) |
|---|---|---|
| 3.81 × 7 | 120 | 19 |

TABLE 21

| Fraction (wt %) | |
|---|---|
| Saturates | 40.91 |
| Aromatics | 36.13 |
| Resins | 22.30 |
| Asphaltene | 0.20 |

In FIG. 29 are showing the clean core and during the test, as well as the recovery of oil. In FIG. 30 are showing a graph with the behavior of the recovery factor with respect to time for the tested products. In Table 22 are showing the results of the recovery factors for the foaming compositions 2 and 9 of the present invention at a concentration of 0.2 Wt %. The results shown in Table 22 indicate that the multifunctional foaming compositions 2 and 9 recover 9 times more of oil with respect to the recovery which was obtained using only the brine 4.

TABLE 22

| PRODUCT | Recovery Factor (%) |
|---|---|
| BRINE 4 | 2.5 |
| Multifunctional foaming Composition 2 | 20 |
| Multifunctional foaming Composition 9 | 25 |

With respect to the multifunctional foaming composition 9, recovered 5% more oil compared to composition 2. With the above it is demonstrated the technological advantage of using the foaming compositions of the present invention as well as the zwitterionic liquids use into the foaming compositions as modifiers of wettability under atmospheric pressure at a temperature of 90° C., ultrahigh salinity and high hardness brine, oil and rock-core of the carbonate type.

d) Determination of recovery factor in a glaze reactor of high temperature. The equipment consists of a glaze reactor where is introduced a core previously oil impregnated that comes into contact with aqueous medium with chemical. The experimental conditions are as follows:
Experimental pressure: 140 psi (10 kg/cm²)
Experimental Temperature: 150° C.
Limestone core 7×3.8 cm.
Brine 4
Injection gas: Nitrogen Procedure:
Elements Required for Testing:
Glaze reactor
Recirculating of temperature controlled.
Limestone core of permeabilities and porosities known.
Camera.
Typical crude oil of carbonate reservoirs.
Typical brine of the reservoir that possess ultra-high salinities.
Supramolecular complex or chemical to evaluate.
Analytical balance.
Glass equipment of extraction (SOXHLET).
Volumetric Glassware.
Convection oven.

Test Procedures:
1) To submit to hydrocarbon extraction processes with different organic solvents in a SOXHLET system to the cores carbonated rock (dolomite or limestone) or sandstone from the reservoir for which it is intended to conduct the study. The extraction processes are performed continuously, sequenced and reflux; using as solvents: a) Xylene b) Chloroform, c) Methanol, d) Xylene e) Chloroform, f) Methanol) and g) Xylene. The duration of each extraction stage is one day and the total process time is 7 days.
2) Determining the absolute permeability to helium of the cores as well as its effective porosity.
3) Dry cores in an oven at 100° C. and record the weight after reaching a constant weight.
4) Put in contact the cores with dead oil from the reservoir of interest, for 5 days at the temperature of interest and a pressure of 140±5 psi (10 kg/cm*) in an aging cell.
5) Drain at room temperature and atmospheric pressure the impregnated cores with dead oil to note that there is no dripping. The runoff process takes about 12 h and for this using a wire mesh of number 200.
6) Weigh the impregnated cores with dead oil and obtain through weigh difference the amount of oil adsorbed in the porous media.
7) Prepare 500 mL of aqueous solution (brine) to evaluate to the concentration of required chemical in the test.
8) Placing the impregnated core with the dead oil in the glaze reactor and carefully add 500 mL of chemical to evaluate to the required concentration.
9) It is pressurized with nitrogen up to 140 psi (10 kg/cm²).
10) Increase the system temperature to the temperature to which it is intended to make the performance evaluation of the chemical or sample in study and maintain it for a period of time which is intended to determine the recovery factor under the conditions of temperature and salinity.
11) Quantify the amount of produced oil due to processes of spontaneous imbibition of water under the conditions of study and determine the recovery factor according to the following equation:

$$F_r = \frac{A_r}{A_{omp}} \times 100 \qquad \text{Equation 10}$$

where:

$F_r$=Recovery Factor $A_r$=Oil recovered $A_{omp}$=Original oil adsorbed in the porous medium.

The equipment used is shown in FIG. 31.

EXAMPLE 25

It was carried out the evaluation of the recovery factor for the foaming composition 2 at a concentration of 0.2 Wt %, using as evidence the brine 4 whose composition is shown in example 14, crude oil whose composition is shown in Table 23 and limestone cores at a temperature of 90° C. In Tables 23 and 24 are showing the characteristic oil and limestone core used.

TABLE 23

| Core Measures (cm) | Absolute permeability to helium (mD) | Core porosity (%) |
|---|---|---|
| 3.81 × 7 | 118 | 20 |

TABLE 24

| Fraction (wt %) | |
|---|---|
| Saturates | 40.91 |
| Aromatics | 36.13 |
| Resins | 22.30 |
| Asphaltene | 0.20 |

In FIG. 32 are showing the equipment used and the core during the test.

In Table 25 are showing the results of the total recovery factor for multifunctional foaming composition 2 of the present invention at a concentration of 0.2 Wt %.

TABLE 25

| PRODUCT | RECOVERY FACTOR (%) |
|---|---|
| BRINE 4 | 10.5 |
| Multifunctional foaming composition 2 | 39.1 |

The results shown in Table 25 indicate that the multifunctional foaming composition 2 recovers almost 4 times more oil with respect to the recovery that was obtained using only the brine 4. With the above is demonstrated the technological advantage of using the foaming compositions of the present invention as modifiers of wetting under high temperature conditions (150° C.) and brine of ultra-high salinity and high hardness, oil and rock core type carbonated.

e) Determination of the change in contact angle at reservoir conditions. Was carried out the determination of the change of contact angle at reservoir conditions using a high pressure cell and high temperature.

EXAMPLE 26

It is determined the change of contact angle generated by the multifunctional foaming composition 2 to a pressure of 3820 psi (269 Kg/cm$^2$) and a temperature of 132° C. using an oil whose composition is shown in Table 26 and the brine 3 whose composition is shown in Example 14.

TABLE 26

| Fraction | |
|---|---|
| Saturates (wt %) | 31.88 |
| Aromatics (wt %) | 48.84 |
| Resins (wt %) | 18.81 |
| Asphaltene (wt %) | 0.38 |
| Acid number (mg KOH/gr) | 0.29 |
| Basic number (mg KOH/gr) | 1.33 |

In FIG. 33 are showing the change in contact angle generated by the multifunctional foaming composition 2 to reservoir conditions. The foaming composition change the contact angle of oil, of 0° to 141.7° of a fragment of carbonate rock, this result indicates that the multifunctional foaming composition 2 is able to favorably change the wettability at reservoir conditions and high salinity.

f) Determination of the recovery factor of crude oil by injecting foam into a displacement test at reservoir conditions.

To perform the displacement test where use carbonate rock cores, naturally fractured and were accommodated in an experimental cell forming a stacking (FIG. 34) which was with a vertical annular fracture between each of the fragments (with a thickness of 1.0 mm), between each core a filter paper is placed so that there is continuity capillary of a medium to another and the rock cores are between two diffusers, one at each end. With the installed system is carried out the water and oil saturation to reproduce the initial conditions of saturation of the fluids. In FIG. 35 the laboratory cell and the stacking of the cores are shown.

Experimental methodology. The experiment consists of carrying out a foam injection in a stack of rock cores at reservoir conditions to estimate the recovery factor.

This test is performed by the following steps:

First Stage. Oil recovery by pressure reduction. This part of the experiment simulates the behavior of primary recovery following the trend of the decrease in reservoir pressure, through this process is carried out a recovery of oil from the bottom of the cell. The experimental start with the stabilized system at reservoir conditions (initial reservoir conditions), then the oil recovery process begins by pressure reduction of the system, starting from an initial reservoir pressure to a final pressure.

Pressure maintenance. Once obtained the first stage of the oil recovery by pressure reduction, this pressure reached in the system remains constant through a system called back pressure regulator, which prevents that the pressure can be raised and/or reduce of the desired value to continue with the experimentation.

Foam injection in the stack. After reaching the desired pressure in the previous stage, the next step is to inject the foam. The foam was generated within the container or heating oven which also contains the displacement cell.

The foam injection is performed in two stages: The first stage involves the injection of a soaking pothole with wet foam, i.e. foam of poor quality. For this experiment was 80% of surfactant and 20% of gas. This pothole is small. The second stage is the injection of dry foam or higher quality and the used was of 80% by 20% of liquid. This pothole is large and with it ends the test.

Analysis of the experiment and calculation of the recovery factor. Once it concludes with the experiments, we proceed to conduct a verification of the obtained volumes of oil and water to account all the samples to be collected and separated according to the type of fluid. Once you have counted the recovered fluids, it is counted with the necessary information to make the interpretation of the behavior of the recovery factor, so that you can generate graphics of volume of production versus time, recovery factor versus time, production of water, gas, etc. They are also generated Tables and you can be obtained photographic images of the fluid samples obtained, rock samples, etc.

EXAMPLE 27

It was carried out the determination of the recovery factor of crude oil through the injection of the generated foam by the multifunctional foaming composition 2 of this invention in a displacement test at reservoir conditions.

Test characteristics. The oil recovery process and the injected volumes of fluid were as follows (volumetric flow rate of injection test=5 ml/h):
Recovery of oil by reducing pressure of 4762 psi (335 kg/cm$^2$) to 2914 psi (205 kg/cm$^2$).
Injection of wet foam, pothole of approx. 5.6% of Vp *
Injection of dry foam, pothole of 47.2% of Vp *
Injection of surfactant, pothole 10% of Vp *
The pore volume (Vp) total of the system, i.e. including the annular fracture, and the porosity of the fragments.

Oil recovery by pressure reduction. This part of the experiment simulates the behavior of primary recovery following the trend of the decrease in reservoir pressure, through this process is carried out a recovery of oil from the bottom of the cell. The experimental initiation is with the system stabilized at reservoir conditions (initial reservoir conditions), then the oil recovery process begins by pressure reduction of the system, starting from an initial reservoir pressure of approx. 335 Kg/cm$^2$ (4760 psi) to a final pressure of 205 Kg/cm$^2$ (2911 psi), considered as the pressure at which a reservoir could be found after a primary recovery and the experiment was carried out at a temperature of 160° C. In FIG. 36 are showing the oil recovery with respect to time while the system reduce the pressure.

Foam injection in the stack. Reaching the desired pressure in the previous stage, the next step is foam injection. The foam is generated inside a cell of high pressure and temperature and immediately is injected to the cell that contains the stack. The foam injection is performed in two stages: the first stage involves the injection of a soaking pothole with a wet foam, i.e. a foam of poor quality. For this experiment was 80% of surfactant and 20% of gas. This pothole is small regularly. The second stage is the injection of dry foam or higher quality and the used was of 80% by 20% liquid. This pothole is large and with it ends the test. In FIG. 37 it presents the oil recovery with respect to the time while are injecting the foam at the top of the system. Once it concludes the experiments, we proceed to conduct a verification of the obtained volumes of oil and water to account all the samples to be collected and separated according to the type of fluid. In Table 27 are showing the recovery factors obtained during the displacement test by going reducing the pressure in the system and inject the formed foam with multifunctional foaming composition 2 of the present invention.

TABLE 27

Recovery factor obtained in the displacement test.

| Cumulative recovery factor (%) | |
|---|---|
| pressure reduction | Foam injection |
| 9.19 | 79.03 |

With the above it is demonstrated the technological advantage of using the foaming compositions of the present invention to increase the recovery factor under high temperature and high salinity conditions.

III) Determination of Adsorption on Mineral of Carbonated Type. The Methodology Consists in the Quantitative Determination of Adsorption by High-Performance Liquid Chromatography (HPLC) of a Chemical in Contact with Mineral of Carbonated Type.
Procedure:
a) The rock (Limestone) is fragmented into 1 m$^2$/g.
b) Small fragments of rock are washed sequentially and reflux temperature of the following solvents: a) Hexane b) Toluene c) Chloroform and d) Methanol.
c) Rock fragments are dried in an oven at a temperature of 100° C. until reaching a weight constant.
d) Solution of 5,000 ppm are prepared of the chemical in the desired brine performing dilutions with the same solvent to concentrations of 4,000; 3,000; 2,000; 1,000; 500; 200 and 100 ppm.
e) It weighs 4 g of rock were adding 20 ml of different concentrations of the chemical prepared.
f) The dissolution/rock/chemical is stirred for 12 h at room temperature.
g) Finished the stirring time the sample is filtered on a glass funnel with filter of 2 μm followed by a 0.5 μm filter.
h) Subsequently it conducted an injection of 15 μl into the HPLC for each prepared concentration.

EXAMPLE 28

It was carried out the determination of the adsorption of multifunctional foaming composition 2 of the present invention on limestone at a concentration of 0.2 wt % (2,000 ppm) using the brine 2 whose characteristics are presented in Example 14. The adsorption result for the foaming composition 2 for a concentration of 2,000 ppm was 4.35 mg of foaming composition 2 per gram of rock. In order to determine the effect from the corrosion to use the foaming compositions of the present invention in conjunction with ultra-high salinity brines, it was conducted to determine the efficiency of corrosion inhibition as described below.

IV) Determination of the efficiency of corrosion inhibition. It is a gravimetric test commonly called dynamic wheel (Wheel test) simulating the typical corrosive environment of oil production. It is a dynamic process developed for fluids (oil, water and inhibitor (foaming composition)).
Equipment and reagents for test
a) Dynamic evaluation of corrosion inhibitors with temperature controller, stirrer speed of 30 rpm and with capacity for 52 bottles of 180 mL.
b) Bottles of 200 ml capacity.
c) Carbon steel coupons of SAE 1010, of dimensions 1"×0.5"×0.010".
d) Glass equipment for the preparation of corrosive medium. This consists of a glass reactor of 2 L of capacity equipped with a cooling bath, mechanical stirrer, sparger for gas (nitrogen and hydrogen sulfide) possess an outlet connected to two traps in series connected (the first with hydroxide sodium in flakes and the second with another solution of sodium hydroxide at 20%) in order that the hydrogen sulfide does not contaminate the environment.
e) Potentiometer for measuring pH.

EXAMPLE 29

It was carried out the evaluation of the efficiency as corrosion inhibitor for the foaming composition 2 at a concentration of 0.2 Wt % (2,000 ppm), using as test medium a mixture of brine 1 and 3 described in Examples 11 and 14, in a 3:1 ratio respectively and crude oil whose composition is described in Table 28.

TABLE 28

| Fraction (Wt %) | |
|---|---|
| Saturates | 40.91 |
| Aromatics | 36.13 |
| Resins | 22.30 |
| Asphaltene | 0.20 |

The test conditions are shown in Table 29.

TABLE 29

| | |
|---|---|
| Temperature | 70° C. |
| Aqueous medium | Mixture of brines with 600 +/− 50 ppm de $H_2S$ |
| Test duration | 46 h |
| Organic medium | Crude oil |
| Volume ratio of brine/organic medium | 90/10 |
| Test volume | 180 mL |
| pH of the medium | 4.8 |
| Witness corrosion (metal coupons) | Steel SAE 1010 |

Obtaining of results. The difference in weight of the coupons before and after being exposed to the corrosive environment for 46 h, is a direct indication of lost metal due to corrosion. The efficiency as a corrosion inhibitor is established by comparing the corrosion rates of the control or target with the velocities or target having a certain concentration of inhibitor product as shown in the following formula:

$$\% \text{ of efficiency} = \frac{V_o - V}{V_o} \times 100 \quad \text{Equation 11}$$

where:

$V_o$=Corrosion rate of the target coupon (Reference).

V=speed of corrosion of the coupon with corrosion inhibitor.

In Table 30 are showing the results for the foaming compositions 2 and 9, at a concentration of 2,000 ppm.

In FIG. 38 are showing the metal coupons used in the test.

TABLE 30

| Produc | Corrosion rate (mpy) | Efficiency (%) |
|---|---|---|
| Reference | 37.5 | — |
| Multifunctional foming composition 2 | 2.7 | 92.5 |

*mpy: milli-inch per year

The results show that the foaming compositions 2 and 9 of the present invention possess anti-corrosive properties in acid- and high salinity environments, characteristics of pipelines of crude oil production. Moreover, in order to determine what would be the effect of have in the foaming composition a zwitterionic liquid were evaluated the foaming composition 9 under the same conditions described in this example. In Table 31 are showing the result of the efficiency of corrosion inhibition for foaming composition 9.

TABLE 31

| Product | Corrosion rate (mpy) | Efficiency (%) |
|---|---|---|
| Reference | 37.5 | — |
| Multifunctional foming composition 9 | 1.9 | 96.5 |

*mpy: milli-inch per year

The above results show that the multifunctional foaming composition 9 increased by by 4% more the efficiency as a corrosion inhibitor of the multifunctional foaming composition 2, in acids and high salinity environments, characteristics of production pipelines of crude oil and production rigs.

V) Experimental evaluation of the anti-scale properties and dispersants of mineral salts. The evaluation of anti-scale ability of foaming compositions of the present invention was performed using four different tests:

a) Determination of the inhibition of mineral scale of calcium sulfate as much as qualitative as well as quantitative, b) Determination of the scale inhibition of calcium carbonate, calcium sulfates, barium and strontium, c) Determination of the inhibition of mineral scale at reservoir conditions (high temperature and high pressure) and d) Determination of distortion and crystal modification of calcium-sulfate and -carbonate by scanning electron microscopy.

a) Determination of Mineral Scale Inhibition of Calcium Sulfate.

In the case of calcium sulphate. The method consists in mixing two solutions to induce the formation of calcium sulfate.

1. Are preparing two solutions that containing calcium and sulphate ions respectively.
   a) The solution containing calcium ions, containing: 7.5 g/L of NaCl+11.1 g/L of $CaCl_2 \cdot 2H_2O$.
   b) The solution containing sulfate ions: containing: 7.5 g/L NaCl+10.66 g/L of $Na_2SO_4$.
2. Are prepare the desired concentration of inhibitor in the solution containing the sulfate ions.
3. Are mixed 50 ml of each one of the solutions and the desired concentration of inhibitor and poured all in a sealed flask of 250 ml.
4. Are introduced the flasks in an oven for 24 h at a constant temperature of 70° C.
5. After 24 h qualitatively are determined if they were formed or not calcium sulfate crystals.
6. To determine quantitatively, after 24 h are allowed to cool the flasks to room temperature. Are filtered the solids that they have formed and a sample of 1 ml is taken and is completed with 10 ml using ultrapure water.
7. The solution was analyzed by inductively coupled plasma (ICP), in order to obtain the remaining calcium concentrations of ion in the solution.

A control is prepared containing only the amount of calcium ions present in the target. The percent of inhibition was calculated with the following expression (1):

$$\% \text{ Inhibition} = \frac{Ca^{+2}_{SAP} - Ca^{+2}_{RAP}}{Ca^{+2}_{Tg} - Ca^{+2}_{RAP}} \times 100 \quad \text{Equation 12}$$

Were:

SAP=sample after precipitation
RAP=Reference after precipitation
Tg=Target

EXAMPLE 30

It was carried out the qualitative determination of the inhibitory capacity of calcium sulfate scale for the multifunctional foaming compositions 1, 2 and 3. Coming up next are shown in Table 32 the results at a concentration of 2,000 ppm of the foaming compositions 1, 2 and 3.

TABLE 32

Results of the inhibition of calcium sulfate

| Product | Crystal formation |
|---|---|
| Reference | Yes, a great quantity |
| Multifunctional foaming Composition 1 | Little amount |
| Multifunctional foaming Composition 2 | No formation |
| Multifunctional foaming Composition 3 | No formation |

In FIG. 39 are showing the vials used in the test.

EXAMPLE 31

It was carried out the determination of the inhibitory capacity of scale of the calcium sulfate for the multifunctional foaming compositions 2 and 9. Coming up next are shown in Table 33 the results at different concentrations for the compositions 2 and 9.

TABLE 33

Results of the inhibition of calcium sulfate

| Product | Concentration | Calcium concentration (ppm) | Efficiency (%) |
|---|---|---|---|
| Control Solution | — | 1510 | — |
| Reference | — | 1017 | 0 |
| Foming composition 2 | 1000 | 1509 | 99.8 |
|  | 1500 | 1508 | 99.5 |
|  | 2000 | 1508 | 99.5 |
| Foming composition 9 | 1000 | 1503 | 98.6 |
|  | 1500 | 1500 | 98.0 |
|  | 2000 | 1476 | 93.1 | b) Determination of the inhibition of calcium carbonate, calcium sulfates, barium and strontium scales.

This test involves mixing 2 incompatible water (injection water-formation water) in order to induce precipitation of inorganic salts of calcium carbonate, sulfates of calcium, strontium and barium. Such salts are the main problem in oil extraction operations offshore. The methodology is the follows:
1. Are prepare 2 brines whose compositions are described in Table 34 and containing the calcium, strontium, barium, sulfate and bicarbonate ions;
2. Are prepare the desired inhibitor concentration in the brine A.
3. Are mixed 5 ml of each one of the briens A and B and the desired concentration of inhibitor and poured all in a closed tube of 25 mL and is stirred.
4. System turbidity is measured.

TABLE 34

Compositions of brines used.

| Sal | Brine A (ppm) | Brine B (ppm) |
|---|---|---|
| NaCl | 101564 | 3966 |
| KCl | 4157 | 147 |
| MgCl$_2$ | 26031 | 286 |
| CaCl$_2$ | 119811 | 833 |
| SrCl$_2$ | 2282 | — |
| BaCl$_2$ | 1832 | — |
| Na$_2$SO$_4$ | — | 1874 |
| NaHCO$_3$ | — | 260 |
| Na$_2$CO$_3$ | — | 4 |

EXAMPLE 32

With the purpose of determining the effect of the foaming compositions derived from the present invention on a system that containing a high concentration of calcium, barium, strontium, sulphate and bicarbonate ions, the foaming composition 2 were evaluated in the brine mixture A and B. Coming up next, in Table 35 are showing the results of turbidity in NTU (nephelometric units) as from the mixture of brine without chemical and the brine mix with the multifunctional foaming composition 2.

Table 35. Results of Turbidity in the Scale Inhibition of: CaCO$_3$, CaSO$_4$, BaSO$_4$ and SrSO$_4$.

TABLE 35

| Produc | Turbidity to 1,000 ppm (NTU) | Turbidity to 2,000 ppm (NTU) |
|---|---|---|
| Brine mixture A y B | <1000 | <1000 |
| Foaming composition 2 | 22.1 | 16.2 | c) Determination of the inhibition of mineral scale at reservoir conditions (high pressure and high temperature) characteristics of oil fields.

The evaluation as mineral scale inhibitor takes place in a mixture of two incompatible brines under reservoir conditions (high pressure and high temperature).

Assessment Methodology.
1.—Clean the equipment to be used:
 peephole
 BPR (back pressure regulator)
 Transfer cylinder
2. Monitoring sensors are calibrated:
 Pressure
 Temperature
3. Arm the system.
4.—The water mixture is injected with and without product to the required pressure.
5. The temperature is raised to the required condition and the pressure is maintained by the BPR
6. The system is isolated and allowed monitor the pressure and temperature.
7. Are taken photographic images during test to observe their behavior and the possible formation of crystals.

The system for high pressure and high temperature used for performing the determinations of inhibiting mineral scale at reservoir conditions (high pressure and high temperature) characteristics of oilfield consists of injection pumps, transfer cylinders, back pressure regulator, temperature control system, pressure monitoring system, digital camera and experimental cell.

EXAMPLE 33

It was carried out the evaluation as mineral scale inhibitor of the multifunctional foaming composition 2 of this invention, which was dissolved in a mixture of two incompatible brines (brines 7 and 8) under reservoir conditions (high pressure, high temperature). In Tables 36 and 37 are showing the compositions of the brines used in the experiment.

TABLE 36

Compositions of the brines.

| | Brine 7 mg/L | Brine 8 mg/L |
|---|---|---|
| Cations | | |
| Sodium | 11742.09 | 101894 |
| Calcium | 448 | 24709.6 |
| Magnesium | 1288.43 | 341.9 |
| Iron | 0.1 | 0.01 |
| Barium | — | 23.91 |
| Strontium | 7.84 | 1417 |
| Anions | | |
| chlorides | 19900 | 112106 |
| Sulfates | 3650 | 145.9 |
| Carbonates | 13.12 | 0 |
| Bicarbonates | 84.18 | 145.18 |

TABLE 37

Hardness and salinity of the brines.

| | Brine 7 (mg/L) | Brine 8 (mg/L) |
|---|---|---|
| Total hardness, as $CaCO_3$ | 6420 | 63181 |
| Calcium hardness, as $CaCO_3$ | 1120 | 61774 |
| Magnesium hardness, as $CaCO_3$ | 5300 | 1407 |
| Salinity as NaCl | 32804 | 214000 |

Test Conditions

Temperature: 163° C.
Pressure: 5,500 psi (387 Kg/cm$^2$)
The water were mixed in a ratio of 3:1, (brine 7/brine 8)
Results The test duration was about of 48 h, at time in which the system conditions were kept constant in a temperature of 163° C. and 5,500 psi (387 Kg/cm$^2$) of pressure. During this time, the system behavior is monitored and photographic images were taken to evaluate the presence or formation of mineral precipitates.

In FIG. 40 are showing the photographic images for: a) Mixture of formation water+sea water without chemical at the start of the test, b) mixture of formation water+sea water with crystals after 4 h of start the proof, c) mixture of formation water+sea water with the foaming composition 2 at the start the test and d) mixture of formation water+sea water with the foaming composition 2 without the presence of crystals after 48 h of started the test. Making a comparison between the image taken in the initial condition and the taken at different times under the same conditions of pressure and temperature, no precipitate minerals formation is observed, so that the performance as a scale inhibitor for the foaming composition 2 is checked at conditions of high salinity, high pressure and high temperature.

d) Determination by scanning electron microscopy the distortion and crystal modification of sulfate and calcium carbonate.

The mineral scale deposited on the rock and that obstructing the porosity of the reservoir may be distorted or modified with the use of chemicals in order to detach them from the rock and disperse forming smaller particles and that can be removed with the flow.

In the case of calcium sulphate, the methodology is as follows: the solutions that containing the calcium and sulfate ions are:
a) The solution containing calcium ions, contains 7.5 g/L NaCl+2.22 g/L of $CaCl_2.2H_2O$.
b) The solution containing sulfate ions: contains 7.5 g/L NaCl+21.32 g/L of $Na_2SO_4$.
1. Are prepared the desired concentration of chemical in the solution that containing the sulfate ions.
2. Are mixed 5 ml of each of the solutions and the desired concentration of inhibitor and poured all in a sealed tube of 25 mL.
3. The tubes were placed in an oven for 24 h at a constant temperature of 70° C.
4. After 24 h the bottles are allowed to cool to room temperature without allowing it to exceed 2 h. The solids that have been formed are filtered.
5. The solids formed in the tubes are analyzed and their morphology was observed by scanning electron microscopy (SEM).

In the case of calcium carbonate, the methodology is as follows: The solutions that containing the calcium and bicarbonate ions are:
a) Solution containing calcium ions: 12.15 g/L $CaCl_2.2H_2O$, 3.68 g/L $MgCl_2.6H_2O$ and 33 g/L of NaCl.
b) Solution containing bicarbonate ions: 7.36 g/L $NaHCO_3$ and 33 g/L of NaCl.
1. Are preparing the desired concentration of chemical in the solution containing the sulfate ions.
2. Are mixed 5 ml of each one of the solutions and the desired concentration of inhibitor and poured all in a sealed tube of 25 mL.
3. The tubes were placed in an oven for 24 h at a constant temperature of 70° C.
4. After 24 h the bottles are allowed to cool to room temperature without allowing it to exceed 2 h. The solids that have formed are filtered.
5. The solids formed in the tubes are analyzed and their morphology was observed by scanning electron microscopy (SEM).

EXAMPLE 34

With the purpose of determine the effect of the foaming compositions derivatives of the present invention on calcium sulphate crystals, the multifunctional foaming composition 2 was evaluated using two brines with high concentrations of calcium and sulphate ions. In FIG. 41 are showing the images and compositions of the crystals formed from mixing of the solutions shown for: a) without chemical and b) with 2,000 ppm of the foaming composition 2. Note that it is possible observe clearly how the foaming composition 2, fragments and distorts the calcium sulfate crystals, thereby inhibiting the growth of more-larger crystals.

EXAMPLE 35

With the purpose of determine the effect of the foaming compositions derivatives of the present invention on calcium carbonate crystals, the multifunctional foaming composition 2 was evaluated using two brines with high concentrations of calcium and bicarbonate ions.

In FIG. 42 are showing the images and compositions of the formed crystals from: a) The mixture of the solutions without chemical and b) mixing with 2,000 ppm of the foaming composition 2. From the Images it can be clearly seen as the foaming composition 2, fragment and distorts calcium carbonate crystals, thereby inhibiting the growth of crystals.

Assessment of the acute toxicity with Artemia franciscana. This method is applicable for evaluation of acute toxicity in water and water-soluble substances. In freshwater bodies, industrial and municipal wastewater, agricultural runoff and pure substances or combined or leachate and solubilize fraction in soils and sediments. The determination of the acute toxicity was carried out through the Mexican standard NMX-AA-087-SCFI-2010, which establishes the method for measuring the acute toxicity using the organism named Artemia franciscana.

EXAMPLE 36

It was carried out the toxicity determination of the foaming composition 2 of the present invention through the Mexican standard NMX-AA-110-1995-SCFI, which establishes the method for measuring toxicity using the organism named "Artemia franciscana Kellogg" (Crustacea—Anostraca) and the results are shown in Table 38.

TABLE 38

Toxicity of the multifunctional foaming composition 2.

| chemicals | $CE_{50}$ (ppm) | * Toxicity Category |
| --- | --- | --- |
| Multifunctional foaming composition 2 | 118.38 | Particularly nontoxic |
| | 111.54 | Particularly nontoxic |
| | 105.67 | Particularly nontoxic |
| Average | 111.86 | Particularly nontoxic |

* Concentration range in ppm, classification, category 5: 0.01-0.10, extremely toxic; 4: 0.1-1.0, highly toxic; 3: 1-10, moderately toxic; 2: 10-100, slightly toxic; 1: 100-1000, and particularly nontoxic 0 > 1000, nontoxic.
$^a$ Toxicity category (UK) CNS for applying chemicals used in the production of hydrocarbons in the North Sea.

The result of acute toxicity indicates the foaming composition 2 that is particularly nontoxic to the organism Artemia franciscana.

Added to the above and based to the Mexican standard NRF-005-PEMEX-2009 where it is established that so they can be used chemicals in the oil industry which states that they can be used chemicals in the oil industry must be comply the following environmental criteria. For marine environments, using the microorganism Artemia franciscana the limit in toxicity units (UT), should not exceed 2.

The toxicity units (UT) are computed through the value $LC_{50}$ resulting from the toxicity test, from the following relation:

$$UT = \frac{1}{CL_{50}} \times 100 \qquad \text{Equation 13}$$

where:
UT=Acute Toxicity Units
$CL_{50}$=Concentration of inhibitor (in mg/L which causes 50% mortality of exposed organisms).

Therefore, the multifunctional foaming composition 2 of this invention possess a UT=0.89, so passing the Mexican standard NRF-005-PEMEX-2009 and can be used in equipment and pipeline of the oil and chemical industry that using sea water or formation water oil reservoirs and that are installed offshore.

With the above it is demonstrated the technological advantage of using the multifunctional foaming compositions of the present invention, due to exhibit foaming properties of high performance, wettability modifier, anti-corrosive and anti-scale to be supplied in ultra-high salinity brines and in acids environments characteristic of crude oil production pipelines. Added to the above such compositions are classified particularly as not toxic.

The invention claimed is:

1. A process for enhanced recovery and/or production assurance of a sequenced batch in oil producing wells located in naturally fractured carbonate reservoirs using a multifunctional foaming composition, comprising the steps of:
    a) generating a foam with a first batch; and
    b) injecting a gas as a displacement fluid,
    wherein the multifunctional foaming composition is characterized by a combination of supramolecular complexes derived from the interaction of:
        (a) an alkyl amido propyl hydroxysultaine and/or alkyl amido propyl betaines and/or alkyl hydroxysultaines and/or alkyl betaines;
        (b) an anionic surfactant, which is a mixture of
            (b1) alkyl hydroxy sulphonates of sodium; and
            (b2) alkenyl sulphonates of sodium;
        (c) a cationic surfactant which is tetra-alkyl ammonium halides; and
        optionally, (d) copolymers derived from itaconic acid/vinyl sulfonate of sodium and/or terpolymers derived from itaconic acid/sodium vinyl sulphonate/aconitic acid.

2. The process of claim 1, wherein the process is performed through an injection well and production well.

3. The process of claim 1, wherein the process is carried out through the same well which acts as an injector and producer.

4. The process of claim 1, wherein (a) is an alkyl amidopropyl hydroxysultaine.

5. The process of claim 4, characterized in that the weight ratio of (a):(b1):(b2):(c) is in the range of 2:1:1:0.1 to 4:2:1:0.5.

6. The process of claim 1, wherein (a) is alkyl amido propyl hydroxysultaines and (d) is present.

7. The process of claim 1, wherein (a) is alkyl amido propyl betaines and (d) is present.

8. The process of claim 1, wherein (a) is alkyl hydroxysultaines.

9. The process of claim 1, wherein (a) is alkyl hydroxysultaines and (d) is present.

10. The process of claim 1, wherein (a) is alkyl betaines.

11. The process of claim 1, wherein (a) is alkyl betaines and (d) is present.

12. The process of claim 4, wherein the alkyl amidopropyl hydroxysultaine is selected from the group consisting of ethyl amido-propyl hydroxysultaine, propyl-amido-propyl hydroxysultaine, butyl-amido-propyl hydroxysultaine, pentyl-amido-propyl hydroxysultaine, amido-propyl hexyl hydroxysultaine, amido-propyl-heptyl hydroxysultaine, octyl-amido-propyl hydroxysultaine, nonyl-amido-propyl hydroxysultaine decyl-amido-propyl hydroxysultaine, undecyl-amido-propyl hydroxysultaine, dodecyl amido-propyl hydroxysultaine, tetradecyl-amido-propyl hydroxysultaine, hexadecyl-amido-propyl hydroxysultaine, octadecyl-amido-propyl hydroxysultaine, hydroxysultaine coco-amido-propyl, and mixtures thereof.

13. The process of claim 7, wherein the alkyl amido propyl betaines are selected from the group consisting of ethyl amido propyl betaine, propyl-amido propyl-betaine, butyl-amido-propyl betaine, pentyl-amido-propyl betaine, hexyl-amido-propyl betaine, amido heptyl-amido-propyl betaine, octyl-amido-propyl betaine, nonyl-amido-propyl betaine, decyl-amido-propyl betaine, un-decyl-amido-propyl betaines, dodecyl amido propyl betaine, tetra decyl-amido-propyl betaine, hexadecyl-amido-propyl betaine, octa decyl-amido-propyl betaine, coco amido propyl betaine, and mixtures thereof.

14. The process of claim 8, wherein the alkyl hydroxysultaines are selected from the group consisting of ethyl hydroxysultaine, propyl hydroxysultaine, butyl-hydroxysultaine, pentyl-hydroxysultaine, hexyl hydroxysultaine, heptyl hydroxysultaine, octyl hydroxysultaine, nonyl hydroxysultaine, decyl hydroxysultaine, undecyl hydroxysultaine, dodecyl hydroxysultaine, tetradecyl hydroxysultaine, hexadecyl hydroxysultaine, coco-hydroxysultaine, and mixtures thereof.

15. The process of claim 10, wherein the alkyl betaines are selected from the group consisting of ethyl betaine, propyl betaine, butyl-betaine, pentyl betaine, hexyl betaine, heptyl betaine, octyl betaine, nonyl betaine, decyl betaine, undecyl betaine, dodecyl betaine, tetradecyl betaine, hexadecyl betaine, coco-betaine, and mixtures thereof.

16. The process of claim 1, wherein the alkyl hydroxy sulphonates of sodium are selected from the group consisting of 3-hydroxybutane-1-sulfonate of sodium, 3-hydroxypentane-1-sulfonate of sodium, 3-hydroxyhexane-1-sulfonate of sodium, 3-hidroxiheptano-1-sulfonate of sodium, 3-hidroxioctano-1-sulfonate of sodium, 3-hidroxinonano-1-sulfonate of sodium, 3-hidroxidecano-1-sulfonate, 3-hidroxiundecano-1-sulfonate of sodium, 3-hidroxidodecano-1-sulfonate of sodium, 3-hidroxitetradecano-1-sulfonate of sodium, 3-hidroxihexadecano-1-sulfonate of sodium, 2-hydroxybutane-1-sulfonate of sodium, 2-hydroxypentane-1-sulfonate of sodium, 2-hidroxihexano-1-sulfonate of sodium, 2-hidroxinonano -1-sulfonate of sodium, 2-hidroxidecano-1-sulfonate sodium 2-hidroxiundecano-1-sulfonate of sodium, 2-hidroxidodecano-1-sulfonate of sodium, 2-hidroxitetradecano-1-sulfonate of sodium, 2-hidroxihexadecano-1-sulfonate of sodium, 2-hidroxitetradecano-1-sulfonate of sodium, 2-hidroxihexadecano-1-sulfonate of sodium, and a mixture thereof.

17. The process of claim 1, wherein the alkyl sulphonates of sodium are selected from the group consisting of but-2-en-1-sulfonate of sodium, pent-2-en-1-sulfonate of sodium, hex-2-en-1-sulfonate of sodium, hept-2-in-1-sulfonate of sodium, oct-2-en1-sulfonate of sodium, non-2-en-1-sulfonate of sodium, dec-2-en-1-sulfonate of sodium, undec-2-en-1-sulfonate of sodium, dodec-2-en-1-sulfonate of sodium, tetradec-2-en-1-sulfonate of sodium, hexadec-2-en-1-sulfonate of sodium, and a mixture thereof.

18. The process of claim 1, wherein the tetra-alkyl ammonium halides are selected from the group consisting of butyl trimethyl ammonium chloride, hexyl trimethyl ammonium chloride, octyl trimethyl ammonium chloride, decyl trimethyl ammonium chloride, dodecyl trimethyl ammonium chloride, trimethyl tetradecyl ammonium chloride, hexadecyl trimethyl ammonium chloride, butyl trimethyl ammonium bromide, hexyl trimethyl ammonium bromide, octyl trimethyl ammonium bromide, decyl trimethyl ammonium bromide, dodecyl trimethyl ammonium bromide, tetradecyl trimethyl ammonium bromide, and hexadecyl trimethyl ammonium bromide.

19. The process of claim 1, wherein the multifunctional foaming composition further comprises a zwitterionic geminal liquid selected from the group consisting of linear or branched of the type bis-N alkenyl N polyether beta amino acid, bis-N-alkyl-N-polyether-beta amino acid, and bis-N,N-dialkyl-N-polyether betaine.

20. The process of claim 1, wherein the gas is selected from: nitrogen, oxygen, carbon dioxide, natural gas, methane, propane, butane, or mixtures of two or more of these gases.

* * * * *